(12) United States Patent
Buma et al.

(10) Patent No.: US 7,938,410 B2
(45) Date of Patent: May 10, 2011

(54) SUSPENSION SYSTEM FOR VEHICLE

(75) Inventors: Shuuichi Buma, Toyota (JP); Kazuaki Sugiyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 189 days.

(21) Appl. No.: 12/440,593

(22) PCT Filed: Sep. 3, 2007

(86) PCT No.: PCT/JP2007/067122
§ 371 (c)(1),
(2), (4) Date: Mar. 10, 2009

(87) PCT Pub. No.: WO2008/032596
PCT Pub. Date: Mar. 20, 2008

(65) Prior Publication Data
US 2010/0013174 A1    Jan. 21, 2010

(30) Foreign Application Priority Data

Sep. 15, 2006  (JP) .................................. 2006-251919

(51) Int. Cl.
*B60G 17/016* (2006.01)
*B60G 17/015* (2006.01)

(52) U.S. Cl. .................. 280/5.508; 280/5.5; 280/5.509; 280/5.511; 280/5.512; 280/5.515; 280/124.108

(58) Field of Classification Search .............. 280/5.5, 280/5.508, 5.509, 5.511, 5.512, 5.515
See application file for complete search history.

(56) References Cited

U.S. PATENT DOCUMENTS

| | | | | |
|---|---|---|---|---|
| 4,696,489 A | * | 9/1987 | Fujishiro et al. | 280/5.519 |
| 4,887,699 A | * | 12/1989 | Ivers et al. | 188/378 |
| 4,960,290 A | * | 10/1990 | Bose | 280/124.162 |
| 5,293,969 A | | 3/1994 | Yamaoka et al. | |
| 5,808,890 A | * | 9/1998 | Sasaki | 701/37 |
| 6,115,658 A | * | 9/2000 | Ahmadian et al. | 701/37 |
| 6,161,844 A | * | 12/2000 | Charaudeau et al. | 280/5.515 |
| 6,311,110 B1 | * | 10/2001 | Ivers et al. | 701/37 |
| 7,005,816 B2 | * | 2/2006 | Hio et al. | 318/375 |

(Continued)

FOREIGN PATENT DOCUMENTS

JP    5 44754    2/1993

(Continued)

*Primary Examiner* — Toan C To
*Assistant Examiner* — Barry Gooden, Jr.
(74) *Attorney, Agent, or Firm* — Oblon, Spivak, McClelland, Maier & Neustadt, L.L.P.

(57) ABSTRACT

In a suspension system for a vehicle, a suspension spring, an absorber for controllably changing the damping coefficient becoming the reference of amount of its own generating damping force, a displacement force generator for controllably generating a displacement force are arranged in parallel between sprung and unsprung members. A vibration damping control is executed based on a so-called skyhook damper theory by utilizing the displacement force. In execution of the vibration damping control, when a sign of sprung-member absolute velocity Vu and a sign of sprung/unsprung-members velocity difference ΔV are the same to each other, a damping-coefficient increasing control is executed to set a target damping coefficient C* of the absorber to a coefficient value C2 that is larger than a coefficient value C1 to which the target damping coefficient C* is set when the sign of sprung-member absolute velocity Vu and the sign of sprung/unsprung-members velocity difference ΔV are different from each other. Vibration of the sprung member can be effectively damped by cooperation of the absorber and the displacement force generator.

12 Claims, 32 Drawing Sheets

U.S. PATENT DOCUMENTS

| | | | |
|---|---|---|---|
| 7,270,335 B2 * | 9/2007 | Hio et al. | 280/5.5 |
| 7,798,498 B2 * | 9/2010 | Buma | 280/5.511 |
| 2002/0084599 A1 * | 7/2002 | Charaudeau et al. | 280/5.5 |
| 2002/0116104 A1 | 8/2002 | Kawashima et al. | |
| 2004/0150361 A1 * | 8/2004 | Hio et al. | 318/375 |
| 2005/0280219 A1 * | 12/2005 | Brown | 280/5.5 |
| 2006/0138732 A1 | 6/2006 | Buma et al. | |
| 2007/0132197 A1 * | 6/2007 | Thies et al. | 280/5.5 |
| 2007/0182110 A1 * | 8/2007 | Urababa | 280/5.508 |
| 2008/0009992 A1 * | 1/2008 | Izawa et al. | 701/37 |
| 2008/0111324 A1 * | 5/2008 | Davis | 280/5.5 |
| 2009/0001679 A1 * | 1/2009 | Kajino et al. | 280/124.106 |
| 2009/0008887 A1 * | 1/2009 | Buma | 280/5.511 |
| 2009/0055047 A1 * | 2/2009 | Poilbout | 701/37 |
| 2009/0062984 A1 * | 3/2009 | Poilbout | 701/37 |
| 2009/0079145 A1 * | 3/2009 | Inoue et al. | 280/5.515 |
| 2009/0091093 A1 * | 4/2009 | Urababa et al. | 280/5.511 |
| 2009/0091094 A1 * | 4/2009 | Sano | 280/5.511 |
| 2009/0224493 A1 * | 9/2009 | Buma et al. | 280/5.511 |
| 2009/0224502 A1 * | 9/2009 | Yamawaki et al. | 280/124.108 |
| 2010/0207344 A1 * | 8/2010 | Nakamura | 280/124.108 |
| 2010/0253019 A1 * | 10/2010 | Ogawa | 280/5.511 |

FOREIGN PATENT DOCUMENTS

| | | |
|---|---|---|
| JP | 5 238233 | 9/1993 |
| JP | 6-99717 | 4/1994 |
| JP | 2603386 | 3/2000 |
| JP | 2001 121939 | 5/2001 |
| JP | 2001 354020 | 12/2001 |
| JP | 2002 192930 | 7/2002 |
| JP | 2002 211224 | 7/2002 |
| JP | 2002 218778 | 8/2002 |
| JP | 2003 252203 | 9/2003 |
| JP | 2005 119563 | 5/2005 |
| JP | 2005 225302 | 8/2005 |
| JP | 2006 82751 | 3/2006 |
| JP | 2006 188080 | 7/2006 |
| JP | 2006 219047 | 8/2006 |

* cited by examiner

EXPANDING SIDE | CONTRACTING SIDE

FIG.9

| OPERATION MODE | MOTOR FORCE GENERATING DIRECTION | DETECTED SIGNALS OF HALL ELEMENTS | | | STATES OF SWITCHING ELEMENTS | | | | | |
|---|---|---|---|---|---|---|---|---|---|---|
| | | HA | HB | HC | WLC | VLC | ULC | WHC | VHC | UHC |
| CONTROLLED-POWER SUPPLYING MODE | CCW DIRECTION | H | L | H | 0 | 0 | 1* | 0 | 1 | 0 |
| | | H | L | L | 0 | 0 | 1* | 1 | 0 | 0 |
| | | H | H | L | 0 | 1* | 0 | 1 | 0 | 0 |
| | | L | H | L | 0 | 1* | 0 | 0 | 0 | 1 |
| | | L | H | H | 1* | 0 | 0 | 0 | 0 | 1 |
| | | L | L | H | 1* | 0 | 0 | 0 | 1 | 0 |
| | CW DIRECTION | H | L | H | 0 | 1* | 0 | 0 | 0 | 1 |
| | | H | L | L | 1* | 0 | 0 | 0 | 0 | 1 |
| | | H | H | L | 1* | 0 | 0 | 0 | 1 | 0 |
| | | L | H | L | 0 | 0 | 1* | 0 | 1 | 0 |
| | | L | H | H | 0 | 0 | 1* | 1 | 0 | 0 |
| | | L | L | H | 0 | 1* | 0 | 1 | 0 | 0 |
| STAND BY MODE | CCW DIRECTION | H | L | H | 0 | 0 | 0* | 0 | 1 | 0 |
| | | H | L | L | 0 | 0 | 0* | 1 | 0 | 0 |
| | | H | H | L | 0 | 0* | 0 | 1 | 0 | 0 |
| | | L | H | L | 0 | 0* | 0 | 0 | 0 | 1 |
| | | L | H | H | 0* | 0 | 0 | 0 | 0 | 1 |
| | | L | L | H | 0* | 0 | 0 | 0 | 1 | 0 |
| | CW DIRECTION | H | L | H | 0 | 0* | 0 | 0 | 0 | 1 |
| | | H | L | L | 0* | 0 | 0 | 0 | 0 | 1 |
| | | H | H | L | 0* | 0 | 0 | 0 | 1 | 0 |
| | | L | H | L | 0 | 0 | 0* | 0 | 1 | 0 |
| | | L | H | H | 0 | 0 | 0* | 1 | 0 | 0 |
| | | L | L | H | 0 | 0* | 0 | 1 | 0 | 0 |
| BRAKING MODE | | | | | 0 | 0 | 0 | 1 | 1 | 1 |
| FREE MODE | | | | | 0 | 0 | 0 | 0 | 0 | 0 |

1 : ON STATE (CLOSED STATE)   1* : UNDER DUTY CONTROL BY PWM
0 : OFF STATE (OPEN STATE)    0* : STATE IN WHICH PULSE-ON TIME IS
H : DETECTED STATE                 0 UNDER DUTY CONTROL BY PWM
L : NON-DETECTED STATE

FIG.14

| | SMALL ←— DAMPING COEFFICIENT —→ LARGE |
|---|---|
| (a) TRANSMITTABILITY OF VIBRATION OF SPRUNG-MEMBER RESONANCE FREQUENCY | HIGH ↕ LOW |
| (b) TRANSMITTABILITY OF VIBRATION OF FREQUENCY HIGHER THAN SPRUNG-MEMBER RESONANCE FREQUENCY | LOW ↕ HIGH |
| (c) LOAD-HOLDING ABILITY UPON VIBRATION OF SPRUNG-MEMBER RESONANCE FREQUENCY | HIGH ↕ LOW |
| (d) LOAD-HOLDING ABILITY UPON VIBRATION OF UNSPRUNG-MEMBER RESONANCE FREQUENCY | LOW ↕ HIGH |

FIG.16
(a)
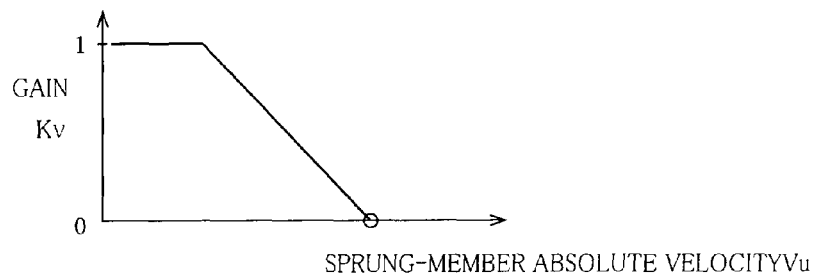
(b)
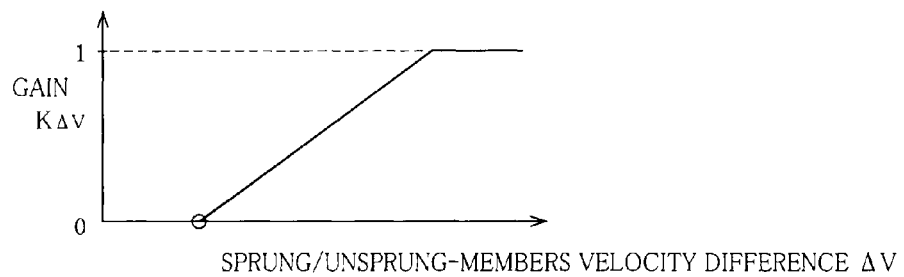
(c)
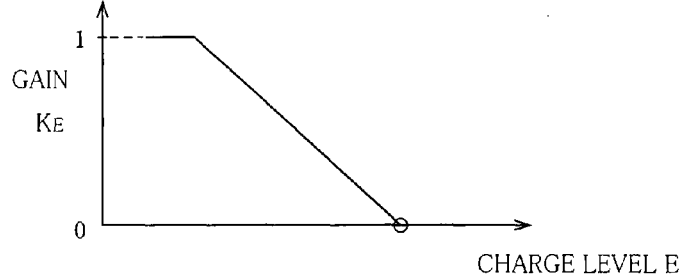
(d)
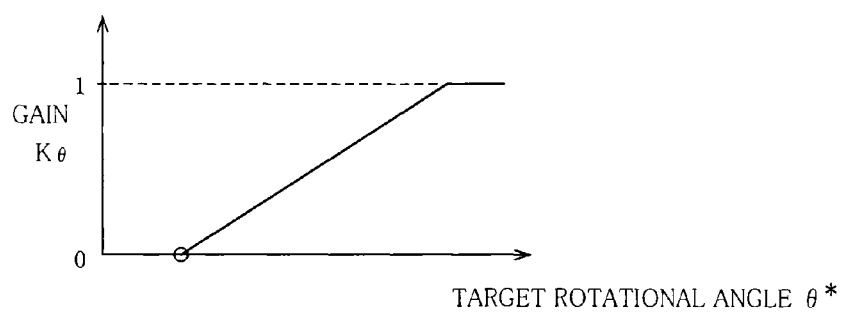

SUSPENSION SYSTEM FOR VEHICLE

TECHNICAL FIELD

The present invention relates to a suspension system for a vehicle, which is provided with a hydraulic shock absorber (hereinafter abbreviated as "absorber" where appropriate) capable of changing a damping coefficient in a manner that enables the changed damping coefficient to be controllable and a device configured to generate a force forcing sprung and unsprung members toward and away from each other in a manner that enables the generated force to be controllable.

BACKGROUND ART

In recent years, there have been begun studies on a suspension system for a vehicle as disclosed in patent literatures as identified below, specifically, a system including a displacement force generator which is provided in parallel with a suspension spring and a shock absorber. The displacement force generator is configured to generate, based on actuation of the electromagnetically-operated actuator, a force (hereinafter referred to as "displacement force" where appropriate) causing the sprung and unsprung members to be displaced toward or away from each other, in a manner that enables the generated displacement force to be controllable. In this system, the generated displacement force is caused to act as a roll restraining force for restraining roll of a body of the vehicle, thereby making it possible to restrain the roll of the vehicle body.
[Patent Literature 1] JP-2002-218778A
[Patent Literature 2] JP-2002-211224A
[Patent Literature 3] JP-2006-82751A

DISCLOSURE OF THE INVENTION

(A) Outline of the Invention

Since the studies on the vehicle suspension system disclosed in the above-identified patent literatures has been begun very recently, the system is still in a developing stage and there is still room for improvement for increasing the practicability. The present invention was made in the light of the background art discussed above, and has an object of the invention to provide a vehicle suspension system having a high practicability.

This object may be achieved according to the principle of this invention, which provides a suspension system for a vehicle, including: (a) a suspension spring; (b) an absorber configured to generate a damping force such that an amount of the generated damping force is dependent on a sprung/unsprung-members velocity difference that is obtained by subtracting an absolute velocity of the unsprung member from an absolute velocity of the sprung member, the absorber being configured to change a damping coefficient which serves as a basis for the amount of the generated damping force, in a manner that enables the damping coefficient to be controllable; and (c) a displacement force generator configured to generate a displacement force which forces the sprung and unsprung members to be displaced toward or away from each other. The suspension spring, the absorber and the displacement force generator are disposed in parallel with each other. The system is capable of executing a so-called skyhook damping control for causing the displacement force generator to generate a displacement force as a damping force against vibration of the sprung member such that an amount of the generated displacement force is dependent on a sprung-member absolute velocity that is the absolute velocity of the sprung member. Further, the system is capable of executing a damping-coefficient increasing control when a sign of the sprung-member absolute velocity and a sign of the sprung/unsprung-members velocity difference are the same to each other, such that the damping coefficient of the absorber is set, in execution of the damping-coefficient increasing control, to a coefficient value that is larger than a coefficient value to which the damping coefficient of the absorber is set when the sign of the sprung-member absolute velocity and the sign of the sprung/unsprung-members velocity difference are different from each other.

In the vehicle suspension system of the present invention, a direction (hereinafter referred to as "displacement-force direction" where appropriate) of the displacement force, which is to be generated by the displacement force generator, is dependent on the sign of the sprung-member absolute velocity, i.e., on direction of displacement of the sprung member. Meanwhile, a direction (hereinafter referred to as "absorber resistance-force direction" where appropriate) of the damping force (hereinafter referred to as "absorber resistance force" where appropriate so as to be distinguished from a damping force generated by the displacement force generator), which is to be generated by the absorber, is dependent on the sign of the sprung/unsprung-members velocity difference, i.e., on direction of relative displacement of the sprung and unsprung members. In the system of the present invention, the damping coefficient of the absorber is changeable depending on whether the displacement-force direction and the absorber resistance-force direction are the same to each other or different from each other, so that the vibration of the sprung member can be effectively damped by appropriate cooperation of the absorber and the displacement force generator.

(B) Modes of the Invention

There will be described various modes of the invention (hereinafter referred to as "claimable invention" where appropriate) deemed to contain claimable features for which protection is sought. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiment of the invention. In a limit in accordance with such an interpretation, a mode of the claimable invention can be constituted by not only any one of these modes but also either a mode provided by any one of these modes and additional component or components incorporated therein and a mode provided by any one of these modes without some of components recited therein. It is noted that below-described modes (1) through (31) correspond to claims 1 through 31, respectively.

(1) A suspension system for a vehicle, comprising:
a suspension spring disposed between a sprung member and an unsprung member of the vehicle and elastically interconnects the sprung and unsprung members;
a hydraulic absorber disposed in parallel with said suspension spring, and configured to generate a damping force against movement of the sprung and unsprung members relative to each other such that an amount of the generated damping force is dependent on a sprung/unsprung-members velocity difference that is obtained by subtracting an absolute velocity of the unsprung member from an absolute velocity of the sprung member, said absorber having a damping coefficient changer configured to change a damping coefficient of said absorber which corresponds to ability of said absorber for generating the damping force and which serves as a basis for the amount of the generated damping force;

a displacement force generator disposed in parallel with said suspension spring, and having an electric motor as a power source, said displacement force generator being configured to generate a displacement force which is based on a motor force exhibited by the electric motor and which forces the sprung and unsprung members to be displaced toward or away from each other; and a controller having a damping-coefficient controlling portion and a displacement-force controlling portion, said damping-coefficient controlling portion being configured to control the damping coefficient of said absorber by controlling said damping coefficient changer, said displacement-force controlling portion being configured to control the displacement force generated by said displacement force generator, by controlling operation of said electric motor, wherein said displacement-force controlling portion is configured to execute a vibration damping control for causing said displacement force generator to generate a displacement force as a damping force against vibration of the sprung member such that an amount of the generated displacement force is dependent on a sprung-member absolute velocity that is the absolute velocity of the sprung member, and wherein said damping-coefficient controlling portion is configured to execute a damping-coefficient increasing control when a sign of the sprung-member absolute velocity and a sign of the sprung/unsprung-members velocity difference are the same to each other, such that the damping coefficient of said absorber is set, in execution of the damping-coefficient increasing control, to a second coefficient value that is larger than a first coefficient value to which the damping coefficient of said absorber is set when the sign of the sprung-member absolute velocity and the sign of the sprung/unsprung-members velocity difference are different from each other.

Where the vibration damping control is executed based on so-called skyhook damper theory by utilizing the displacement force generated by the displacement force generator, there is a high possibility that problems such as followability of the displacement force generator make it difficult to satisfactorily damp vibration of relatively high frequency range. In view of this, it is desirable that the vibration of high frequency range is damped by the absorber. To this end, it is desirable that the damping coefficient of the absorber is set to be small for reducing transmittability of the vibration of high frequency range from the unsprung member to the sprung member. Further, it is desirable that the damping coefficient of the absorber is set to be small also from point of view that the absorber resistance force could affect the vibration damping control executed by the displacement force generator. Meanwhile, where an electric power consumed by the displacement force generator is taken into consideration, the electric power consumption of the displacement force generator can be reduced by increasing the absorber resistance force. Described in detail, when the absorber resistance-force direction and the displacement-force direction are different from each other, the absorber resistance force cannot be of assistance to the displacement force. When the absorber resistance-force direction and the displacement-force direction are the same to each other, the resistance force makes it possible to reduce the displacement force, so that the electric power consumption of the displacement force generator can be reduced in such a case.

In the present mode, when the displacement-force direction and the absorber resistance-force direction are the same to each other, namely, when the sign of the sprung-member absolute velocity and the sign of the sprung/unsprung-members velocity difference are the same to each other, the damping coefficient of the absorber is made larger whereby the absorber resistance force is made larger, than where the signs are different from each other. According to the present mode, when the displacement-force direction and the absorber resistance-force direction are different from each other, it is possible to reduce influence of the absorber resistance force that affects the vibration damping control, for example. When the displacement-force direction and the absorber resistance-force direction are the same to each other, it is possible to reduce the electric power consumption of the displacement force generator, for example. That is, in the present mode, the damping characteristic of the absorber is changed depending on whether the displacement-force direction and the absorber resistance-force direction are the same to each other or different from each other, so that the vibration of the sprung member can be effectively damped by appropriate cooperation of the absorber and the displacement force generator.

The "damping-coefficient increasing control" described in the present mode may be executed necessarily when the sign of the sprung-member absolute velocity and the sign of the sprung/unsprung-members velocity difference are the same to each other, or may be executed upon satisfaction of other condition when the signs are the same to each other. The "damping coefficient changer" may be configured to change the damping coefficient in a continuous manner, or may be configured to change the damping coefficient in a stepwise manner such that the damping coefficient is set to one of at least two values. Each of the "first coefficient value" and "second coefficient value" described in the present mode may be a fixed value, i.e., an unchangeable constant value, or may be a changeable value. The "absorber" described in the present mode may have a construction that is not particularly limited. For example, the absorber may be provided by any one of hydraulically operated absorbers that are commonly used in the art.

The "sprung member" described in the present mode may be referred also to as a sprung portion of the vehicle, and is broadly interpreted to mean a portion of a vehicle body that is supported by the suspension spring, for example. Further, the "unsprung member" described in the present mode may be referred also to an unsprung portion of the vehicle, and is broadly interpreted to mean a suspension arm or other vehicle component that is vertically displaceable together with a wheel of the vehicle, for example. The "suspension spring" may be provided by any one of various kinds of springs such as coil spring and air spring, and accordingly may have a construction that is not particularly limited. The "electric motor" provided as the power source in the displacement force generator may be either a rotary motor or a liner motor.

(2) The suspension system according to mode (1), wherein said displacement-force controlling portion is configured to further execute a vehicle-body posture control for causing said displacement force generator to generate a displacement force as at least one of a roll restraining force for restraining roll of a body of the vehicle and a pitch restraining force for restraining pitch of the body of the vehicle.

It is possible to further improve a ride comfort or the like of the vehicle, by restraining change of posture of the vehicle body caused by the roll and/or change of posture of the vehicle body caused by the pitch, as in the present mode.

(3) The suspension system according to mode (1) or (2), wherein said damping-coefficient controlling portion is configured to execute the damping-coefficient increasing control on condition that the sprung-member absolute velocity is not larger than a threshold velocity value.

From point of view of reduction of electric power consumption of the displacement force generator, it is desirable that the damping coefficient of the absorber is increased always when the sign of the sprung-member absolute velocity and the sign of the sprung/unsprung-members velocity difference are the same to each other. However, the larger the sprung-member absolute velocity is, the higher is a possibility of occurrence of vibration having a resonance frequency of the sprung member or a frequency close to the sprung-member resonance frequency. That is, the possibility of occurrence of vibration having a relatively low frequency is increased with increase of the sprung-member absolute velocity. In such a case, it is required to take account of road-holding ability of the wheel upon occurrence of vibration of relatively low frequency range. The road-holding ability upon occurrence of vibration of the relatively low frequency range is reduced with increase of the damping coefficient. In view of this, the execution of the damping-coefficient increasing control is limited depending on the sprung-member absolute velocity as a parameter in the present mode. According to the present mode, it is possible to execute the damping-coefficient increasing control taking account of the road-holding ability of the vehicle body upon occurrence of vibration having the relatively low frequency range.

(4) The suspension system according to any one of modes (1)-(3), wherein said damping-coefficient controlling portion is configured to execute the damping-coefficient increasing control on condition that the sprung/unsprung-members velocity difference is not smaller than a threshold difference value.

It is desirable, as described above, that the absorber resistance force is made small, from point of view of reduction of influence of the absorber resistance force that affects the vibration damping control based on the skyhook damper theory. On the other hand, the larger the sprung/unsprung-members velocity difference is, the higher is a possibility of occurrence of vibration having relatively high frequency. Therefore, in view of the road-holding ability of the wheel upon occurrence of vibration of relatively high frequency range, it is desirable that the damping coefficient is increased with increase of the sprung/unsprung-members velocity difference. In the present mode, the execution of the damping-coefficient increasing control is limited depending on the sprung/unsprung-members velocity difference as a parameter. In the present mode, the damping-coefficient increasing control is executed on condition that the sprung/unsprung-members velocity difference is not smaller than the threshold difference value, so that it is possible to effectively restrain the influence affecting the vibration damping control while intending improvement of the road-holding ability upon occurrence of vibration of relatively high frequency range.

(5) The suspension system according to any one of modes (1)-(4), wherein said damping-coefficient controlling portion is configured to execute the damping-coefficient increasing control on condition that a charge level of a battery as an electric-power supply source for said electric motor is not higher than a threshold level value.

When the charge level of the battery is low, namely, when an amount of electric energy remaining in the batter is small, it is desirable to reduce the displacement force since it is desirable to restrain the electric power consumption of the electric motor. On the other hand, when the charge level of the battery is high, there is little need to reduce the displacement force. Therefore, it is desirable that the damping-coefficient increasing control is executed to generate the large absorber resistance force only when the charge level of the battery is low, and that the damping coefficient is made small when the charge level of the battery is high, in view of reduction of the influence of the absorber resistance force that affects the vibration damping control based on the skyhook damper theory, and also in view of transmittability of vibration having relatively high frequency from the unsprung member to the sprung member. In the present mode, the execution of the damping-coefficient increasing control is limited depending on the charge level of the battery as a parameter. According to the present mode, for example, it is possible to effectively restrain the influence of the absorber resistance force affecting the vibration damping control and the transmission of the vibration of relatively high frequency range, while satisfying requirement for reduction of the electric power consumption.

(6) The suspension system according to any one of modes (1)-(5), wherein said damping-coefficient controlling portion is configured to execute the damping-coefficient increasing control on condition that the displacement force that is to be generated by said displacement force generator is not smaller than a threshold force amount.

There is an upper limit on amount of the displacement force generable by the displacement force generator, due to factors such as capacity of the electric motor and construction of the displacement force generator. Therefore, there is a case in which a sufficient amount of the displacement force cannot be generated only by the displacement force generator. Further, when the displacement amount is to be generated by an amount close to the upper limit, it is considered that a large burden is imposed on the displacement force generator, particularly, the electric motor. In view of these, it is desirable to reduce the displacement force that is to be generated by the displacement force generator. In the present mode, the execution of the damping-coefficient increasing control is limited depending on the displacement force as a parameter. According to the present mode, for example, in a situation that a relatively large amount of the displacement force has to be generated by the displacement force generator, it is possible to effectively restrain the influence of the absorber resistance force affecting the vibration damping control and the transmission of the vibration of relatively high frequency range, while enabling the absorber resistance force to effectively compensate the displacement force.

In the vehicle suspension system according to the present mode, since the displacement force is based on the motor force generated by the electric motor, it is considered that the amount of the displacement force corresponds to the amount of the motion of the electric motor and the amount of electric power supplied to the electric motor. Therefore, it is possible to judge whether the displacement force is not smaller than the threshold force amount, by seeing situation of the actual control. That is, it is possible to judge that the displacement force is equal to or larger than the threshold force amount, by confirming that the motion amount of the electric motor is not smaller than a threshold motion amount, or confirming that the electric power (which is supplied to the electric motor and which corresponds to the displacement force to be generated) is not smaller than a threshold power amount. Thus, the damping-coefficient increasing control may be executed depending on result of the judgment.

(7) The suspension system according to any one of modes (1)-(6), wherein the second coefficient value is changed in execution of the damping-coefficient increasing control.

An arrangement in which the second coefficient value is provided by a constant value is not desirable where the damping-coefficient increasing control should be performed in a delicate manner. Further, where there is a large difference between the first and second coefficient values, the control cannot be executed smoothly in a transition from one of the first and second coefficient values to the other, and there is a possibility that a discomfort is given to a passenger of the vehicle, for example. According to the present mode, the vibration damping force can be controlled in a delicate manner, i.e., in a fine manner. Further, where the second coefficient value is changed such that one of the first and second coefficient values is switched to the other in a gradual manner, the control can be smoothly executed. The present mode may be either a mode in which the second coefficient value is changed in a continuous manner, or a mode in which the second coefficient value is changed in a stepwise manner.

(8) The suspension system according to mode (7), wherein the second coefficient value is changed in execution of the damping-coefficient increasing control, such that the second coefficient value is made larger when the sprung-member absolute velocity is small, than when the sprung-member absolute velocity is large.

(9) The suspension system according to mode (7) or (8), wherein the second coefficient value is changed in execution of the damping-coefficient increasing control, such that the second coefficient value is made larger when the sprung/unsprung-members velocity difference is large, than when the sprung/unsprung-members velocity difference is small.

(10) The suspension system according to any one of modes (7)-(9), wherein the second coefficient value is changed in execution of the damping-coefficient increasing control, such that the second coefficient value is made larger when a charge level of a battery as an electric-power supply source for said electric motor is low, than when the charge level of the battery is high.

(11) The suspension system according to any one of modes (7)-(10), wherein the second coefficient value is changed in execution of the damping-coefficient increasing control, such that the second coefficient value is made larger when the displacement force that is to be generated by said displacement force generator is large, than when the displacement force that is to be generated by said displacement force generator is small.

Each of these four modes contains a limitation as to a parameter based on which the second coefficient value is changed and a limitation as to how the second coefficient value is changed based on the parameter. The parameter described in each of the four modes is the same as that described in a corresponding one of the above-described four modes in which the execution of the damping-coefficient increasing control is limited. Therefore, it is desirable that each of the four modes is combined with the corresponding one of the above-described four modes which recites the same parameter.

Among the four modes, in the mode in which the second coefficient value is changed depending on the sprung-member absolute velocity, the road-holding ability upon occurrence of vibration of relatively low frequency range is satisfactorily obtained. In the mode in which the second coefficient value is changed depending on the sprung/unsprung-members velocity difference, the road-holding ability upon occurrence of vibration of relatively high frequency range is satisfactorily obtained. In the mode in which the second coefficient value is changed depending on the charge level, it is possible to establish a suitable balance of reduction of the electric power consumption, relative to, for example, transmittability of the vibration of high frequency range from the unsprung member to the sprung member. In the mode in which the second coefficient value is changed depending on the displacement force, it is possible to reduce burden imposed on the displacement force generator and also to satisfactorily perform the vibration damping control.

(12) The suspension system according to any one of modes (1)-(11), wherein the first and second coefficient values are determined such that a road-holding ability of the vehicle is higher upon occurrence of vibration having a resonance frequency of the unsprung member when the damping coefficient of said absorber is set to the first coefficient value, than upon occurrence of vibration having a resonance frequency of the sprung member when the damping coefficient of said absorber is set to the second coefficient value.

(13) The suspension system according to any one of modes (1)-(11), wherein the second coefficient value is changed in execution of the damping-coefficient increasing control, and wherein the first coefficient value and a maximum second coefficient value as a maximum value of the second coefficient value are determined such that a road-holding ability of the vehicle is higher upon occurrence of vibration having a resonance frequency of the unsprung member when the damping coefficient of said absorber is set to the first coefficient value, than upon occurrence of vibration having a resonance frequency of the sprung member when the damping coefficient of said absorber is set to the maximum second coefficient value.

Each of these two modes contains a limitation as to the first coefficient value and second coefficient value, or as to the first coefficient value and maximum second coefficient value. In view of transmittability of vibration of the sprung-member resonance frequency range from the unsprung member to the sprung member, it is desirable that the damping coefficient of the absorber is large as much as possible. On the other hand, in view of transmittability of vibration of relatively high frequency range, it is desirable that the damping coefficient of the absorber is small as much as possible. Meanwhile, the road-holding ability upon occurrence of vibration of relatively low frequency range is reduced with increase of the damping coefficient. On the other hand, the road-holding ability upon occurrence of vibration of relatively high frequency range is reduced with reduction of the damping coefficient. Further, in view of followability of the displacement force generator upon occurrence of vibration of relatively high frequency range, it is desirable that the damping coefficient is small as much as possible. On the contrary, in order that the electric power consumed by the displacement generator is reduced by utilizing the absorber resistance force, it is desirable that the second coefficient value is increased as much as possible.

In each of the above two modes in which the above-discussed things are all taken into consideration, the first coefficient value and second coefficient value, or the first coefficient value and maximum second coefficient value are suitably determined. According to each of the above two modes, in execution of the damping-coefficient increasing control, it is possible to reduce the electric power consumed by the displacement force generator, for example, without considerably reducing the road-holding ability of the wheel upon occurrence of vibration of relatively high frequency range, which is difficult to be coped by the displacement force generator.

(14) The suspension system according to any one of modes (1)-(13), wherein said displacement-force controlling portion is configured, when the damping-coefficient increasing control is being executed by said damping-coefficient controlling portion, to execute a displacement-force reducing control for reducing the displacement force that is to be generated by said displacement force generator.

(15) The suspension system according to mode (14), wherein said displacement-force reducing control is executed to reduce the displacement force that is to be generated as the damping force by said displacement force generator in execution of the vibration damping control.

(16) The suspension system according to mode (14) or (15), wherein the second coefficient value is changed in execution of the damping-coefficient increasing control, and wherein the displacement-force reducing control is executed such that the displacement force that is to be generated by said displacement force generator is made smaller when the second coefficient value is large than when the second coefficient value is small.

The damping-coefficient increasing control is executed when the displacement-force direction and the absorber resistance-force direction are the same to each other, and the absorber is capable of generating a larger amount of the damping force when the damping coefficient of the absorber is large than when the damping coefficient of the absorber is small. Thus, in each of the above three modes in which the displacement force is reduced upon execution of the damping-coefficient increasing control, it is possible to effectively reduce the electric power consumed by the electric motor.

The second one of the above three modes contains a limitation that the displacement force, which is to be generated as the damping force in the vibration damping control, is reduced. Since the absorber resistance force acts as the damping force against relative vibration of the sprung and unsprung members, it is possible to suitably execute, for example, the vibration damping control in the second one of the above three modes. In the third one of the above three modes, the displacement force and the absorber resistance force are changed relative to each other, so that it is possible to cause the displacement force generator and the absorber to suitably cooperate with each other for satisfactorily damping vibration of the sprung member, while effectively reducing the electric power consumed by the displacement force generator.

(17) The suspension system according to any one of modes (1)-(16), wherein said displacement-force controlling portion is configured, when the damping-coefficient increasing control is being executed, to execute a supplied-power reducing control for reducing an electric power that is to be supplied to said electric motor.

In the present mode, the electric power, which is to be supplied to the electric motor included in the displacement force generator, is reduced, so that it is possible to reduce the electric power consumed by the displacement force generator. Since the electric power consumed by the displacement force generator can be reduced also by execution of the displacement-force reducing control, the displacement-force reducing control can be considered as a mode of the supplied-power reducing control.

(18) The suspension system according to mode (17), wherein the supplied-power reducing control is a power-supply inhibiting control for inhibiting supply of the electric power to said electric motor.

According to the present mode, the supply of the electric power to the electric motor is inhibited during execution of the damping-coefficient increasing control, so that the suspension system can have particularly an excellent electric power saving characteristic.

(19) The suspension system according to mode (18), further comprising a drive circuit which is disposed between said electric motor and a battery as an electric-power supply source for said electric motor, and which is configured to drive said electric motor, wherein said electric motor is operable while being placed in at least one of operational modes by operation of a switching element of said drive circuit, the operational modes consisting of (A) a motor-terminals connecting mode in which a plurality of motor terminals of the electric motor are electrically connected to each other, (B) a specific-motor-terminal/power-supply-terminal connecting mode in which one of a high-level voltage terminal and a low-level voltage terminal of the electric-power supply source is electrically connected to a selected one of the plurality of motor terminals of the electric motor that is changed depending on an operating position of the electric motor, and (C) a motor-terminals disconnecting mode in which neither the high-level voltage terminal nor the low-level voltage terminal of the electric-power supply source is electrically connected to the plurality of motor terminals of the electric motor and in which the plurality of motor terminals are electrically disconnected from each other, and wherein the power-supply inhibiting control is executed by placing said electric motor in a determined one of said at least one of the operational modes.

The "operational mode", in which the electric motor is to be placed, is dependent on an energized state of the electric motor, namely, is dependent on whether the terminals of the electric motor are electrically connected to or disconnected from each other and whether each of the terminals of the electric motor is electrically connected to or disconnected from each of the high-level voltage terminal and the low-level voltage terminal of the power source. Where the drive circuit driving the electric motor is provided by an inverter, the energized state of the electric motor depends on switching elements of the inverter each of which is operated to selectively connect and disconnect a corresponding one of the terminals respective phases of the electric motor to and from a corresponding one of the high-level and the low-level voltage terminals of the power source. Described specifically, when the electric power is to be supplied from the power source to the electric motor, the high-level and the low-level voltage terminals of the power source are electrically connected to selected two of the terminals of the electric motor, respectively, such that each of the selected two terminals is sequentially changed to another, depending on the operating position of the electric motor, for example. Further, PWM (Pulse Width Modulation) control may be performed on each switching element that interconnects one of the high-level and the low-level voltage terminals of the power source and one of the terminals of the electric motor, so that the amount of the supplied electric power can be changed by changing a duty ratio in the PWM control. Hereinafter, each of the operational modes established by such an energized state of the electric motor in which the amount of the supplied electric power is changeable, will be referred to as "controlled-power supplying mode" where appropriate. Each of the three operational modes described in the present mode is an operational mode in which the electric power is not supplied to the electric motor from the power source. When the electric motor is moved by application of the external force, a characteristic of the electric motor, i.e., a characteristic of the electric motor with respect to the motor force varies depending on which one of the three operational modes is established.

In the "motor-terminals connecting mode", the plurality of terminals of the electric motor are electrically connected to each other, so that a relatively large amount of the electromotive force is generated in the electric motor when the electric motor is moved by application of the external force. Where the terminals are arranged to be shorted to each other in this motor-terminals connecting mode, the amount of the generated electromotive force can be maximized. In this motor-terminals connecting mode, the displacement force is generated as a relatively large resistance force. The "motor-terminals disconnecting mode" is generally defined as an operational mode in which each phase of the electric motor is placed in its open state. In this motor-terminals disconnecting mode, the electromotive force is little generated (although the electromotive force can be generated depending on construction of the drive circuit), and accordingly the motor force is generated very little or by a relatively small amount, so that the displacement force generated by the displacement force generator acts only as a relatively small resistance force against motion caused by the external force. The "specific-motor-terminal/power-supply-terminal connecting mode" is defined as an operational state in which the duty ratio of the PWM control is set at 0 (zero) in the controlled-power supplying mode. In this operational state, some amount of the electromotive force is generated upon motion of the electric motor that is caused by the external force. The amount of the motor force generated in this instance is intermediate between that generated in the motor-terminals connecting mode and that generated in the motor-terminals disconnecting mode. Therefore, in this specific-motor-terminal/power-supply-terminal connecting mode, an intermediate amount of the displacement force is generated.

In the present mode, when the supply of the electric power to the electric motor is inhibited, the electrical motor is operated with one of the above three operational modes being established, so that the electric motor exhibits a characteristic depending on the established operational mode, and the displacement force dependent on the established operational mode acts as a resistance force against the movement of the sprung and unsprung members relative to each other, which is caused by the external force. The suspension system according to the present mode does not necessarily have to be arranged such that all of the three operational modes are establishable, but may be arranged such that only one or two of the three operational modes are establishable. Where two or all of the three operational modes are establishable, one of the two or three operational modes may be selected according to at least one predetermined condition. It is noted that the consumption of the electric power can be further reduced by recycling the electric power based on the above-described electromotive force.

(20) The suspension system according to mode (19), wherein the second coefficient value is changed in execution of the damping-coefficient increasing control, and wherein the power-supply inhibiting control is executed by placing said electric motor in the motor-terminals disconnecting mode as the determined one of said at least one of the operational modes when the second coefficient value is a relatively large value, and is executed by placing said electric motor in the motor-terminals connecting mode as the determined one of said at least one of the operational modes when the second coefficient value is a relatively small value.

Where the second coefficient value is changeable in execution of the damping-coefficient increasing control, the amount of the absorber resistance force, which can be generated by the absorber, is increased with increase of the damping force, as described above. In the present mode with account being taken of this fact, when the damping coefficient of the absorber is relatively large whereby the relatively large absorber resistance force can be generated, the resistance force based on the electromotive force is made relatively small. On the other hand, when the damping coefficient of the absorber is relatively small whereby the amount of the absorber resistance force which can be generated by the absorber is made small, the resistance force based on the electromotive force is made relatively large. Therefore, according to the present mode, even when the supply of the electric power to the electric motor is inhibited in execution of the damping-coefficient increasing control, it is possible to cause the displacement force generator and the absorber to suitably cooperate with each other, for example.

(21) The suspension system according to mode (20), wherein the power-supply inhibiting control is executed by placing said electric motor in the specific-motor-terminal/power-supply-terminal connecting mode as the determined one of said at least one of the operational modes when the second coefficient value is intermediate between the relatively large and small values.

When the specific-motor-terminal/power-supply-terminal connecting mode is employed as the operational mode, an amount of the resistance against the relative movement of the sprung and unsprung members (which is caused by application of the external force) is made intermediate between that when the motor-terminals connecting mode is employed and that when the motor-terminals disconnecting mode is employed. Therefore, according to the present mode, an intermediate amount of the resistance force can be generated, so that it is possible to cause the displacement force generator and the absorber to suitably cooperate with each other, for example, when the electric power is not supplied to the electric power.

(22) The suspension system according to any one of modes (1)-(21), wherein said displacement force generator includes: an elastic body connected at one of opposite end portions thereof to one of the sprung and unsprung members; and an electromagnetically-operated actuator which is disposed between the other of said opposite end portions of said elastic body and the other of the sprung and unsprung members and which interconnects said elastic body and said other of the sprung and unsprung members, and wherein said electromagnetically-operated actuator includes said electric motor, and is configured to generate an actuator force based on a motor force generated by said electric motor, such that the generated actuator force acts on said elastic body so as to change an amount of deformation of said elastic body that is dependent on an amount of actuation of said actuator, and such that the generated actuator force is transmitted to the sprung and unsprung members via said elastic body so as to act as the displacement force.

The present mode contains a specific limitation as to construction of the displacement force generator. The "displacement force generator" described in the present mode is configured to cause the actuator force to act on the elastic body so as to change the amount of deformation of the elastic body that is dependent on the amount of actuation of the actuator. Therefore, in the present mode, the amount of the displacement force generated by the displacement force generator and the amount of the actuation of the actuator correspond to each other. The "elastic body" described in the present mode may be provided by any one of various forms of elastic bodies such as coil spring and torsion spring, as long as it is capable of exhibiting an elastic force that is dependent on an amount of its deformation.

(23) The suspension system according to mode (22), wherein said elastic body includes a shaft portion which is rotatably held by the sprung member and an arm portion which extends from one of opposite end portions of said shaft portion in a direction intersecting said shaft portion and which is connected at a distal end portion thereof to the unsprung member, and wherein said actuator is fixed to a body of the vehicle, and is configured to rotate said shaft portion about an axis of said shaft portion by the actuator force generated by said actuator.

In the present mode, the construction of the displacement force generator is more specifically limited. The "elastic body" described in the present mode includes the shaft portion and the arm portion, at least one of which has a function serving as the elastic body. For example, the shaft portion may serve as a torsion spring, and/or the arm portion may be arranged to be deflected so as to serve as a spring. It is noted that the elastic body may be constituted by either an assembly of the shaft and arm portions provided by respective members that are connected to each other, or a single piece including the shaft and arm portions that are provided by a single member.

(24) The suspension system according to mode (22) or (23), wherein said actuator is configured to have a positive/negative efficiency product that is not larger than ½, where the positive/negative efficiency product is defined as a product of a positive efficiency of said actuator and a negative efficiency of said actuator, the positive efficiency is defined as a ratio of an amount of an external force acting on said actuator, to an amount of the motor force minimally required to cause the actuation of said actuator against the external force, and the negative efficiency is defined as a ratio of an amount of the motor force minimally required to inhibit said actuator from being actuated by an external force acting on said actuator, to an amount of the external force.

The "positive/negative efficiency product" described in the present mode may be considered as a ratio of an amount of the motor force minimally required to inhibit the actuator from being actuated by a certain amount of the external force acting on the actuator, to an amount of the motor force minimally required to cause the actuation of the actuator against the external force. Therefore, a low value of the positive/negative efficiency product indicates that the actuator is hard to be actuated by the external force.

(25) The suspension system according to any one of modes (22)-(24), wherein said actuator includes a speed reducer configured to decelerate motion of said electric motor, and is configured to output the decelerated motion as the actuation of said actuator, and wherein said speed reducer has a speed ratio that is not higher than 1/100.

In the present mode, the speed ratio of the speed reducer of the actuator is relatively low, namely, a ratio of an actuation amount of the actuator to a motion amount of the electric motor is relatively low. It can be considered that the above-described positive/negative efficiency product is, in general, reduced by employing the speed reducer having a low speed ratio. In view of this, the present mode can be considered as a kind of the mode in which the actuator having a relatively low positive/negative efficiency product is employed. The employment of the speed reducer having the low speed ratio permits the electric motor to be made compact in size. When the actuator is actuated by application of the external force to the actuator, the electric motor is moved at a speed that is higher where the speed ratio is low than where the speed ratio is high. Accordingly, where the speed ratio is relatively low, a relatively large electromotive force is generated in the electric motor moved by the application of the external force, thereby making it possible to generate a relatively large electric power based on the electromagnetic force. It is therefore possible to provide a suspension system that is advantageous from a point of view of electric power saving, if the suspension system is arranged to be capable of recycling the regenerated electric power.

(26) The suspension system according to any one of modes (22)-(25), wherein said displacement-force controlling portion is configured to determine a target amount of actuation of said actuator which corresponds to an amount of the displacement force that is to be generated by said displacement force generator, and to control the operation of said electric motor such that an actual amount of actuation of said actuator is equalized to the target amount of actuation of said actuator.

In the present mode, the electric motor is controlled for controlling the amount of the displacement force, by execution of the control (i.e., positioning control) in which the actuation amount of the actuator is directly subjected to the control. The present mode is preferably applicable to the suspension system arranged to make it possible to determine the actuation amount of the actuator which corresponds to the amount of the displacement force that is to be generated.

(27) The suspension system according to mode (26), wherein said displacement-force controlling portion is configured to further execute a vehicle-body posture control for causing said displacement force generator to generate a displacement force as at least one of a roll restraining force for restraining roll of a body of the vehicle and a pitch restraining force for restraining pitch of the body of the vehicle, and to determine the target amount of actuation of said actuator, based on a sum of the displacement force that is to be generated in the vibration damping control and the displacement force that is to be generated in the vehicle-body posture control.

The present mode contains a limitation as to a manner for determination of the actuation amount of the actuator that is directly subjected to the control which is executed for controlling the displacement force where the vibration damping control and the vehicle-body posture control are concurrently executed by utilizing the displacement force generated by the displacement force generator.

(28) The suspension system according to mode (26) or (27), wherein said displacement-force controlling portion is configured to determine, based on a deviation of the actual amount of actuation of said actuator from the target amount of actuation of said actuator, a target amount of an electric power which is to be supplied to said electric motor and which includes at least a component dependent on the deviation and a component dependent on an integral value of the deviation, and wherein said displacement force controlling portion is configured to control the operation of said electric motor based on the determined target amount of the electric power.

In the present mode, the electric motor is controlled for controlling the displacement force, based on the actuation amount of the actuator and according to a feedback control method. That is, the electric motor is controlled by, for example, PI control or PDI control. The "component (of the electric power) dependent on the integral value of the deviation", i.e., an integral term component of the electric power can be considered as a component for preventing the actuation amount of the actuator from being fluctuated by application of the external force. Therefore, according to the present mode, the displacement force generator can be suitably controlled where the actuation amount of the actuator is directly subjected to the control in presence of the external force acting on the actuator.

(29) The suspension system according to any one of modes (1)-(28), wherein said displacement-force controlling portion is configured to execute a sprung-member displacement restraining control for causing said displacement force generator to generate a displacement force as a force for restraining vertical displacement of the sprung member so as to restrain vibration of the sprung member such that an amount of the generated displacement force is dependent on an amount of the vertical displacement of the sprung member.

The "sprung-member displacement restraining control" described in the present mode is executed based on so-called skyhook spring theory. According to the present mode, the vibration of the sprung member can be damped based on the skyhook damper theory while the vertical displacement of the sprung member can be restrained based on the skyhook spring theory. Thus, it is possible to further effectively control the vibration of the sprung member.

(30) The suspension system according to mode (29), wherein said displacement-force controlling portion is configured, when the damping-coefficient increasing control is being executed by said damping-coefficient controlling portion, to execute a supplied-power reducing control for reducing an amount of electric power that is to be supplied to said electric motor, and wherein the supplied-power reducing control is executed as a power-supply inhibiting control to inhibit supply of an electric power to said electric motor, on condition that a sign of a sprung-member displacement amount and a sign of a sprung/unsprung-members displacement amount difference are the same to each other, where the sprung-member displacement amount represents an amount of displacement of the sprung member, and the sprung/unsprung-members displacement amount difference is obtained by subtracting an amount of displacement of the unsprung member from the sprung-member displacement amount.

In the present mode, the execution of the power-supply inhibiting control is limited when the sprung-member displacement restraining control is being executed. It can be considered that, when amounts of displacements of the respective sprung and unsprung members are both zero, the elastic force of the suspension spring and the load applied to the suspension spring are equal to each other, namely, are balanced to each other. If at least one of the sprung and unsprung members is displaced in such a force-balanced state, the force balance is lost. In the present mode, as described later in detail, the power-supply inhibiting control is executed when the displacement of the sprung member can be restrained by utilizing the loss of the force balance. According to the present mode, even when the supply of the electric power to the electric motor is inhibited, it is possible to restrain the sprung member from being vertically displaced and accordingly to establish a suspension system that is excellent in electric power saving.

(31) The suspension system according to mode (30), further comprising a drive circuit which is disposed between said electric motor and a battery as an electric-power supply source for said electric motor, and which is configured to drive said electric motor, wherein said electric motor is operable while being placed in at least one of operational modes by operation of a switching element of said drive circuit, the operational modes consisting of (A) a motor-terminals connecting mode in which a plurality of motor terminals of the electric motor are electrically connected to each other, (B) a specific-motor-terminal/power-supply-terminal connecting mode in which one of a high-level voltage terminal and a low-level voltage terminal of the electric-power supply source is electrically connected to a selected one of the plurality of motor terminals of the electric motor that is changed depending on an operating position of the electric motor, and (C) a motor-terminals disconnecting mode in which neither the high-level voltage terminal nor the low-level voltage terminal of the electric-power supply source is electrically connected to the plurality of motor terminals of the electric motor and in which the plurality of motor terminals are electrically disconnected from each other, and wherein the power-supply inhibiting control is executed by placing said electric motor in a determined one of said at least one of the operational modes.

The present mode contains a specific limitation as to manner of execution of the power-supply inhibiting control in case of execution of the sprung-member displacement restraining control. Since the description about the "operational mode", in which the electric motor is to be placed, has been already given, it is omitted herein. By executing the power-supply inhibiting control with the electric motor being placed in the motor-terminals connecting mode, it is possible to apply a relatively large amount of the resistance force against the displacement of the sprung member, and accordingly to obtain a large effect for electric power saving.

BRIEF DESCRIPTION OF DRAWINGS

FIG. 9 is a table showing operational states of respective switching elements of the inverter of FIG. 7 in each operational mode of the electric motor.

FIG. 14 is a table showing a relationship between the vibration transmittability and the damping coefficient and a relationship between road-holding ability and the damping coefficient.

FIG. 16 is a set of graphs showing various gains, based on which second coefficient value as target damping coefficient is determined for the damping-coefficient increasing control.

BEST MODE FOR CARRYING OUT THE INVENTION

There will be described embodiment of the present invention, by reference to the accompanying drawings. It is to be understood that the present invention is not limited to the following embodiment, and may be otherwise embodied with various changes and modifications, such as those described in the foregoing "MODES OF THE INVENTION", which may occur to those skilled in the art.

<<Construction of Vehicle Suspension System>>

Figure 1:
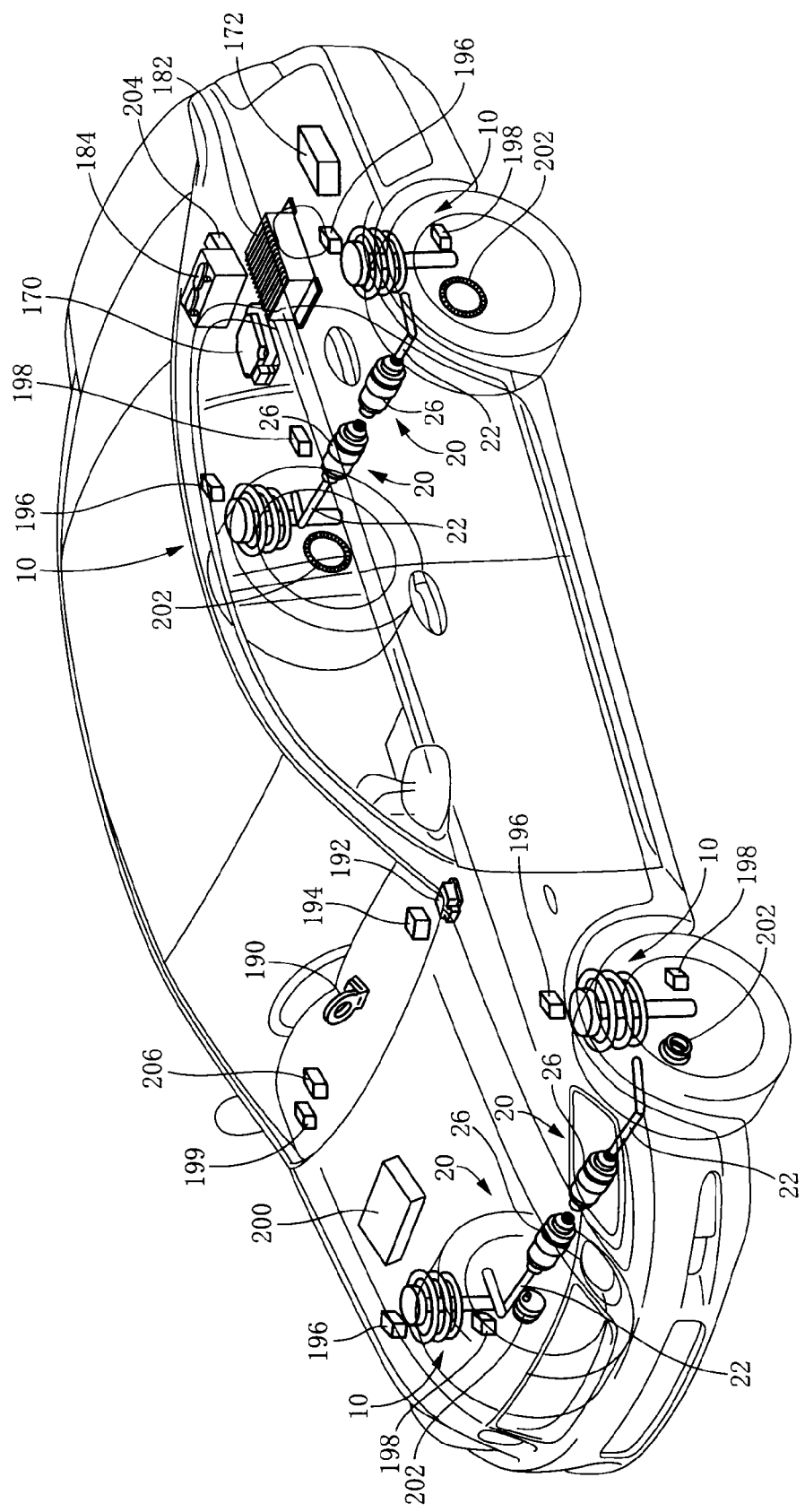
FIG. 1 is a schematical view showing an overall construction of a vehicle suspension system according to an embodiment of the claimable invention.

FIG. 1 schematically shows a vehicle suspension system according to the present embodiment. The present system is constructed to include a controller and four suspension devices 10 which are provided for respective four wheels, i.e., front right, front left, rear right and rear left wheels of the vehicle and which are controlled by the controller. The construction of the present suspension system will be described in the following description that is sectioned into a part describing construction of each of the suspension devices and a part describing construction of the controller.

(i) Construction of Suspension Device

Each suspension device 10 of the present system that is characterized, in its construction, by having a wheel-body distance adjuster device (hereinafter referred to as "adjuster device" where appropriate) 20 capable of adjusting a distance (hereinafter referred to as "wheel-body distance" where appropriate) between a body and a wheel of the vehicle. The adjuster device 20 is equipped with a generally L-shaped bar 22 and an actuator 26 configured to rotate the bar 22. Each suspension devices 10 provided for a front wheel as a steered wheel is equipped with a mechanism for allowing the wheel be steered, while each suspension devices 10 provided for a rear wheel as a non-steered wheel is not equipped with such a steering mechanism. However, since all the suspension devices 10 can be regarded to be identical in construction with one another except for presence or absence of the steering mechanism, there will be described, as a representative of the suspension devices 10, one of the suspension devices 10 that is provided for the rear wheel, in the interest of simplification of the description.

Figure 2:
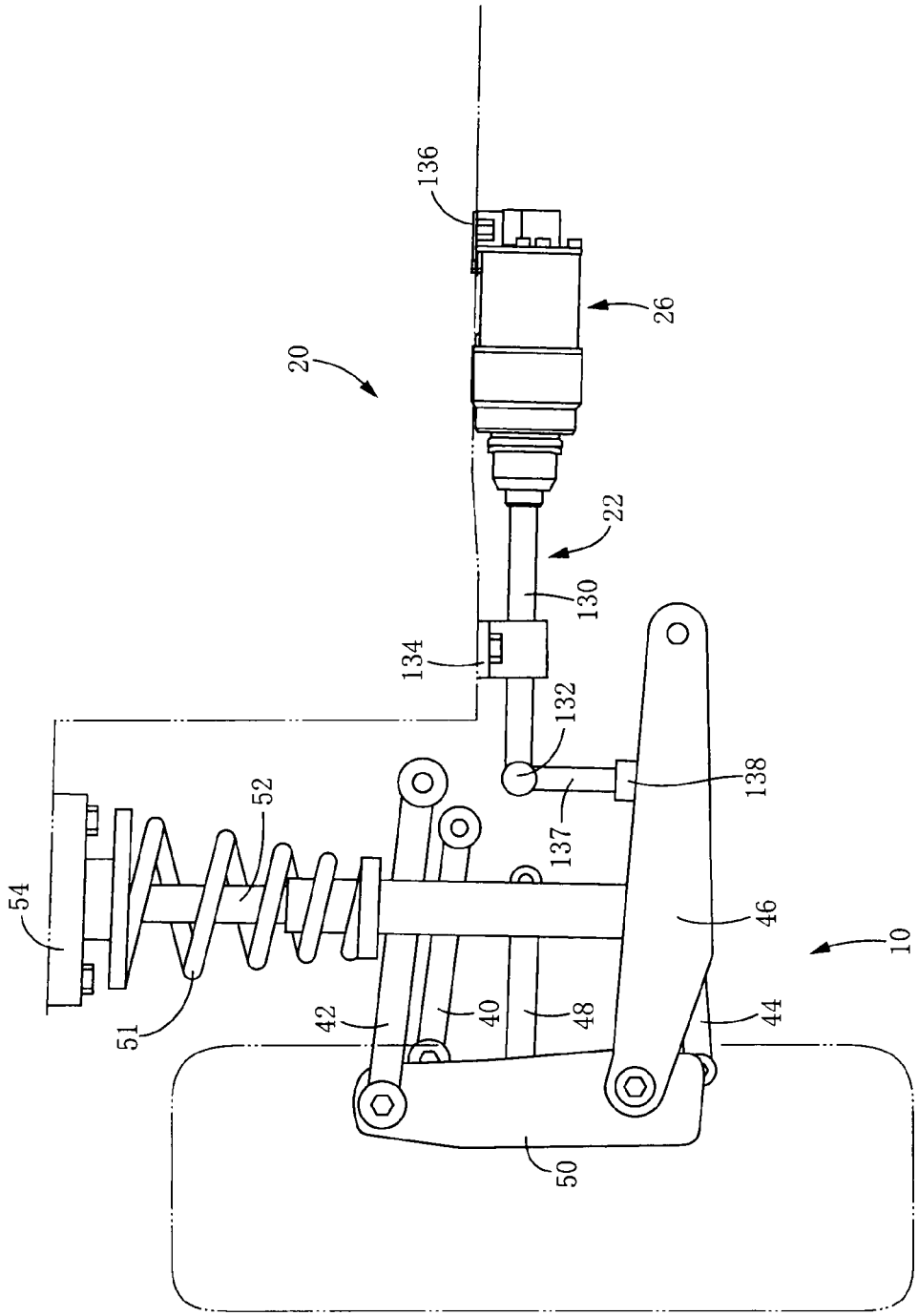
FIG. 2 is a schematical view of a suspension device that is provided in the vehicle suspension system of FIG. 1, as seen from a rear side of the vehicle.
Figure 3:
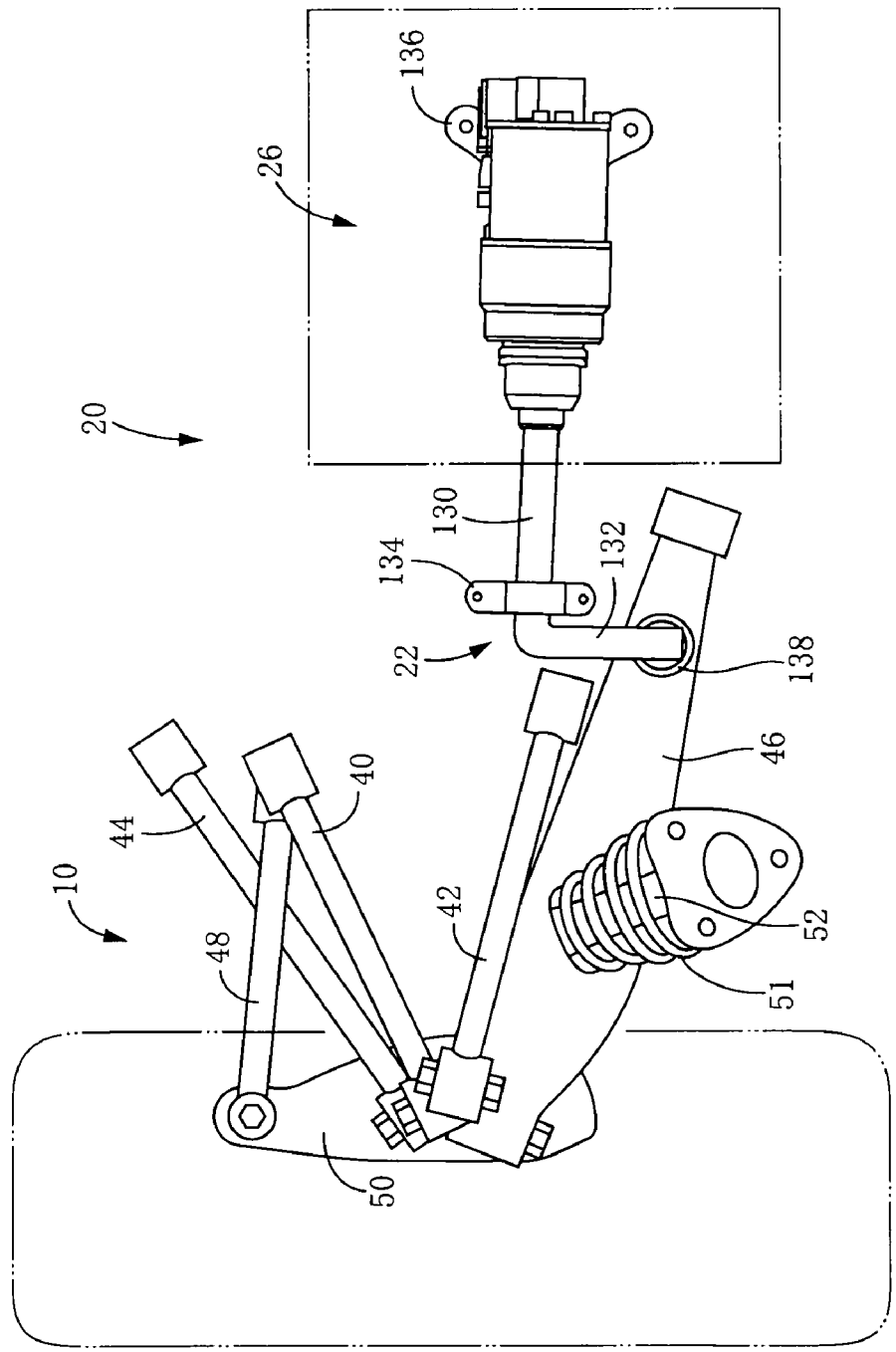
FIG. 3 is a schematical view of the suspension device that is provided in the vehicle suspension system of FIG. 1, as seen from an upper side of the vehicle.

As shown in FIGS. 2 and 3, each suspension device 10 of independent type is provided by a multi-link suspension, and is equipped with an arm assembly that includes a total of five suspension arms, i.e., a first upper arm 40, a second upper arm 42, a first lower arm 44, a second lower arm 46 and a toe control arm 48. Each of the five suspension arms 40, 42, 44, 46, 48 is connected at one of its longitudinal end portions to the vehicle body, pivotably relative to the vehicle body, and is connected at the other longitudinal end portion to an axle carrier 50 by which the wheel is rotatably held. Owing to its connection with the five suspension arms 40, 42, 44, 46, 48, the axle carrier 50 is vertically displaceable relative to the vehicle body along a constant locus.

Each suspension device 10 includes a coil spring 51 as a suspension spring and a shock absorber (hereinafter abbreviated as "absorber" where appropriate) 52. The coil spring 51 and the absorber 52 are disposed in parallel with each other between a mount portion 54 and the above-described second lower arm 46. The mount portion 54 is disposed in a tire housing which is a part of the vehicle body and which corresponds to a sprung member.

Figure 4:
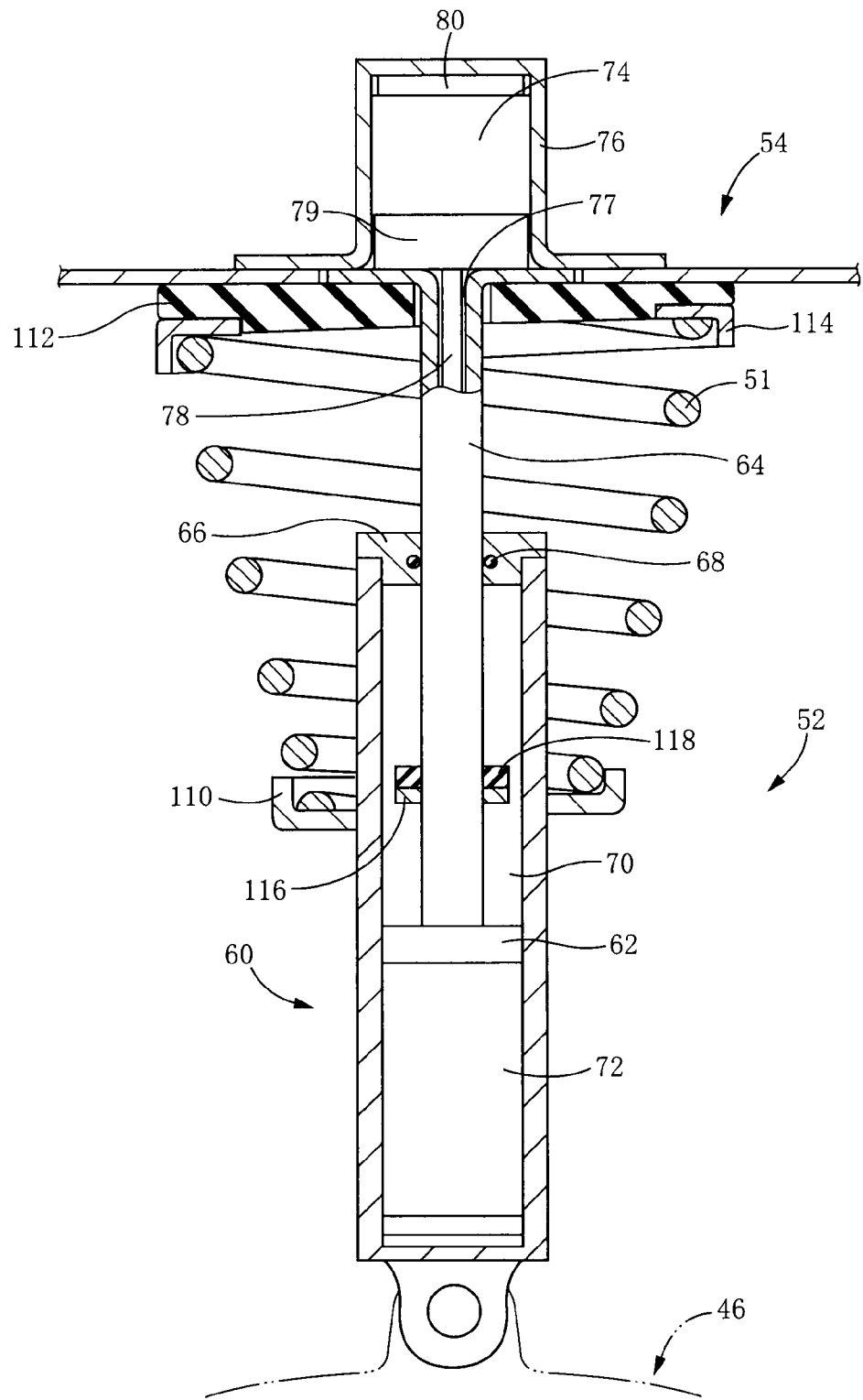
FIG. 4 is a cross sectional view showing an absorber that is provided in the suspension device.

As shown in FIG. 4, the absorber 52 is constructed to include a generally tubular-shaped housing 60, a piston 62 and a piston rod 64. The housing 60 is connected to the second lower arm 46, and accommodates a working fluid therein. The piston 62 is fluid-tightly and slidably fitted inside the housing 60. The piston rod 64 has a lower end portion connected to the piston 62, and an upper end portion projecting upwardly from the housing 60. The piston rod 64 extends through a cap portion 66 that is provided in an upper portion of the housing 60, and is in sliding contact with the cap portion 66 via a seal 68. An inside space of the housing 60 is divided by the piston 62 into an upper chamber 70 and a lower chamber 72 that are located on respective upper and lower sides of the piston 62.

Further, the absorber 52 is equipped with an electric motor 74 that is fixed relative to the mount portion 54. The electric motor 74 is fixedly accommodated in a motor casing 76 that is fixed at its flange portion onto an upper surface of the mount portion 54, whereby the electric motor 74 is fixed relative to the mount portion 54. To the flange portion of the motor casing 76, an upper end flange portion of the piston rod 64 is also fixed, whereby the piston rod 64 is fixed relative to the mount portion 54. The piston rod 64 is hollow-like shaped, so as to have a through-hole 77 extending therethrough. As described later in detail, an adjusting rod 78 is introduced in the through-hole 77 so as to be axially movable, and is connected at its upper end portion to the electric motor 74. Described in detail, a motion converter 79 is provided below the electric motor 74, and is configured to convert rotary motion of the motor 74 into axial movement. The upper end portion of the adjusting rod 78 is connected to the motion converter 79, whereby the adjusting rod 78 is axially moved by the motion of the motor 74. In the motor casing 76, a rotational angle sensor 80 is provided to detect a rotational angle of the motor 74. The rotational angle sensor 80 is constituted principally by a rotary encoder, and is used to control the motor 74, i.e., control a position of the adjusting rod 78.

Figure 5:
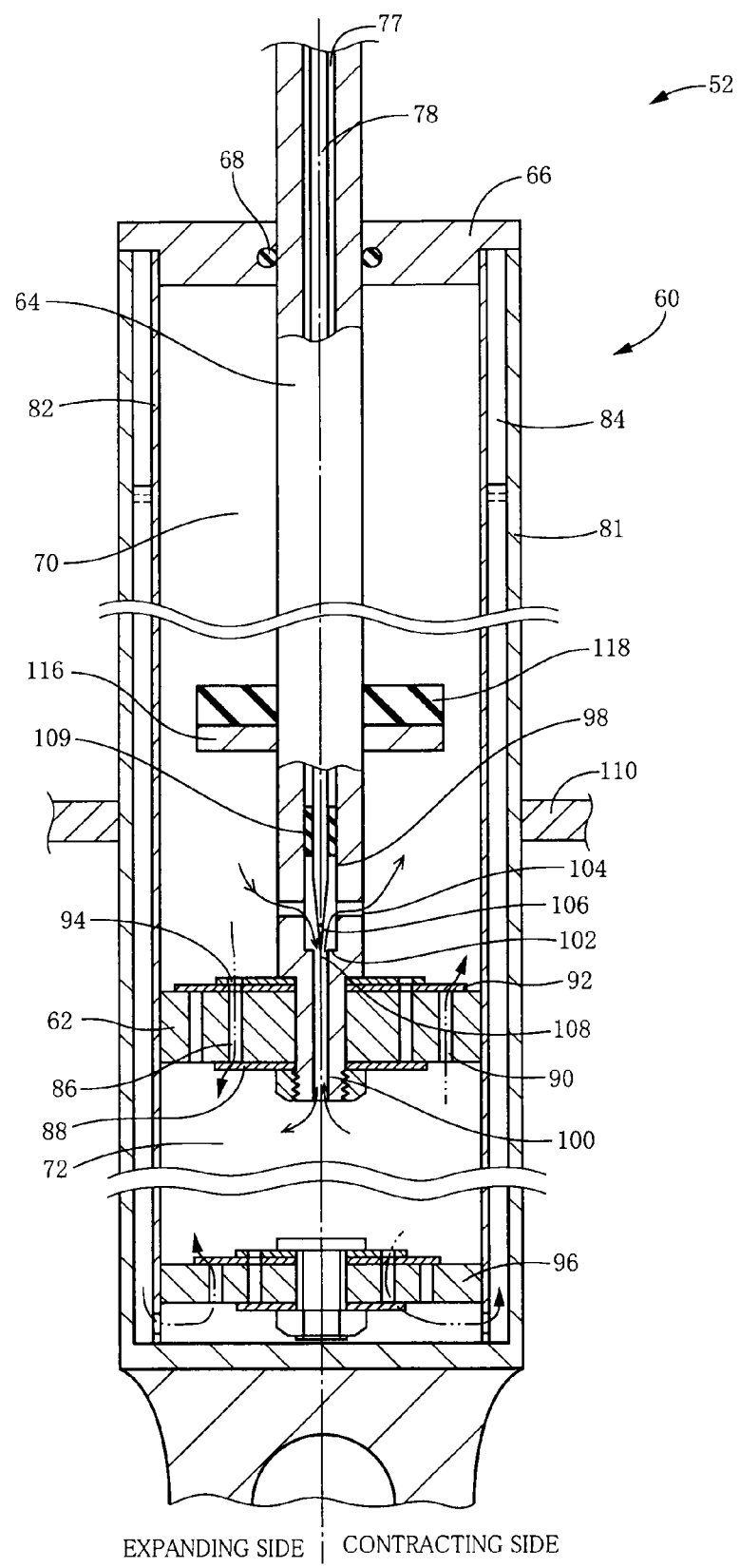
FIG. 5 is an enlarged view of the cross sectional view of the absorber of FIG. 4.

As shown in FIG. 5, the housing 60 is constructed to include an outer cylinder 81 and an inner cylinder 82 such that a buffer chamber 84 is defined between the outer and inner cylinders 81, 82. The piston 62 is fluid-tightly and slidably fitted in the inner cylinder 82, and has a plurality of communication passages 86 (two of which are illustrated in FIG. 5). The communication passages 86 axially extend through the piston 62 so as to allow communication between the upper and lower chambers 70, 72 therethrough. A circular-shaped valve plate 88 made of an elastic material is provided to be in contact with a lower surface of the piston 62, so as to close openings of the respective communication passages 86, which are on the side of the lower chamber 72. The piston 62 further has a plurality of communication passages 90 (two of which are illustrated in FIG. 5), such that the communication passages 90 are located in respective position that are different from those of the communication passages 86 in a radial direction of the piston 62. A circular-shaped valve plate 92 made of an elastic material is provided to be in contact with an upper surface of the piston 62, so as to close openings of the respective communication passages 90, which are on the side of the upper chamber 70. The positions of the respective communication passages 90 are radially outside those of the communication passages 86, and are distant from the valve plate 88, so that the communication passages 90 are constantly held in communication with the lower chamber 72. The valve plate 92 has openings 94 such that openings of the respective communication passages 86, which are on the side of the upper chamber 70, are not closed, so that the communication passages 86 are constantly held in communication with the upper chamber 70. The lower chamber 72 and the buffer chamber 84 are held in communication with each other. Between the lower chamber 72 and the buffer chamber 84, there is provided a base valve body 96 which is, as the piston 62, provided with communication passages and valve plates.

The through-holes 77 of the piston rod 64 has a large diameter portion 98 and a small diameter portion 100 that extends downwardly from the large diameter portion 98. A step surface 102 is formed in a boundary between the large diameter portion 98 and the small diameter portion 100 of the through-hole 77. A communication passage 104 is provided on an upper side of the step surface 102, so as to allow communication between the upper chamber 70 and the through-hole 77. The upper chamber 70 and the lower chamber 72 are held in communication with each other via the communication passage 104 and the through-hole 77. In the large diameter portion 98 of the through-hole 77, the above-described adjusting rod 78 is inserted from an upper end portion of the piston rod 64. The adjusting rod 78 has a lower end portion that is provided by a tapered portion 106. A distal end portion of the tapered portion 106 is introducible into the small diameter portion 100 of the through-hole 77. A clearance 108 is formed between the tapered 106 and the step surface 102 of the through-hole 77. The adjusting rod 78 has an outside diameter that is larger than an inside diameter of the small diameter portion 100 of the through-hole 77. A seal 109 is provided on an upper side of the communication passage 104, so as to be interposed between an inner circumferential surface of the through-hole 77 and an outer circumferential surface of the adjusting rod 78, for avoiding the working fluid from flowing toward an upper portion of the through-hole 77.

Owing to the construction as described above, when the piston 62 is moved upwardly, namely, when the absorber 52 is caused to expand, for example, a part of the working fluid within the upper chamber 70 flows into the lower chamber 72 through the communication passages 86 and the clearance 108 of the through-hole 77 while a part of the working fluid within the buffer chamber 84 flows into the lower chamber 72 through the communication passages of the base valve body 96. In this instance, a resistance force is applied to the piston 62 that is being upwardly moved, whereby a damping force against the upward movement of the piston 62 is generated. The resistance force applied to the upwardly moved piston 62 is based on the flow of the working fluid into the lower chamber 72 causing the valve plate 88 to be deflected, the flow of the working fluid into the lower chamber 72 causing the valve plate of the base valve body 96 to be deflected, and the flow of the working fluid into the lower chamber 72 passing through the clearance 108 of the through-hole 77. On the other hand, when the piston 62 is moved downwardly, namely, when the absorber 52 is caused to contract, for example, a part of the working fluid within the lower chamber 72 flows into the upper chamber 70 through the communication passages 90 and the clearance 108 of the through-hole 77 while flowing into the buffer chamber 84 through the communication passages of the base valve body 96. In this instance, the resistance force is applied to the piston 62 that is being downwardly moved, whereby the damping force against the downward movement of the piston 62 is generated. The resistance force applied to the downwardly moved piston 62 is based on the flow of the working fluid into the upper chamber 70 causing the valve plate 92 to be deflected, the flow of the working fluid into the buffer chamber 84 causing the valve plate of the base valve body 96 to be deflected, and the flow of the working fluid into the upper chamber 70 passing through the clearance 108 of the through-hole 77. That is, the absorber 52 is constructed to generate a damping force against relative movement of the sprung member in the form of the mount portion 54 of the vehicle body and the unsprung member in the form of the second lower arm 46.

The adjusting rod 78 is movable in the axial direction by motion of the electric motor 74, as described above, thereby making it possible to change size (width) of the clearance 108 of the through-hole 77. The resistance force is applied to the upward and downward movements of the piston 62 upon passage of the working fluid through the clearance 108, as described above, such that an amount of the resistance force is changed depending on the size of the clearance. It is therefore possible to change a damping coefficient of the absorber 52, i.e., a damping characteristic against the relative movement of the sprung and unsprung members, by change of the size of the clearance 108, which can be made by causing the adjusting rod 78 to be axially moved by the motion of the electric motor 74. Described more in detail, the motor 74 is controlled such that its actual rotational angle is equalized to a rotational angle corresponding to a desired value of the damping coefficient of the absorber 52. Owing to the construction as described above, the absorber 52 is provided with a damping coefficient changer that is constituted by at least the electric motor 74, through-hole 77, adjusting rod 78 and communication passage 104.

A lower retainer 110 having an annular shape is mounted on an outer peripheral portion of the housing 60. An upper retainer 114 having an annular shape is disposed on a lower surface of the mount portion 54, with a rubber vibration isolator 112 being interposed between the upper retainer 114 and the lower surface of the mount portion 54. The coil spring 51 is interposed between the upper and lower retainers 114, 110 so as to be supported by the retainers 114, 110. An annular member 116 is fixedly mounted on an outer peripheral portion of a portion of the piston rod 64 which is accommodated in the upper chamber 70. An annular cushion rubber 118 is bonded onto an upper surface of the annular member 116. When the vehicle body and the wheel are relatively moved in a direction away from each other (hereinafter referred to as "rebound direction" where appropriate) by a certain distance, the annular member 116 is brought into contact with a lower surface of the cap portion 66 of the housing 60 through the cushion rubber 118. On the other hand, when the vehicle body and the wheel are relatively moved in a direction toward each other (hereinafter referred to as "bound direction" where appropriate) by a certain distance, an upper surface of the cap portion 66 is brought into contact with the flange portion of the piston rod 64 through the rubber vibration isolator 112. That is, the absorber 52 has stoppers against the relative movement of the vehicle body and the wheel toward and away from each other, i.e., a bound stopper and a rebound stopper.

As shown in FIGS. 2 and 3, the L-shaped bar 22 of the adjuster device 20 includes a shaft portion 130 which extends substantially in a width direction of the vehicle, and an arm portion 132 which is contiguous to the shaft portion 130 and which extends in a direction intersecting the shaft portion 130, e.g., substantially in a rearward direction of the vehicle. The shaft portion 130 of the L-shaped bar 22 is rotatably held, at its portion that is close to the arm portion 132, by a retainer 134 that is fixed to the vehicle body. The actuator 26 is fixed through an attachment member 136 (that is provided in an end portion of the actuator 26) to a widthwise central portion of the vehicle body. The shaft portion 130 is connected at one of its longitudinal end portions (that is located on an inner side of the other of the longitudinal end portions in the width direction of the vehicle) to the actuator 26. Meanwhile, the arm portion 132 is connected at one of its longitudinal end portions (that is remote from the shaft portion 130) to the second lower arm 46 via the link rod 137. A link-rod connection portion 138 is provided on the second lower arm 46, so that the link rod 137 is rockably connected at its longitudinally opposite end portions to the link-rod connection portion 138 and the arm portion 132 of the L-shaped bar 22, respectively.

Figure 6:
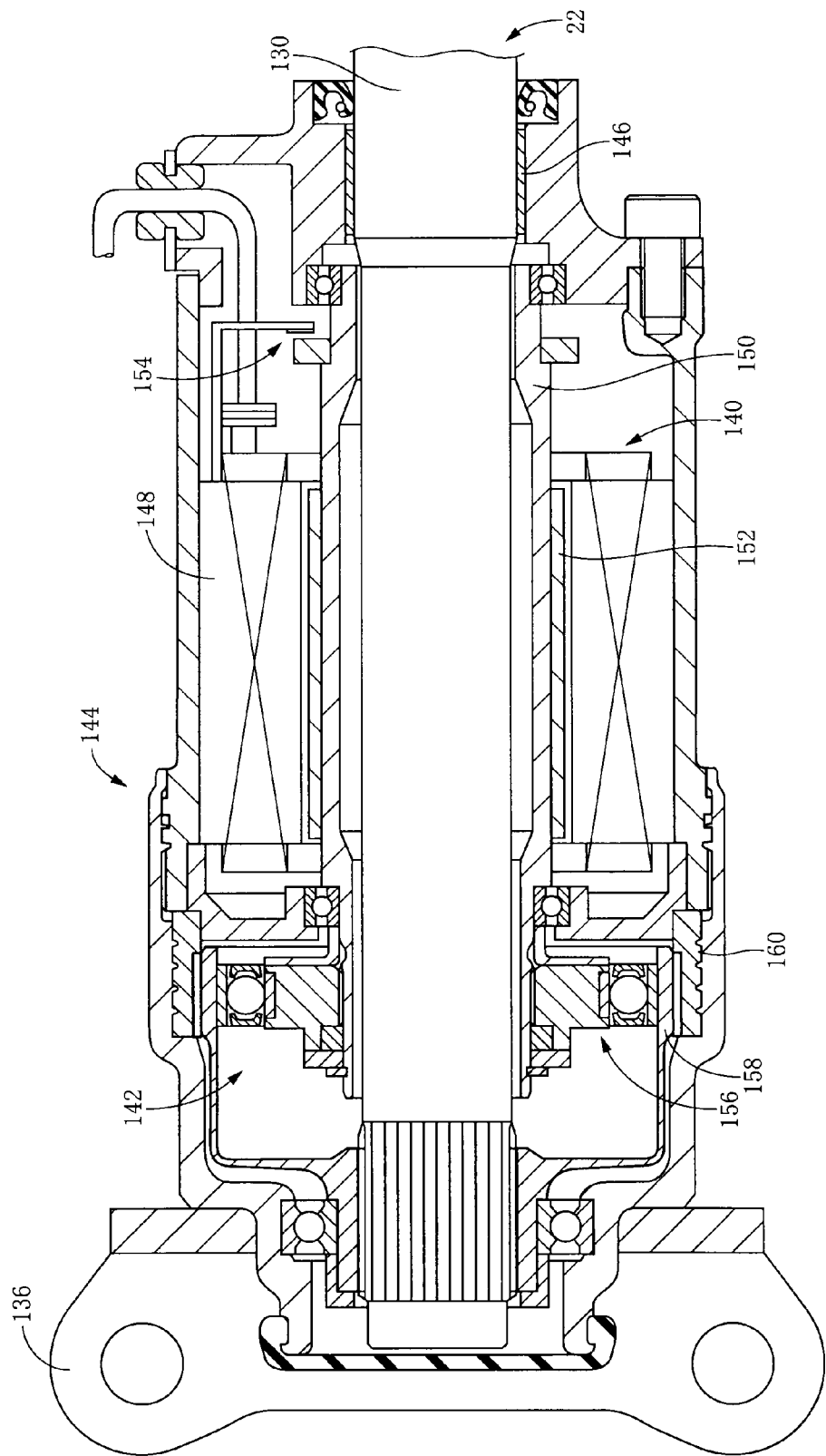
FIG. 6 is a cross sectional view showing an actuator constituting an adjuster device that is provided in the suspension device.

As shown in FIG. 6, the actuator 26 of the adjuster device 20 includes an electric motor 140 as a drive source, and a speed reducer 142 arranged to reduce a rotational speed of the electric motor 140 while outputting rotational motion of the electric motor 140. The electric motor 140 and the speed reducer 142 are disposed within a housing 144 as an outer shell member of the actuator 26. The housing 144 is fixedly attached to the vehicle body through the above-described attachment member 136 that is fixed to an end portion of the housing 144. The L-shaped bar 22 is arranged to extend throughout the housing 144 and project out from another end portion of the housing 144. The shaft portion 130 of the L-shaped bar 22 is connected, at its portion that is located within the housing 144, to the speed reducer 142, as described below in detail. A bearing bushing 146 is provided to support an axially intermediate portion of the shaft portion 130 of the L-shaped bar 22, so that the shaft portion 130 is rotatably held by the housing 144 through the bearing bushing 146.

The electric motor 140 includes a plurality of coils 148 that are fixedly disposed on a circumference along an inner surface of a circumferential wall of the housing 144, a motor shaft 150 that is provided by a hollow member rotatably held by the housing 144, and a permanent magnet 152 which is fixed to an outer circumferential surface of the motor shaft 150 and which is radially opposed to the coils 148. The electric motor 140 is provided by a three-phase DC brushless motor, so that each of the coils 148 serves as a stator while the permanent magnet 152 serves as a rotor. A rotational angle sensor 154 is provided in the housing 144, so as to detect a rotational angle of the motor shaft 150, i.e., a rotational angle of the electric motor 140. The rotational angle sensor 154 is constituted principally by a rotary encoder, and outputs a signal that is used in controlling the actuator 26, namely, controlling the adjuster device 20.

The speed reducer 142 is constituted by a harmonic gear set, and includes a wave generator 156, a flexible gear (flexspline) 158 and a ring gear (circular spline) 160. The wave generator 156 includes an elliptic cam and a ball bearing fitted on an outer circumferential surface of the elliptic cam, and is fixed to an end portion of the motor shaft 150. The flexible gear 158 is provided by a cup-shaped member having a circumferential wall portion that is elastically deformable, and a plurality of teeth (e.g., a total of 400 teeth in the present speed reducer 142) formed on its outer circumferential surface. The teeth are located in one of axially opposite end portions of the flexible gear 158 that is close to an opening end of the cup-shaped flexible gear 158. The flexible gear 158 is connected to a gear connection portion of the shaft portion 130 of the L-shaped bar 22, so as to be held by the shaft portion 20. Described more in detail, the shaft portion 130 of the L-shaped bar 22 is arranged to extend throughout the motor shaft 150 provided by the hollow member. The above-described gear connection portion of the shaft portion 130 projects out from the motor shaft 150, and extends through a hole formed through a bottom wall of the cup-shaped flexible gear 158. The gear connection portion of the shaft portion 130 is serrated on its outer circumferential surface so as to be held in engagement with an inner circumferential surface of the hole formed through the bottom wall of the cup-shaped flexible gear 158 that is also serrated. Owing to the serration engagement, the shaft portion 130 and the flexible gear 158 are connected to each other, and are unrotatable relative to each other. The ring gear 160 is provided by a ring member fixed to the housing 144, and has a plurality of teeth (e.g., a total of 402 teeth in the present speed reducer 142) formed on its inner circumferential surface. The flexible gear 158 is fitted at its circumferential wall portion on the wave generator 156, and is elastically deformed to have an elliptic shape. The flexible gear 158 meshes, at two portions thereof that lie substantially on a long axis of the elliptic shape, with the ring gear 160, while not meshing at the other portions thereof with the ring gear 160.

In the thus constructed speed reducer 142, while the wave generator 156 is rotated by a single rotation (by 360°), namely, while the motor shaft 150 of the electric motor 140 is rotated by a single rotation, the flexible gear 158 and the ring gear 160 are rotated relative to each other by an amount corresponding to two teeth, i.e., a difference therebetween with respect to the number of teeth, so that the speed reducer 142 has a speed ratio of 1/200. This speed ratio of 1/200 is a relatively low speed ratio, and means that a rotational speed of the actuator 26 relative to a rotational speed of the motor 140 is relatively low. Owing to the low speed ratio, the motor 140 of the present actuator 26 can be made compact in size. Further, owing to the low speed ratio, the present actuator 26 is made hard to be actuated by an external force.

When the electric motor 140 is driven, the L-shaped bar 22 is rotated by a motor force that is generated by the motor 140, whereby the shaft portion 130 of the L-shaped bar 22 is twisted. As a result of the twisting deformation of the shaft portion 130, a reaction is generated and then transmitted to the second lower arm 46 via the arm portion 132, link rod 137 and link-rod connection portion 138. This reaction acts as a displacement force forcing upwardly or downwardly a distal end portion of the second lower arm 46 toward or away from the vehicle body, namely, forcing the wheel and the vehicle body toward each other or away from each other. That is, an actuator force, which is a force generated by the actuator 26, acts as the displacement force through the L-shaped bar 22 serving as an elastic body. In this respect, the adjuster device 20 can be considered to have a function serving as a displacement force generator that is operable to generate the displacement force. By adjusting an amount of the displacement force, it is possible to adjust a vertical distance between the vehicle body and the wheel.

Figure 7:
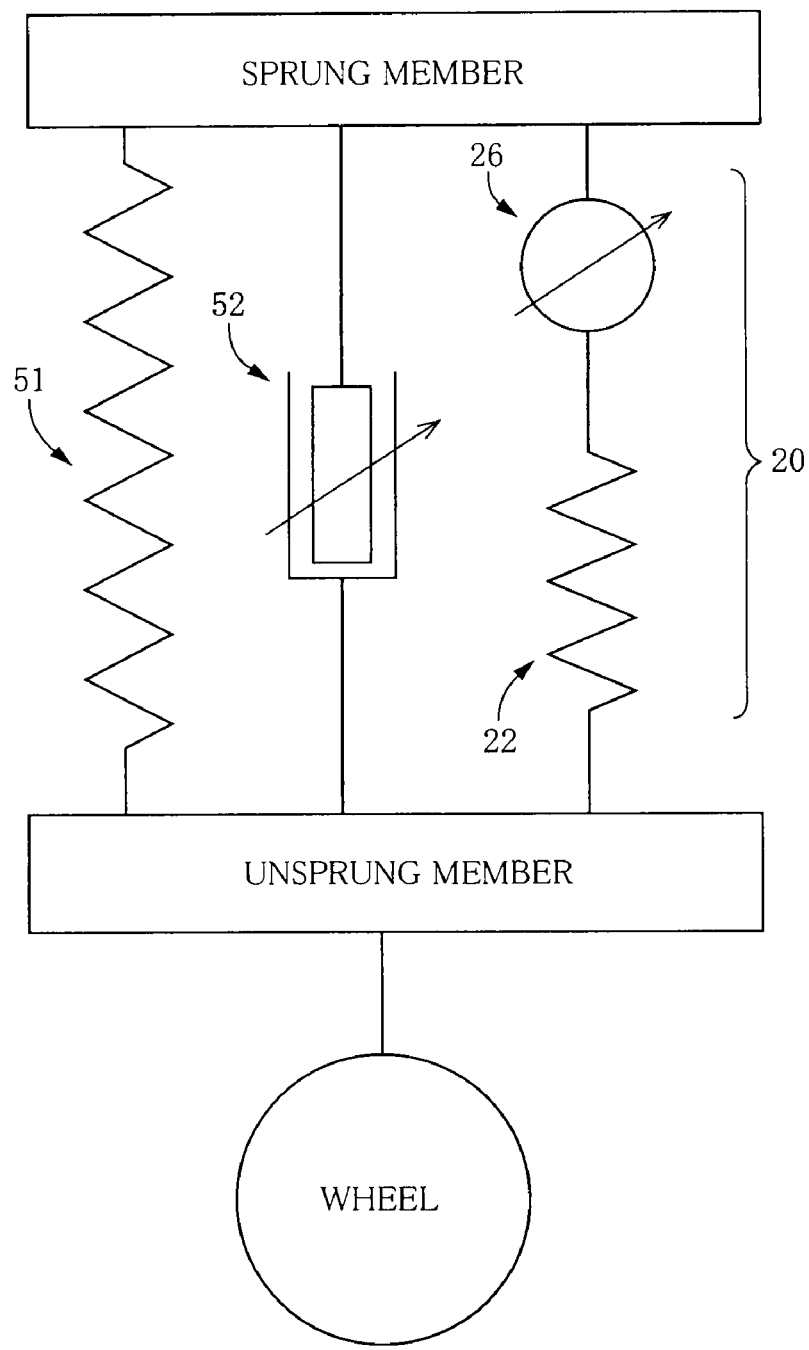
FIG. 7 is a view conceptually showing the suspension device.

Each suspension device 10 has a construction that is conceptually illustrated in FIG. 7. As is understood from FIG. 7, the coil spring 51, absorber 52 and adjuster device 20 are disposed in parallel with one another between a part of the vehicle body as the sprung member including the mount portion 54 and the unsprung member including the second lower arm 36. The adjuster device 20 is constituted by the L-shaped bar 22 (serving as the elastic body) and the actuator 26 that are disposed in series with each other between the sprung and unsprung members. In other words, the L-shaped bar 22 is disposed in parallel with the coil spring 51 and the absorber 52, and the actuator 26 is disposed between the L-shaped bar 22 and the mount portion 54 (as the part of the vehicle body) so as to interconnect the L-shaped bar 22 and the mount portion 54.

As described above, the absorber 52 is capable of changing an amount of the damping force that is generated by itself. Described in detail, the absorber 52 is capable of changing the damping coefficient which serves as a basis for the amount of the generated damping force, namely, changing its own ability for generating the damping force. On the other hand, each adjuster device 20 is configured to generate the displacement force forcing the sprung and unsprung members of the vehicle to be displaced toward or away from each other, and is capable of changing an amount of the displacement force. Described specifically, in each adjuster device 20, the actuator 26 causes the L-shaped bar 22 as the elastic body to be deformed by the actuator force based on the motor force, namely, causes the shaft portion 130 of the L-shaped bar 22 to be twisted by the actuator force, so that the actuator force serves as the displacement force that is applied to the sprung and unsprung members of the vehicle via the L-shaped bar 22. The amount of deformation of the L-shaped bar 22, i.e., the amount of twisting deformation of the shaft portion 130 corresponds to the amount of actuation of the actuator 26 and also the amount of the actuator force. Since the displacement force is based on an elastic force generated by the deformation of the L-shaped bar 22, the amount of the displacement force corresponds to the amount of actuation of the actuator 26 and the amount of the actuator force. Therefore, the amount of the displacement force can be changed by changing at least one of the amount of actuation of the actuator 26 and the amount of the actuator force. In the present suspension system, in view of control responsiveness, the displacement force is controlled by controlling directly the amount of actuation of the actuator 26. It is noted that, since the amount of actuation of the actuator 26 corresponds to the rotational angle of the electric motor 140, the actual control is executed by controlling directly the amount of rotational angle of the motor 140.

ii) Construction of Controller

In the present suspension system, as shown in FIG. 1, an adjuster electronic control unit (adjuster ECU) 170 is provided for controlling the four adjuster devices 20, and an absorber electronic control unit (absorber ECU) 172 is provided for controlling the four absorbers 52. Thus, the controller of the present suspension system is constructed to include the two ECUs 170, 172.

Figure 28:
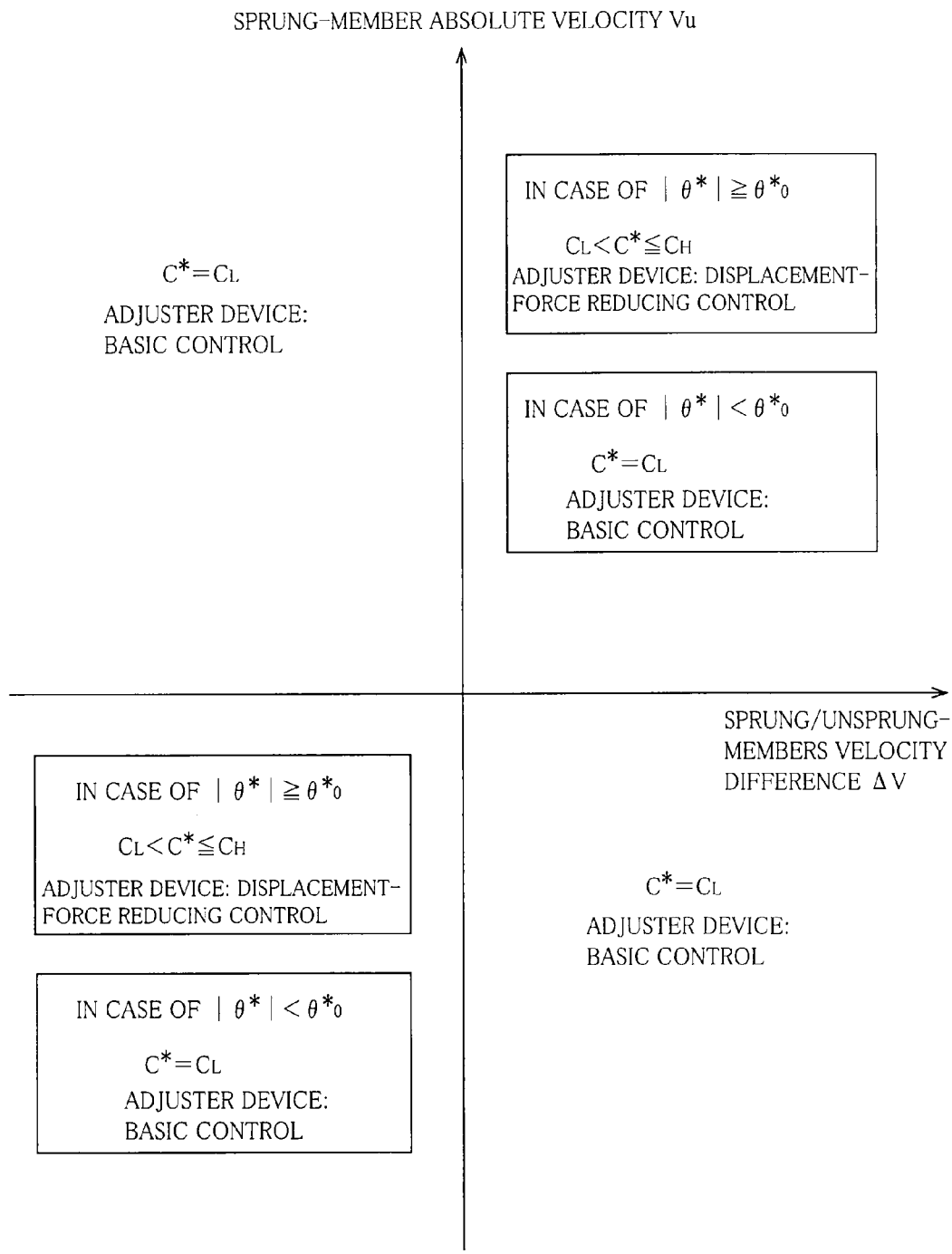
FIG. 28 is a chart conceptually showing a relationship among sprung/unsprung-members velocity difference, sprung-member absolute velocity, execution of damping-coefficient increasing control and execution of displacement-force reducing control, when the first adjuster-device controlling routine program and the fourth absorber controlling routine program are combined to each other.

The adjuster ECU 170 is configured to control actuations of the actuators 26 of the respective adjuster devices 20, and includes four inverters 174 serving as drive circuits for the electric motors 70 of the respective actuators 26 and an adjuster controller 176 that is constituted principally by a computer including CPU, ROM and RAM. Meanwhile, the absorber ECU 172 is configured to control operations of the electric motors 74 of the respective absorbers 52, and includes four inverters 178 serving as drive circuits and an absorber controller 180 that is constituted principally by a computer including CPU, ROM and RAM (see FIG. 28). The inverters 174, 178 are connected to a battery 184 via a converter 182. The inverters 174 are connected to the electric motors 140 of the respective adjuster devices 20. The inverters 178 are connected to the electric motors 74 of the respective absorbers 52.

Each of the electric motors 140 included in the actuators 26 of the respective adjuster devices 20 is driven by a constant voltage, and an amount of the electric power supplied to each electric motor 140 is changed by changing an amount of electric current supplied to each electric motor 140. The amount of the supplied electric power is changed by changing a ratio (i.e., duty ratio) of pulse ON time to a sum of the pulse ON time and pulse OFF time in PWM (pulse width modulation) control that is performed by the corresponding inverter 174. It is noted that, as described later in detail, each electric motor 140 is constructed to be capable of generating the electric power based on an electromotive force generated upon motion of the motor 140 that is caused by an external force applied thereto, and the inverter 174 and the converter 182 are capable of returning the generated electric power to the battery 184.

To the adjuster controller 176, there are connected a steering sensor 190, a lateral acceleration sensor 192, a longitudinal acceleration sensor 194, a vertical acceleration sensor 196, a vertical acceleration sensor 198 and an adjuster-device-controlling-program selection switch 199, in addition to the above-described rotational angle sensors 154. The steering sensor 190 is arranged to detect an operating angle of a steering wheel as a steering operating member, i.e., an operating amount (as a kind of a steering amount) of the steering wheel. The lateral acceleration sensor 192 is arranged to detect an actual acceleration of the vehicle body as measured in the lateral direction of the vehicle. The longitudinal acceleration sensor 194 is arranged to detect the actual acceleration of the vehicle body as measured in the longitudinal direction of the vehicle. The vertical acceleration sensor 196 is provided in the mount portion 54 of the vehicle body, and is arranged to detect a sprung-member vertical acceleration, i.e., the actual acceleration of the vehicle body as measured in the vertical direction of the vehicle. The vertical acceleration sensor 198 is provided in the second lower arm 46, and is arranged to detect an unsprung-member vertical acceleration, i.e., the actual acceleration of the second lower arm 46 as measured in the vertical direction of the vehicle. The adjuster-device-controlling-program selection switch 199 is provided to select one of routine programs that are described later. To the adjuster controller 176, there is further connected a brake electronic control unit (brake ECU) 200 which is provided for controlling a brake system of the vehicle. To the brake ECU 200, there are connected four wheel speed sensors 202 each of which is provided to detect a rotational speed of a corresponding one of the four wheels, so that the brake ECU 200 has a function of estimating a running speed (hereinafter referred to as "vehicle speed" where appropriate) of the vehicle based on the values detected by the wheel speed sensors 202. The adjuster controller 176 is configured to obtain the vehicle speed from the brake ECU 200, as needed. Further, the adjuster controller 176 is connected to the inverter 102, so as to control the adjuster device 20 by controlling the inverter 102. It is noted that the ROM included in the computer of the adjuster controller 176 stores therein programs and various data used for controlling the adjuster device 20.

To the absorber controller 180, there are connected a charge level sensor 204 and an absorber-controlling-program selection switch 206, in addition to the above-described rotational angle sensor 80 and vertical acceleration sensors 196, 198. The charge level sensor 204 is provided to detect a charge level of the battery 184 (i.e., an amount of the charged electric energy remaining in the battery 184). The absorber-controlling-program selection switch 206 is provided to select one of routine programs that are described later. Further, the absorber controller 180 is connected to the inverter 178, so as to control the absorber 52 by controlling the inverter 178. It is noted that the ROM included in the computer of the absorber 180 stores therein programs and various data used for controlling the absorber 52. The adjuster controller 176 and the absorber controller 180 are connected to each other, so that the controllers 176, 180 can be brought into communication with each other. Thus, for example, information and commands regarding the control of the suspension system are transmitted between the controllers 176, 180, as needed.

<<Operational Modes of Electric Motor of Adjuster Device>>

Figure 8:
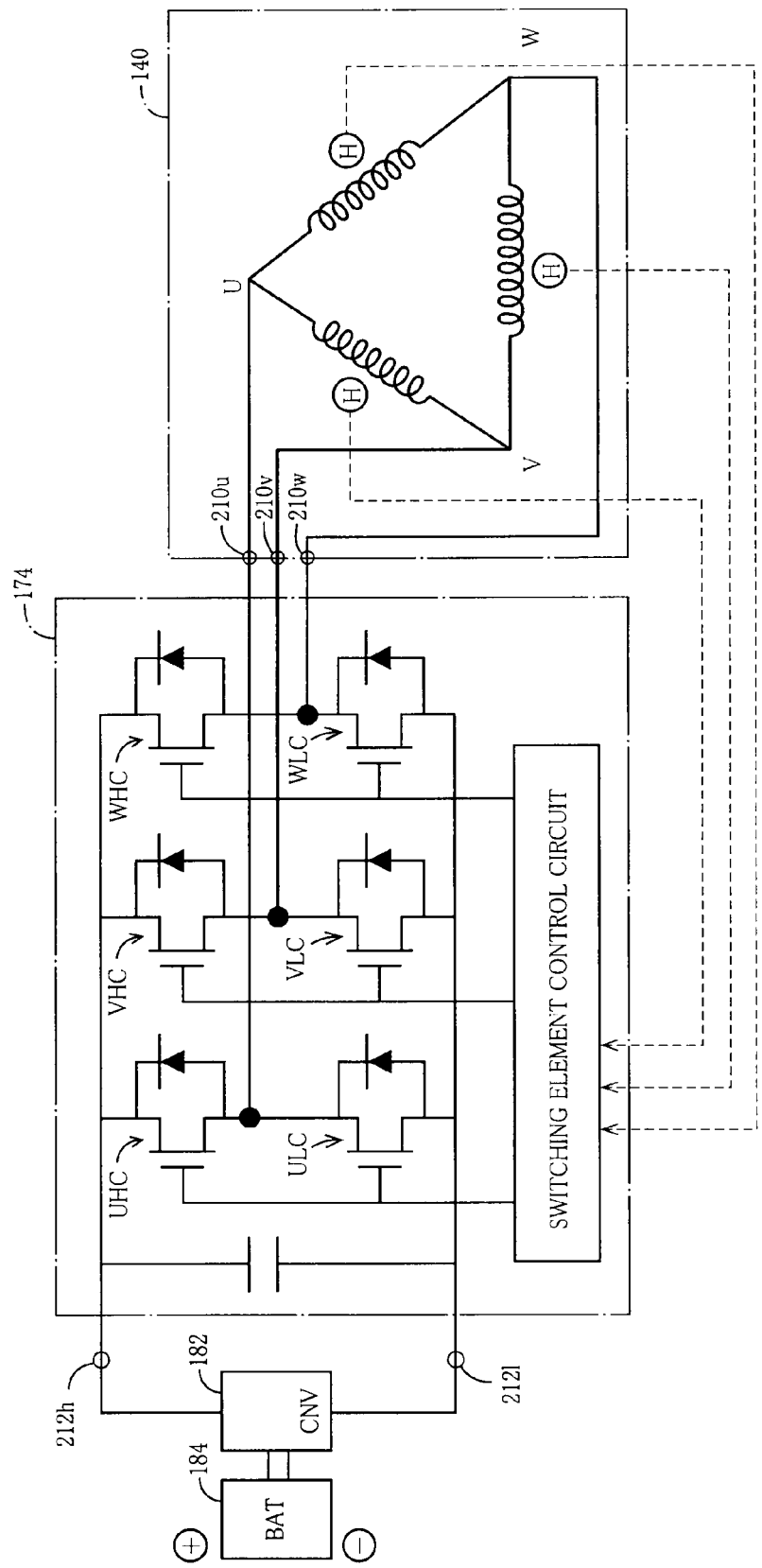
FIG. 8 is a circuit diagram showing an inverter which is provided in the vehicle suspension system of FIG. 1 and which is connected to an electric motor shown in FIG. 6.

As shown in FIG. 8, the electric motor 140 of the actuator 26 included in the adjuster device 20 is a delta-connected three-phase DC brushless motor, and has terminals 210$u$, 210$v$, 210$w$ (hereinafter generally referred to as "terminals 210" where appropriate) that correspond to respective phases (U, V, W). The inverter 174 has a total of six switching elements UHC, ULC, VHC, VLC, WHC, WLC that are disposed between the electric motor 140 and an electric-power supply source (that is provided by the battery 184 and the converter 182). The switching element UHC is disposed between a high-level voltage terminal 212$h$ of the electric-power supply source and the terminal 210$u$, such that the high-level voltage terminal 212$h$ and the terminal 210$u$ are selectively connected to and disconnected from each other by operation of the switching element UHC. The switching element ULC is disposed between a low-level voltage terminal 212$l$ of the electric-power supply source and the terminal 210$u$. The switching element VHC is disposed between the high-level voltage terminal 212$h$ and the terminal 210$v$. The switching element VLC is disposed between the low-level voltage terminal 212$l$ and the terminal 210$v$. The switching element WHC is disposed between the high-level voltage terminal 212$h$ and the terminal 210$w$. The switching element WLC is disposed between the low-level voltage terminal 212$l$ and the terminal 210$w$. A switching element control circuit of the inverter 174 is operable to determine a rotational angle (electrical angle) of the electric motor 140 based on signals detected by respective three Hall elements $H_A$, $H_B$, $H_C$ (each indicated by reference "H" in FIG. 8) provided in the electric motor, and to control the switching elements UHC, ULC, VHC, VLC, WHC, WLC such that each switching element is placed in one of ON and OFF states that is selected based on the determined rotational angle of the electric motor 140.

In the present suspension system, the electric motor 140 is placeable in four operational modes, and is operable with one of the four operational modes that is selected according to at least one predetermined condition. Each of the operational modes of the electric motor 140 is defined by an operational state of the inverter 174, i.e., the selected operational state of each switching element. That is, the selected operational mode of the electric motor 140 is changed by changing the selected operational state of at least one of the switching elements of the inverter 174.

The operational modes of the electric motor 140 can be classified into two kinds of modes, one of which is a controlled-power supplying mode in which the electric power is supplied from the battery 184 to the electric motor 140, and the other of which is a no-power supplying mode in which the electric power is not supplied from the battery 184 to the electric motor 140. In the present system, the four operational modes of the electric motor 140 consist of the controlled-power supplying mode and also three no-power supplying modes in the form of a standby mode, a braking mode and a free mode, which will be described below.

(A) Controlled-Power Supplying Mode

In this controlled-power supplying mode, the ON/OFF state of each of the switching elements UHC, ULC, VHC, VLC, WHC, WLC is changed based on the detected rotational angle of the electric motor 140 in a so-called 120° rectangular-wave drive system, as shown in FIG. 9. In the present embodiment, only the three switching elements ULC, VLC, WLC (that are connected to the low-level voltage terminal 124$l$ of the electric-power supply source) are subjected to a duty-ratio control, and the amount of electric current supplied to the electric motor 140 is changed by changing the duty ratio. In FIG. 9, "1*" indicates that the switching element in question is subjected to the duty-ratio control. It is noted that combination of selected operational states of the switching elements varies depending on which one of opposite directions the generated motor force acts in. One of the opposite directions will be referred to as clockwise direction (CW direction) while the other of the opposite directions will be referred to as counterclockwise direction (CCW direction), for convenience of the description.

In the controlled-power supplying mode, the direction of the motor force generated by the electric motor 140 and the amount of the electric power supplied to the electric motor 140 are controllable thereby enabling the electric motor 140 to generate a desired amount of the motor force (that is dependent on the supplied electric power) such that the generated motor force acts in a desired direction. It is therefore possible to control the direction and amount of the displacement force generated by the adjuster device 20.

(B) Standby Mode

In the standby mode, the ON/OFF state of each switching element is changed according to a command indicative of a desired direction of generation of the motor force although the electric power is not supplied from the electric-power supply source to the electric motor 140. As shown in FIG. 9, the ON/OFF state of each switching element is changed based on the rotational angle of the electric motor 140, like in the controlled-power supplying mode. However, unlike in the controlled-power supplying mode, any one of the three switching elements ULC, VLC, WLC (that are connected to the low-level voltage terminal 212l of the electric-power supply source) is not subjected to the duty-ratio control. In other words, each of the three switching elements ULC, VLC, WLC is subjected to the duty-ratio control, such that the duty ratio is held 0 (zero). That is, each of the three switching elements ULC, VLC, WLC is practically held in the OFF state (open state) due to absence of pulse ON time, so that the electric power is not supplied to the motor 140 in this standby mode. In FIG. 9, "0*" indicates that the switching element in question is placed in the state with the duty ratio of 0 (zero). Described specifically, by placing only one of the switching elements UHC, VHC, WHC in the ON state (closed state), there is established an electric continuity between one of the three terminals 210 of the motor 140 and the high-level voltage terminal 212h of the electric-power supply source. This standby mode, in which the ON/OFF state of each switching element is thus changed, can be considered as a kind of specific-motor-terminal/power-supply-terminal connecting mode. As in the controlled-power supplying mode, in this stand-by mode, there are CW direction and CCW direction as the motor-force generating direction.

In the standby mode, the motion of the electric motor 140 can not be controlled since the electric power is not supplied to the motor 140. However, a certain amount of the electromotive force can be generated upon rotation of the motor 140 that is caused by application of an external force thereto, by selecting a combination of the operational states of the switching elements which causes the motor-force generating direction to be opposite to the actual rotation of the motor 140. In this case, the rotation of the electric motor 140 is somewhat braked whereby a resistance to the actuation of the actuator 26 is generated. A degree of the braking effect obtained in this standby mode is intermediate between those obtained in the braking mode and free mode that are described below.

(C) Braking Mode

The braking mode, in which the terminals 210u, 210v, 210w of the electric motor 140 are electrically connected to one another, can be considered as a kind of motor-terminals connecting mode. In this braking mode, three of the switching elements which are connected to the one of the high-level and low-level voltage terminals 212h, 212l are all held in the ON states while three of the switching elements which are connected to the other of the high-level and low-level voltage terminals 212h, 212l are all held in the OFF states. Specifically, in the present system, the switching elements UHC, VHC, WHC (that are connected to the high-level voltage terminal 212h of the electric-power supply source) are all held in the ON states while the switching elements ULC, VLC, WLC (that are connected to the low-level voltage terminal 212l of the electric-power supply source) are all held in the OFF states, as shown in FIG. 9. Owing to the switching elements UHC, VHC, WHC held in the ON states, the motor 140 is placed in a state in which as if the phases of the motor 140 were short-circuited to one another. In this state, the rotation of the motor 140 is braked by the short circuit. Therefore, the actuator 26 generates a relatively large resistance, when being forced by an external force to be actuated at a high speed, irrespective of direction of the rotation of the motor 140.

(D) Free Mode

In the free mode, the electric motor 140 is placed in a state in which as if the terminals 210 of the electric motor 140 were opened. This free mode can be considered as a kind of motor-terminals disconnecting mode. Specifically described, as shown in FIG. 9, the switching elements UHC, ULC, VHC, VLC, WHC, WLC are all held in the OFF states irrespective of the rotational angle of the electric motor 140, whereby the electromotive force is not substantially generated in the motor 140 so that the motor 140 provides no or little braking effect. Therefore, while the motor 140 is being placed in this free mode, the actuator 26 is actuated by an external force applied thereto, without substantial resistance against the actuation owing to the external force.

<<Positive/Negative Efficiencies of Actuator of Adjuster Device>>

There will be described an efficiency of the actuator 26 included in the adjuster device 20, which is categorized into a positive efficiency and a negative efficiency. The actuator negative efficiency (hereinafter simply referred to as "negative efficiency" where appropriate) $\eta_N$ corresponds to a parameter indicative of an amount of the motor force minimally required to inhibit the rotation of the electric motor 140 that could be caused by an external force acting on the motor 140. More precisely, the negative efficiency $\eta_N$ is defined as a ratio of the amount of the motor force minimally required to inhibit the rotation of the motor 140 caused by the external force, to an amount of the external force. On the other hand, the actuator positive efficiency (hereinafter simply referred to as "positive efficiency" where appropriate) $\eta_P$ corresponds to a parameter indicative of the amount of the motor force minimally required to cause the shaft portion 130 of the L-shaped bar 22 to be rotated against the external force. More precisely, the positive efficiency $\eta_P$ is defined as a ratio of an amount of the external force, to the amount of the motor force minimally required to cause the rotation of the shaft portion 130. The positive efficiency $\eta_P$ and the negative efficiency $\eta_N$ can be expressed by respective expressions as follows:

Positive efficiency $\eta_P = Fa/Fm$

Negative efficiency $\eta_N = Fm/Fa$, where "Fa" represents the actuator force (that may be considered as actuator torque), and "Fm" represents the motor force (that may be considered as motor torque) generated by the motor 140.

Figure 10:
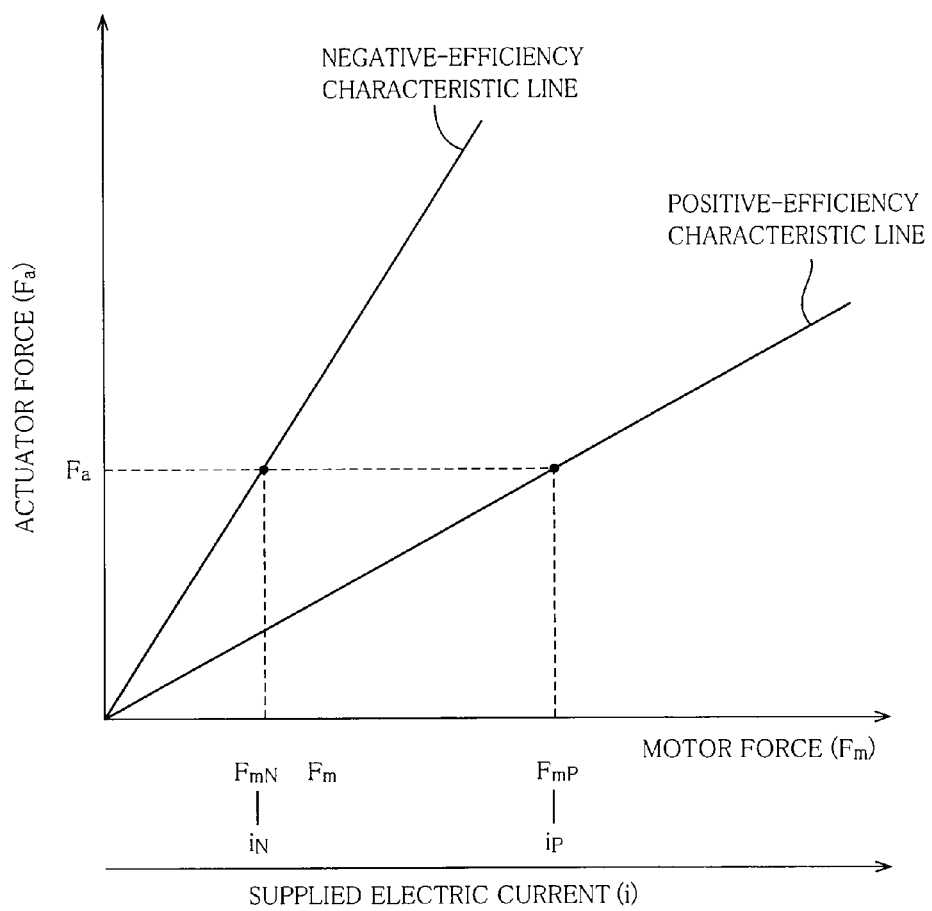
FIG. 10 is a graph conceptually showing a positive efficiency and a negative efficiency of the actuator in the embodiment.

As shown in FIG. 10 that represents a relationship between the motor force and the actuator force, the positive efficiency $\eta_P$ corresponds to an inclination of a positive-efficiency characteristic line that is shown in FIG. 10, while the negative efficiency $\eta_N$ corresponds to an inverse of an inclination of a negative-efficiency characteristic line that is also shown in FIG. 10. As is understood from FIG. 10, for producing the same amount of the actuator force Fa, the motor force amount Fm$_P$ of the motor 140 required under the positive efficiency characteristic is considerably different from the motor force amount Fm$_N$ of the motor 140 required under the negative efficiency characteristic (Fm$_P$>Fm$_N$).

A positive/negative efficiency product $\eta_P \cdot \eta_N$, which is defined as a product of the positive efficiency $\eta_P$ and the negative efficiency $\eta_N$, can be considered as a ratio of an amount of the motor force minimally required to inhibit an actuation of the actuator caused by a certain amount of the external force, to an amount of the motor force minimally required to cause the actuation of the actuator against the certain amount of the external force. Therefore, a low value of the positive/negative efficiency product $\eta_P \cdot \eta_N$ indicates that a low ratio of the motor force amount Fm$_N$ required under the negative efficiency characteristic to the motor force amount Fm$_P$ of the motor 140 required under the positive efficiency characteristic. That is, a low value of the positive/negative efficiency product indicates that the actuator is hard to be actuated by the external force.

As is understood from FIG. 10, the positive/negative efficiency product $\eta_P \cdot \eta_N$ is relative low, specifically, ⅓ in the present actuator 26, so that the actuator 26 is relatively hard to be actuated by the external force. Owing to the relatively low value of the positive/negative efficiency product $\eta_P \cdot \eta_N$, the required amount of the motor force can be made smaller when the rotational angle of the actuator 26 is to be maintained under application of the external force thereto, than when the actuator 26 is to be rotated against the external force. Since it can be considered that the motor force is proportional to an electric power supplied to the motor, it is possible to remarkably reduce consumption of the electric power in the present actuator 26 in which the positive/negative efficiency product $\eta_P \cdot \eta_N$ is relatively low.

<<Controls of Suspension System for Vehicle>>

(i) Basic Controls of Adjuster Device

In the present suspension system, the displacement forces generated by the respective adjuster devices 20 are controllable independently of each other, thereby making it possible to execute a control (hereinafter referred to as "vibration damping control" where appropriate) for damping vibration of each of the sprung members which correspond to the respective adjuster devices 20, a control (hereinafter referred to as "roll restraining control" where appropriate) for restraining roll of the vehicle body, and a control (hereinafter referred to as "pitch restraining control" where appropriate) for restraining pitch of the vehicle body. In the present system, normally, a total control integrating these three controls is executed. During execution of this total control, in each adjuster device 20, the rotational angle of the electric motor 140 is controlled based on, for example, a motion velocity of the sprung member and roll and pitch moments received by the vehicle body, such that a suitable amount of displacement force is generated by the adjuster device 20. Described in detail, a target rotational angle of the motor 140 is determined based on the motion velocity of the sprung member and the roll and pitch moments received by the vehicle body, and the motor 140 is controlled such that an actual rotational angle of the motor 140 is equalized to the target rotational angle. It is noted that each of the vibration damping control, roll restraining control and pitch restraining control can be considered as a kind of vehicle-body posture control since these controls are executed for controlling posture of the vehicle body.

In the present system, the target rotational angle of the electric motor 140 is determined as a sum of a plurality of components of the target rotational angle which are respectively directed to the vibration damping control, roll restraining control and pitch restraining control. The plurality of components of the target rotational angle of the motor 140 include:

a vibration damping target rotational angle component (vibration damping component) $\theta^*_S$;

a roll restraining target rotational angle component (roll restraining component) $\theta^*_R$; and a pitch restraining target rotational angle component (pitch restraining component) $\theta^*_P$.

In the following description relating to the vibration damping control, roll restraining control and pitch restraining control, there will be described processes of determining the above-described components $\theta^*_S$, $\theta^*_R$, $\theta^*_P$ of the target rotational angle of the motor 140 and also a process of determining an amount of electric power that is to be supplied to the motor 140 based on the target rotational angle of the motor 140.

In the following description, the rotational angle $\theta$ of the electric motor 140 represents a displaced angle (that can exceed 360°) by which the motor 140 is displaced from its reference angle ($\theta=0°$) in a reference state in which it can be regarded that roll and pitch moments do not substantially act on the vehicle body and that vibration is no caused in the vehicle body and wheel. A positive (+) value of the rotational angle $\theta$ of the motor 140 means that the motor 140 is rotated from the reference angle in a direction that causes the displacement force to act in the rebound direction. A negative (−) value of the rotational angle $\theta$ of the motor 140 means that the motor 140 is rotated from the reference angle in a direction that causes the displacement force to act in the bound direction.

(a) Vibration Damping Control

In execution of the vibration damping control, the displacement force is generated as a damping force whose amount corresponds to a vertical velocity of the vehicle body, i.e., an absolute velocity of the sprung member of the vehicle, so that the vibration damping control is executed based on a so-called "skyhook damper theory". Specifically described, for generating the displacement force whose amount corresponds to the sprung-member absolute velocity Vu, the sprung-member absolute velocity Vu is calculated based on a vertical acceleration Gu of the sprung member that is detected by the vertical acceleration sensor 196 (provided in the mount portion 54 of the vehicle body), and then the vibration damping component $\theta^*_S$ is determined according to the following expression:

$\theta^*_S = K_S \cdot C_S \cdot Vu$ (K$_S$: gain, C$_S$: damping coefficient)

(b) Roll Restraining Control

In the roll restraining control executed upon turning of the vehicle, each of the adjuster devices 20 provided for inside wheels (having a smaller turning radius) is controlled to cause the displacement force to act in the bound direction, while each of the adjuster devices 20 provided for outside wheels (having a larger turning radius) is controlled to cause the displacement force to act in the rebound direction, in response to a roll moment arising from the turning of the vehicle. Specifically described, a parameter value Gy* of the lateral acceleration (which is used as a parameter in the control) is determined, on the basis of an estimated value Gyc of the lateral acceleration estimated based on an operating angle δ of the steering wheel and a running speed v of the vehicle and also a measured value Gyr of the lateral acceleration, and according to the following expression:

$Gy^* = K_A \cdot Gyc + K_B \cdot Gyr$ (K$_A$, K$_B$: gains)

The roll restraining component $\theta^*_R$ is determined based on the lateral acceleration parameter value Gy* that is determined as described above. The controller 176 of the adjuster ECU 170 stores a data map indicative of relationship between the roll restraining component $\theta^*_R$ and the lateral acceleration parameter value Gy*, so that the roll restraining component $\theta^*_R$ can be determined with reference to the data map.

(c) Pitch Restraining Control

The pitch restraining control is executed, for example, upon braking (deceleration) of the vehicle and upon acceleration of the vehicle. In execution of the pitch restraining control upon the braking of the vehicle, a front-end dive of the vehicle body is restrained, by controlling each of the adjuster devices 20 provided for the front wheels to cause the displacement force to act in the rebound direction, while controlling each of the adjuster devices 20 provided for the rear wheels to cause the displacement force to act in the bound direction, in response to a pitch moment which arises from the braking (deceleration) of the vehicle and which causes the front-end dive of the vehicle body. In execution of the pitch restraining control upon the acceleration of the vehicle, a rear-end squat of the vehicle body is restrained, by controlling each of the adjuster devices 20 provided for the rear wheels to cause the displacement force to act in the rebound direction, while controlling each of the adjuster devices 20 provided for the front wheels to cause the displacement force to act in the bound direction, in response to a pitch moment which arises from the acceleration of the vehicle and which causes the rear-end squat of the vehicle body. Thus, in execution of the pitch restraining control, the front-end dive and the rear-end squat of the vehicle body are restrained by controlling the displacement forces generated by the respective adjuster devices 20. The pitch restraining component $\theta^*_P$ is determined based on the longitudinal acceleration serving as an index of the pitch moment received by the vehicle body. Described in detail, the pitch restraining component $\theta^*_P$ is determined on the basis of a longitudinal acceleration actual value Gzg that is actually measured, and according to the following expression:

$$\theta^*_P = K_C \cdot Gzg \ (K_C: \text{gain})$$

(d) Determination of Target Electric Current Amount

The target rotational angle $\theta^*$ of the electric motor 140 is determined based on the determined vibration damping component $\theta^*_S$, roll restraining component $\theta^*_R$ and pitch restraining component $\theta^*_P$ and according to the following expression:

$$\theta^* = \theta^*_S + \theta^*_R + \theta^*_P$$

In execution of the total control, the motor 140 is controlled such that the actual rotational angle $\theta$ of the motor 140 is equalized to the target rotational angle $\theta^*$. An amount of the electric power supplied to the motor 140 is determined based on a deviation $\Delta\theta (=\theta^*-\theta)$ of the actual rotational angle $\theta$ from the target rotational angle $\theta^*$. In other words, the amount of the electric power supplied to the motor 140 is determined based on the rotational angle deviation $\Delta\theta$ and according to a feedback controlling method. Described specifically, the rotational angle deviation $\Delta\theta$ is obtained based on the actual rotational angle that is detected by the rotational angle sensor 154 of the motor 140, and then a target electric current amount i* is determined based on the rotational angle deviation $\Delta\theta$ and according to the following expression:

$$i^* = K_P \cdot \Delta\theta + K_I \cdot Int(\Delta\theta)$$

A right side of the above expression, which is according to PI control rule, consists of a first term and a second term that are a proportional term and an integral term, respectively. "$K_P$", "$K_I$" represent proportional and integral gains, respectively. "Int ($\Delta\theta$)" represents an integral value of the rotational angle deviation $\Delta\theta$. It is noted that a sign (indicative of positive or negative) of the rotational angle deviation $\Delta\theta$ represents a direction in which the motor 140 is to be rotated for equalizing the actual rotational angle $\theta$ to the target rotational angle $\theta^*$, and that an absolute value of the rotational angle deviation $\Delta\theta$ represents an amount by which the motor 140 is to be rotated for equalizing the actual rotational angle $\theta$ to the target rotational angle $\theta^*$.

The two terms of the right side of the above expression can be considered to be components of the target electric current amount i*. The component of the first term is a component $i_h$ (hereinafter referred to as "proportional-term electric-current component" where appropriate) based on the rotational angle deviation $\Delta\theta$, while the component of the second term is a component $i_s$ (hereinafter referred to as "integral-term electric-current component" where appropriate) based on an integral value of the rotational angle deviation $\Delta\theta$. The actuator 26 is actuated while receiving an external force such as elasticity of the L-shaped bar 22. Therefore, from the point of view of theory of the PI control rule, the integral-term electric-current component $i_s$ can be considered as an electric-current component required to inhibit the motor 140 from being rotated by the external force, namely, a component of the motor force required to maintain an operating position of the actuator 26 under application of the external force thereto. The proportional-term electric-current component $i_h$ can be considered as an electric-current component required to cause the actuator 26 to be suitably actuated under application of the external force thereto, namely, a component of the motor force required to cause the actuator 26 to be actuated against the external force, or a component of the motor force required to cause the actuator 26 to be actuated with utilization of the external force.

Figure 11:
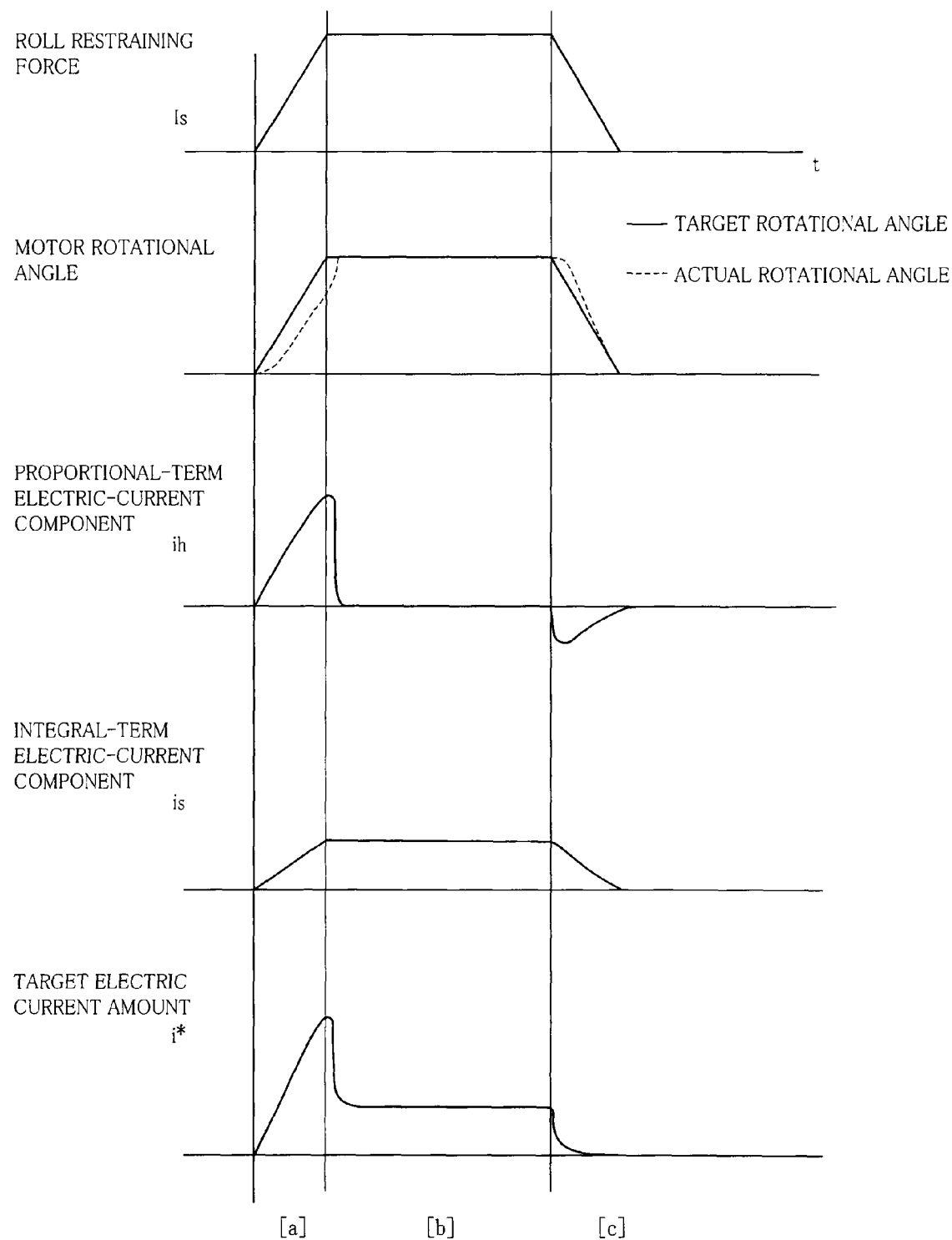
FIG. 11 is a chart conceptually showing chronological changes of roll restraining force, target motor rotational angle, actual motor rotational angle, proportional-term electric-current component, integral-term electric-current component and target electric current amount, during typical turning of the vehicle.

The above-described integral-term electric-current component $i_s$ may be an electric-current component that is required for generating the motor force whose amount is dependent on the negative efficiency $\eta_N$, since the integral-term electric-current component $i_s$ may be, generally, in view of the actuator efficiency, an electric-current component that is required for maintaining the rotational angle $\theta$ of the motor 140. Therefore, the integral gain $K_I$ as a gain of the second term of the right side of the above expression (for determining the target electric current amount i*) is set such that the integral-term electric-current component $i_s$ is dependent on the negative-efficiency characteristic. For example, in execution of the roll restraining control for restraining the roll caused during turning of the vehicle, as shown in FIG. 11, the displacement force, i.e., the roll restraining force that is to be generated by the adjuster device 20 is changed whereby the target rotational angle $\theta^*$ of the motor 140 is changed. In this example, the integral-term electric-current component $i_s$ determined in accordance with the negative efficiency $\eta_N$ such that the rotational angle $\theta$ of the motor 140 is substantially held in the target rotational angle $\theta^*$ throughout an initial stage [a], an intermediate stage [b] and a final stage [c] of the turning of the vehicle.

On the other hand, the above-described proportional-term electric-current component $i_h$ is provided for eliminating the deviation of the actual rotational angle $\theta$ from the target rotational angle $\theta^*$ under application of an external force, and the proportional gain $K_P$ as a gain of the first term of the right side of the above expression is set such that the proportional-term electric-current component $i_h$ is compensated (increased or reduced) suitably depending on the rotational angle deviation $\Delta\theta$. Particularly, in the initial stage [a] in which the actuator 26 has to be actuated against application of the external force, the motor 140 has to be supplied with the electric current whose amount enables generation of the motor force such that an amount of the generated motor force is not smaller than an amount dependent on the positive efficiency characteristic. In view of this, the proportional gain $K_P$ is set to a value that enables generation of the motor force according to the positive efficiency characteristic without the rotational angle deviation $\Delta\theta$ being considerably increased.

Like in the roll restraining control as described above, in the pitch restraining control, vibration damping control and a control integrating these controls, the positive efficiency $\eta_P$ and the negative efficiency $\eta_N$ of the actuator 26 are taken into account, by determining the target electric current amount i* according to the above expression in which the proportional gain $K_P$ and the integral gain $K_I$ are suitably set. Therefore, owing to the determination of the target electric current amount i* with the positive efficiency $\eta_P$ and the negative efficiency $\eta_N$ of the actuator 26 being taken into account, it is possible to effectively reduce an amount of the electric power consumed by the motor 140 in a state in which the rotational angle θ of the motor 140 is held unchanged or reduced, namely, in a state in which the motor force (i.e., the actuator force or displacement force) is held unchanged or reduced.

The direction of the motor force generated by the electric motor 140 is dependent on whether the target electric current amount i* is a positive value or a negative value. In control of drive of the motor 140, the duty ratio and the direction of the generated motor force are determined based on the target electric current amount i*. Then, a command indicative of the determined duty ratio and motor force direction is supplied to the inverter 174, so that the drive of the motor 140 is controlled based on the command by the inverter 174 while the motor 140 is being placed in the controlled-power supplying mode as the selected operational mode.

In the present embodiment, the target electric current amount i* is determined according to the PI control rule. However, the target electric current amount i* can be determined according to PDI control rule, too. The determination according to PDI control rule is made with the following expression:

$$i^* = K_P \cdot \Delta\theta + K_I \cdot Int(\Delta\theta) i^* + K_D \cdot \Delta\theta'$$

In a right side of the above expression, "$K_D$" represents a derivative gain, and the third term is a derivative term component.

Figure 12:
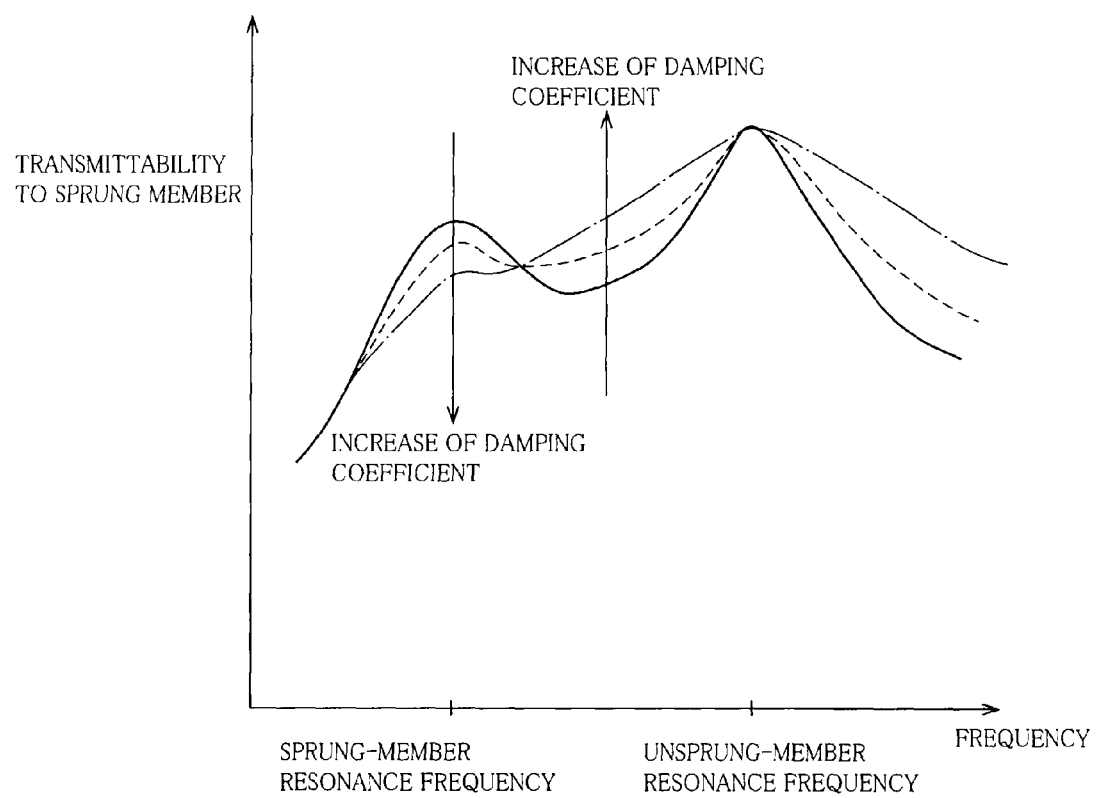
FIG. 12 is a graph conceptually showing a relationship between vibration frequency and transmittability of vibration from an unsprung member to a sprung member.
Figure 13:
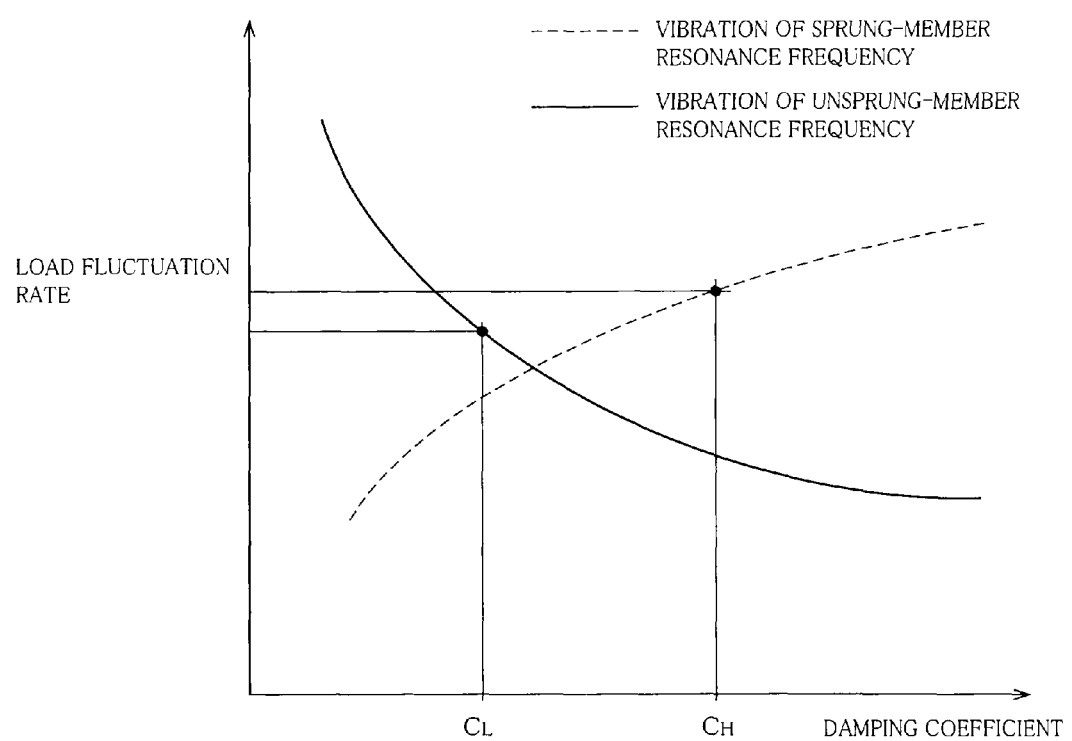
FIG. 13 is a graph conceptually showing a relationship between damping coefficient and load fluctuation rate upon occurrence of vibration of sprung-member resonance frequency range, and a relationship between the damping coefficient and the load fluctuation rate upon occurrence of vibration of unsprung-member resonance frequency range.

(ii) Control of Damping Coefficient of Absorber
(a) Significance of Damping Coefficient As described above, the absorber 52 is configured to generate the damping force against the relative movement of the sprung and unsprung members such that an amount of the generated damping force is dependent on relative velocity of the sprung and unsprung members. The amount of the damping force generated by the absorber 52 is based on the damping coefficient of the absorber 52. Thus, the damping coefficient serves as an index indicative of ability of the absorber for generating the damping force. Further, for example, the transmittability of vibration from the unsprung member to the sprung member and the road-holding ability of the vehicle are dependent on value of the damping coefficient. Described specifically, as shown in FIG. 12, the transmittability of vibration of the sprung-member resonance frequency range is reduced with increase of the damping coefficient, while the transmittability of vibration of frequency range higher than the sprung-member resonance frequency range is increased with increase of the damping coefficient. Further, as shown in FIG. 13, with respect to fluctuation of a load applied to a contact portion of the wheel which is in contact with a road surface, a rate (indicated by broken line) of fluctuation of the load applied to the contact portion of the wheel upon occurrence of vibration of the sprung-member resonance frequency range is increased with increase of the damping coefficient, while a rate (indicated by solid line) of fluctuation of the load applied to the contact portion of the wheel upon occurrence of vibration of the unsprung-member resonance frequency range is reduced with increase of the damping coefficient. The load fluctuation rate and the road-holding ability have a relationship therebetween such that the road-holding ability is increased with reduction of the load fluctuation rate. The road-holding ability upon occurrence of vibration of the sprung-member resonance frequency range is reduced with increase of the damping coefficient, while the road-holding ability upon occurrence of vibration of the unsprung-member resonance frequency range is increased with increase of the damping coefficient. FIG. 14 shows a relationship between the damping coefficient and the transmittability of vibration to the sprung member, and a relationship between the damping coefficient and the road-holding ability.

As described above, the absorber 52 of the present suspension system has a construction permitting the damping coefficient to be changed, so that the damping coefficient is changed through the control, as described above. There will be described the control of the damping coefficient in the present system, which is executed with the above-described transmittability (of vibration to the sprung member) and road-holding ability.

(b) Damping-Coefficient Increasing Control

In the present system, as described above, the vibration damping control based on so-called skyhook damper theory is executed with utilization of the displacement force generated by the adjuster device 20. However, the adjuster device 20 has difficulty in coping with vibration of relatively high frequency range because of, for example, fact that the positive/negative efficiency product $\eta_P \cdot \eta_N$ of the actuator 26 of the adjuster device 20 is relatively small. In view of this, it is desirable to reduce the transmittability of vibration of relatively high frequency range. That is, in view of the relationship between the damping coefficient of the absorber 52 and the transmittability of vibration to the sprung member, it is desirable that the damping coefficient of the absorber 52 is made small as shown in (b) of FIG. 14. Further, the vibration damping control executed by the adjuster device 20 is influenced by the damping force (hereinafter referred to as "absorber resistance force" so as to be distinguished from the damping force that is generated by the adjuster device 20). For the purpose of reducing the influence, too, it is desirable that the damping coefficient of the absorber 52 is made small.

Meanwhile, it is possible to restrain consumption of the electric power by the adjuster device 20, by increasing amount of the absorber resistance force. When the direction of the damping force generated by the absorber 52 and the direction of the displacement force generated by the adjuster device 20 are different from each other, the displacement force generated by the adjuster device 20 cannot be assisted by the damping force generated by the absorber 52. However, when the direction of the damping force generated by the absorber 52 and the direction of the displacement force generated by the adjuster device 20 are the same to each other, the displacement force generated by the adjuster device 20 can be reduced in such a case whereby it is possible to restrain consumption of the electric power by the adjuster device 20.

In view of the above-described things, in the present suspension system, when the direction (hereinafter referred to as "displacement-force direction" where appropriate) of displacement force that is to be generated by the adjuster device 20 and the direction (hereinafter referred to as "absorber resistance-force direction") of the absorber resistance force coincide with each other, a damping-coefficient increasing control is executed for increasing the damping coefficient of the absorber 52, for obtaining a large absorber resistance force.

Described specifically, the absorber resistance-force direction becomes the bound direction when the absorber 52 is caused to expand, and becomes the rebound direction when the absorber 52 is caused to contract. Meanwhile, the displacement-force direction becomes the bound direction when the sprung member is upwardly moved, and becomes the rebound direction when the sprung member is downwardly moved. Further, when the sprung and unsprung members are upwardly moved, the sprung-member absolute velocity Vu and the unsprung-member absolute velocity Vs are positive values. When the sprung and unsprung members are downwardly moved, the sprung-member absolute velocity Vu and the unsprung-member absolute velocity Vs are negative values. Therefore, when the sprung-member absolute velocity Vu is larger than the unsprung-member absolute velocity Vs, the absorber 52 is expanding. When the unsprung-member absolute velocity Vs is larger than the sprung-member absolute velocity Vu, the absorber 52 is contracting. That is, when a sprung/unsprung-members velocity difference $\Delta V$ (=Vu−Vs), which is obtained by subtracting the unsprung-member absolute velocity Vs from the sprung-member absolute velocity Vu, is a positive value, the absorber 52 is expanding. When the sprung/unsprung-members velocity difference $\Delta V$ is a negative value, the absorber 52 is contracting.

Thus, when both of the absorber resistance-force direction and the displacement-force direction correspond to the bound direction, a sign of the sprung-member absolute velocity Vu and a sign of the sprung/unsprung-members velocity difference $\Delta V$ are positive (+). When both of the absorber resistance-force direction and the displacement-force direction correspond to the rebound direction, the sign of the sprung-member absolute velocity Vu and the sign of the sprung/unsprung-members velocity difference $\Delta V$ are negative (−). On the other hand, when the absorber resistance-force direction and the displacement-force direction correspond to the rebound direction and the bound direction, respectively, the sign of the sprung-member absolute velocity Vu is negative (−) and the sign of the sprung/unsprung-members velocity difference $\Delta V$ is positive (+). When the absorber resistance-force direction and the displacement-force direction correspond to the bound direction and the rebound direction, respectively, the sign of the sprung-member absolute velocity Vu is positive (+) and the sign of the sprung/unsprung-members velocity difference $\Delta V$ is negative (−). That is, in the present system, when the sign of the sprung-member absolute velocity Vu and the sign of the sprung/unsprung-members velocity difference $\Delta V$ are the same to each other, the absorber resistance-force direction and the displacement-force direction become the same to each other. When the sign of the sprung-member absolute velocity Vu and the sign of the sprung/unsprung-members velocity difference $\Delta V$ are different from each other, the absorber resistance-force direction and the displacement-force direction become opposite to each other. Therefore, in the present system, the damping-coefficient increasing control is executed on necessary condition that the sign of the sprung-member absolute velocity Vu and the sign of the sprung/unsprung-members velocity difference $\Delta V$ are the same to each other.

Figure 15:
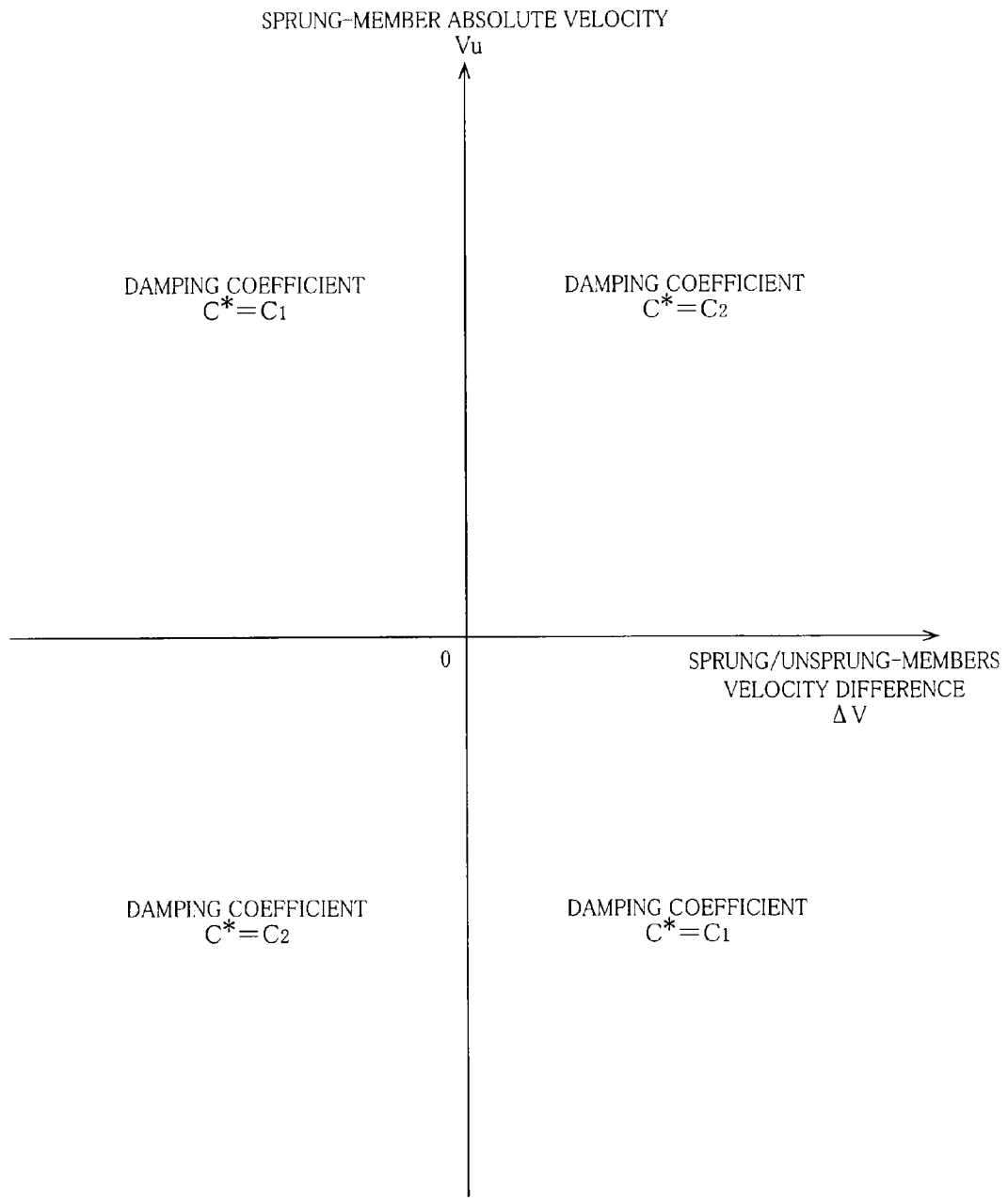
FIG. 15 is a chart conceptually showing a relationship among sprung/unsprung-members velocity difference, sprung-member absolute velocity and execution of damping-coefficient increasing control.

The damping coefficient is set to a first coefficient value C1 when the direction of movement of the sprung member and the direction of relative movement of the sprung and unsprung members are different from each other, and is set to a second coefficient value C2 (C2>C1) when the direction of movement of the sprung member and the direction of relative movement of the sprung and unsprung members are the same to each other, as shown in graph of FIG. 15 in which the sprung/unsprung-members velocity difference $\Delta V$ is represented by the horizontal axis while the sprung-member absolute velocity Vu is represented by the vertical axis. As is apparent from the graph of FIG. 15, a target damping coefficient C* (which is the damping coefficient of the absorber 52 to be established) is set to the first coefficient value C1 that is relatively small, in second and fourth quadrants in which the sign of the sprung-member absolute velocity Vu and the sign of the sprung/unsprung-members velocity difference $\Delta V$ are different from each other, and is set to the second coefficient value C2 that is larger than the first coefficient value C1, in first and third quadrants in which the sign of the sprung-member absolute velocity Vu and the sign of the sprung/unsprung-members velocity difference $\Delta V$ are the same to each other.

(c) Determination of First and Second Coefficient Values

In view of transmittability of vibration from the unsprung member to the sprung member, it is desirable that the damping coefficient of the absorber 52 is made large as much as possible as shown in (a) of FIG. 14, for example, where taking account of transmittability of vibration of the sprung-member resonance frequency range, and it is desirable that the damping coefficient of the absorber 52 is made small as much as possible as shown in (b) of FIG. 14, for example, where taking account of transmittability of vibration of relatively high frequency range. However, if the first and second coefficient values C1, C2 are determined by taking account of only the vibration transmittability, there is a risk of reduction of the road-holding ability of the wheel. Described in detail, the road-holding ability upon occurrence of vibration of the sprung-member resonance frequency range is reduced with increase of the damping coefficient, as shown in (c) of FIG. 14. On the other hand, the road-holding ability upon occurrence of vibration of the unsprung-member resonance frequency range is reduced with reduction of the damping coefficient, as shown in (d) of FIG. 14. Therefore, the road-holding ability also should be taken into account upon determination of the first and second coefficient values C1, C2. Described in detail, it is desirable that the first coefficient value C1, which should be relatively small, is determined by taking account of the road-holding ability upon occurrence of vibration of the relatively high frequency range, and it is desirable that the second coefficient value C2, which should be relatively large, is determined by taking account of the road-holding ability upon occurrence of vibration of the relatively low frequency range.

In the present system, the adjuster device 20 has difficulty in coping with vibration of relatively high frequency range, for example, for the reason that the adjuster device 20 employs the actuator 26 having the relatively small positive/negative efficiency product. In view of this, it is desirable that the road-holding ability upon occurrence of vibration of relatively high frequency range is regarded as important in the present system. Further, there is a need that the second coefficient value C2 be made large as much as possible, in the interest of minimizing the electric power consumed by the adjuster device 20, by utilizing the absorber resistance force as much as possible.

With the above-described needs being all taken into account, in the present system, the first and second coefficient values C1, C2 are determined such that the road-holding ability of the wheel is higher upon occurrence of vibration of the unsprung-member resonance frequency range when the damping coefficient of the absorber is set to the first coefficient value C1, than upon occurrence of vibration of the sprung-member resonance frequency range when the damping coefficient of the absorber is set to the second coefficient value C2. Described specifically, the first and second coefficient values C1, C2 are set to respective values $C_L$, $C_H$ as shown in FIG. 13, whereby the load fluctuation rate is lower upon occurrence of vibration of the unsprung-member resonance frequency range when the damping coefficient is set to the value $C_L$, than upon occurrence of vibration of the sprung-member resonance frequency range when the damping coefficient is set to the value $C_H$.

(d) Variation of Damping-Coefficient Increasing Control

The damping-coefficient increasing control is executed on necessary condition that the sign of the sprung-member absolute velocity Vu and the sign of the sprung/unsprung-members velocity difference ΔV are the same to each other. This condition may be a necessary and sufficient condition so that the damping-coefficient increasing control may be executed as long as this condition is satisfied. In the present system, however, in view of other aspects, the damping-coefficient increasing control is executed when other conditions in addition to the above condition are satisfied. Further, in execution of the damping-coefficient increasing control, the second coefficient value C2 is not necessarily a constant value but may be a variable value. There will be described variation of the damping-coefficient increasing control that is executed in the present system.

(d-1) Limitation on Execution of Damping-Coefficient Increasing Control, Depending on Sprung-Member Absolute Velocity For causing the absorber resistance force to act as the damping force, based on the skyhook damper theory, against vibration of the sprung member in a maximum number of opportunities, it is desirable to always increase the damping coefficient of the absorber 52 upon satisfaction of the condition that the sign of the sprung-member absolute velocity Vu and the sign of the sprung/unsprung-members velocity difference ΔV are the same to each other. However, the larger the sprung-member absolute velocity Vu is, the higher is a possibility of occurrence of vibration having a resonance frequency of the sprung member or a frequency close to the sprung-member resonance frequency. That is, the possibility of occurrence of vibration having a relatively low frequency is increased with increase of the sprung-member absolute velocity Vu. In such a case, it is required to take account of road-holding ability of the wheel upon occurrence of vibration of relatively low frequency range. The road-holding ability upon occurrence of vibration of relatively low frequency range is reduced with increase of the damping coefficient, as shown in (c) of FIG. 14. Taking account of the road-holding ability of the vehicle upon occurrence of vibration of relatively low frequency range, the absorber 52 may be controlled in the present system, such that the damping-coefficient increasing control is executed on condition that an absolute value of the sprung-member absolute velocity Vu is not larger than a threshold velocity value $Vu_0$ so that the damping coefficient is not increased when the absolute value of the sprung-member absolute velocity Vu is larger than the threshold velocity value $Vu_0$.

(d-2) Limitation on Execution of Damping-Coefficient Increasing Control, Depending on Sprung/Unsprung-Members Velocity Difference In view of influence affecting the vibration damping control based on skyhook damper theory, it is desirable that the absorber resistance force is small. However, the larger an absolute value of the sprung/unsprung-members velocity difference ΔV is, the higher is a possibility of occurrence of vibration having relatively high frequency. The road-holding ability of the wheel upon occurrence of vibration having relatively high frequency is reduced with reduction of the damping coefficient, as shown in (d) of FIG. 14. In view of this, for improving the road-holding ability upon occurrence of vibration having relatively high frequency, the absorber 52 may be controlled such that the damping-coefficient increasing control is executed on condition that the absolute value of the sprung/unsprung-members velocity difference ΔV is not smaller than a threshold difference value $ΔV_0$.

(d-3) Limitation on Execution of Damping-Coefficient Increasing Control, Depending on Charge Level of Battery When a charge level (remaining amount) of the battery 184 is low, it is desirable to reduce the displacement force since reduction of consumption of the electric power by the electric motor 140 is desired. When the charge level of the battery 184 is high, there is little need to reduce the displacement force. Therefore, it is desirable that the damping-coefficient increasing control is executed to generate the large absorber resistance force only when the charge level of the battery 184 is low, and that the damping coefficient is made small when the charge level of the battery 184 is high, in view of reduction of the influence of the absorber resistance force that affects the vibration damping control based on the skyhook damper theory, and also in view of transmittability of vibration having relatively high frequency from the unsprung member to the sprung member. Thus, in the present system, the absorber 52 may be controlled such that the damping-coefficient increasing control is executed on condition that the charge level E of the battery 184 is not higher than a threshold level value $E_0$.

(d-4) Limitation on Execution of Damping-Coefficient Increasing Control, Depending on Displacement Force In the present system, there is an upper limit on amount of the displacement force generable by the adjuster device 20, due to factors such as constructions of the electric motor 140 and the actuator 26. The adjuster device 20 would have to be made large in size if the upper limit is intended to be increased. If the upper limit could be reduced, the adjuster device 20 could be made compact in size. However, the reduction of the upper limit would make it impossible to generate a sufficient amount of the displacement force, and cause a large burden to be imposed, for example, on the electric motor 140 and the actuator 26. A relatively large amount of the displacement force is required, for example, when the vibration damping control, roll restraining control and pitch restraining control are executed concurrently with each other such that displacement forces generated in the respective controls are directed in the same direction.

For the above reason, when the displacement force is not smaller than a threshold force amount, it is desirable to reduce the displacement force generated in the vibration damping control. In such a case, the absorber 52 may be controlled such that the damping coefficient is increased so as to increase an amount of the absorber resistance force that is to be generated, and such that the damping coefficient is not increased if the displacement force is not particularly required to be reduced, in view of influence that affects the vibration damping control and transmittability of vibration of relatively high frequency range to the sprung member. In the present system, since the displacement force is controlled based on the rotational angle of the electric motor 140, as described above, the absorber 52 may be controlled such that the damping-coefficient increasing control is executed on condition that an absolute value of the target rotational angle θ* is not smaller than a threshold angle value θ*$_0$.

(d-5) Execution of Damping-Coefficient Increasing Control with Change of Second Coefficient Value The second coefficient value $C_2$ may be provided by a constant value $C_H$ in execution of the damping-coefficient increasing control. However, for example, for finely controlling the damping force that is to be generated by the absorber 52, it is desirable to change the second coefficient value $C_2$. Further, for example, if there is an abrupt change between the values $C_L$, $C_H$ in a transition between the first and second coefficient values $C_1$, $C_2$, this abrupt change could be a factor giving a discomfort to a passenger of the vehicle. In view of this, in the present system, the damping-coefficient increasing control may be executed with the second coefficient value $C_2$ being changeable. Described in detail, in execution of the damping-coefficient increasing control, the second coefficient value $C_2$ is changeable between the value $C_L$ as the first coefficient value $C_1$ and the value $C_H$, depending on various parameters which are used in determination as to satisfaction of the various conditions for the limitations on execution of the damping-coefficient increasing control.

In execution of the damping-coefficient increasing control with the second coefficient value being changeable, the second coefficient value C2 may be determined basically by using various gains that are changed based on the various parameters in the form of the sprung-member absolute velocity Vu, sprung/unsprung-members velocity difference ΔV, charge level E of the battery 184 and target rotational angle θ*, in accordance with the following expression:

$$C_2 = K_V \cdot K\Delta_V \cdot K_E \cdot K\theta \cdot (C_H - C_L) + C_L$$

In the above expression, "$K_V$" is a gain based on the sprung-member absolute velocity Vu, "$K\Delta_V$" is a gain based on the sprung/unsprung-members velocity difference ΔV, "$K_E$" is a gain based on the charge level E of the battery 184, and "$K\theta$" is a gain based on the target rotational angle θ*.

In view of the road-holding ability of the wheel upon occurrence of vibration of relatively low frequency range, the gain $K_V$ is set to a value that is increased with reduction of the sprung-member absolute velocity Vu (see (a) of FIG. 16), so that the second coefficient value $C_2$ is increased with reduction of the sprung-member absolute velocity Vu. In view of the road-holding ability of the wheel upon occurrence of vibration of relatively high frequency range, the gain $K\Delta_V$ is set to a value that is increased with increase of the sprung/unsprung-members velocity difference ΔV (see (b) of FIG. 16), so that the second coefficient value $C_2$ is increased with increase of the sprung/unsprung-members velocity difference ΔV. Further, the gain $K_E$ is set to a value that is increased with reduction of the charge level E of the battery 184 (see (c) of FIG. 16), so that the second coefficient value $C_2$ is increased with reduction of the charge level E. Still further, the gain Kθ is set to a value that is increased with increase of the target rotational angle θ* (see (d) of FIG. 16), so that the second coefficient value $C_2$ is increased with increase of the target rotational angle θ*. As is understood from FIG. 16, each of the gains $K_V$, $K\Delta_V$, $K_E$, Kθ is changeable between 0 (zero) and 1 (one), so that a maximum second coefficient value as a maximum value of the second coefficient value $C_2$ is, according to the above expression, the value $C_H$.

It is noted that, in the present system, it is also possible to execute a control for changing the second coefficient value $C_2$, based on one or two of the above-described various parameters (rather than all of the various parameters), namely, for changing the second coefficient value $C_2$ by using one or two of the above-described various gains.

(iii) Control of Adjuster Device in Execution of Damping-Coefficient Increasing Control (a) Displacement-Force Reducing Control As described above, the displacement-force direction and the absorber resistance-force direction are directed in the same direction when the damping-coefficient increasing control is executed. In this case, as a result of increase of the damping coefficient of the absorber 52, a relatively large amount of the absorber resistance force is generated, and is caused to act in the same direction as the displacement-force direction. In view of this, it is desirable to reduce the displacement force generated by the adjuster device 20 during execution of the damping-coefficient increasing control. Therefore, in the present system, when the damping-coefficient increasing control is executed, the adjuster device 20 may be controlled with execution of a control (hereinafter referred to as "displacement-force reducing control" where appropriate) for reducing the displacement force that is to be generated by the adjuster device 20.

In the present system, as a variation of the displacement-force reducing control, the displacement-force reducing control may be executed such that the above-described vibration damping component θ*$_S$ is reduced. The absorber resistance force functions as the damping force against relative vibration of the sprung and unsprung members. Thus, from point of view of appropriate execution of the vibration damping control, a reasonable execution of the displacement-force reducing control is reducing the vibration damping component θ*$_S$, when the damping-coefficient increasing control is executed for setting the target damping coefficient C* of the absorber 52 to the second coefficient value $C_2$. The displacement force is controlled based on the rotational angle of the electric motor 140, as described above, and the target rotational angle θ* is determined in accordance with the following expression:

$$\theta^* = \theta^*_S + \theta^*_R + \theta^*_P$$

In this variation of the displacement-force reducing control, for reducing only the vibration damping component θ*$_S$, the target rotational angle θ* is determined in accordance with, in place of the above expression, the following expression:

$$\theta^* = K_T \cdot \theta^*_S + \theta^*_R + \theta^*_P$$

Thus, in the present displacement-force reducing control, the adjuster device 20 is controlled based on the target rotational angle θ* that is determined in accordance with the above expression.

Figure 17:
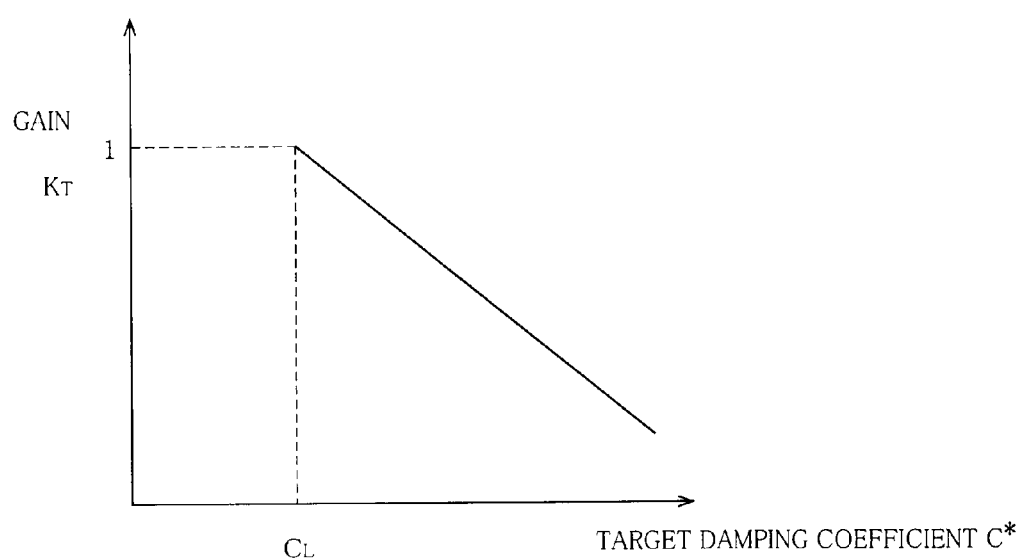
FIG. 17 is a graph showing a gain used for reducing displacement force in displacement-force reducing control.
Figure 18:
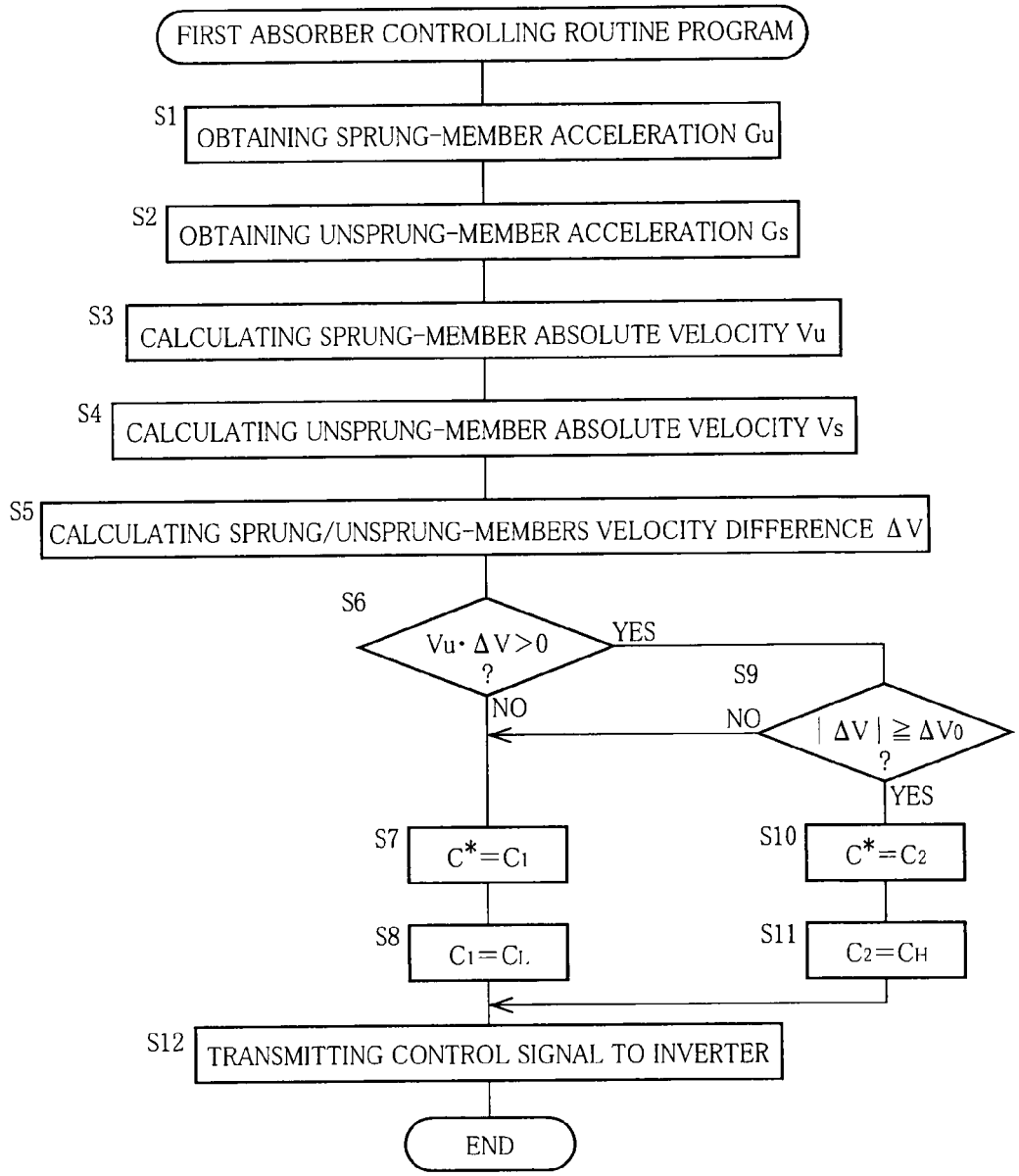
FIG. 18 is a flow chart showing a first absorber controlling routine program.
Figure 19:
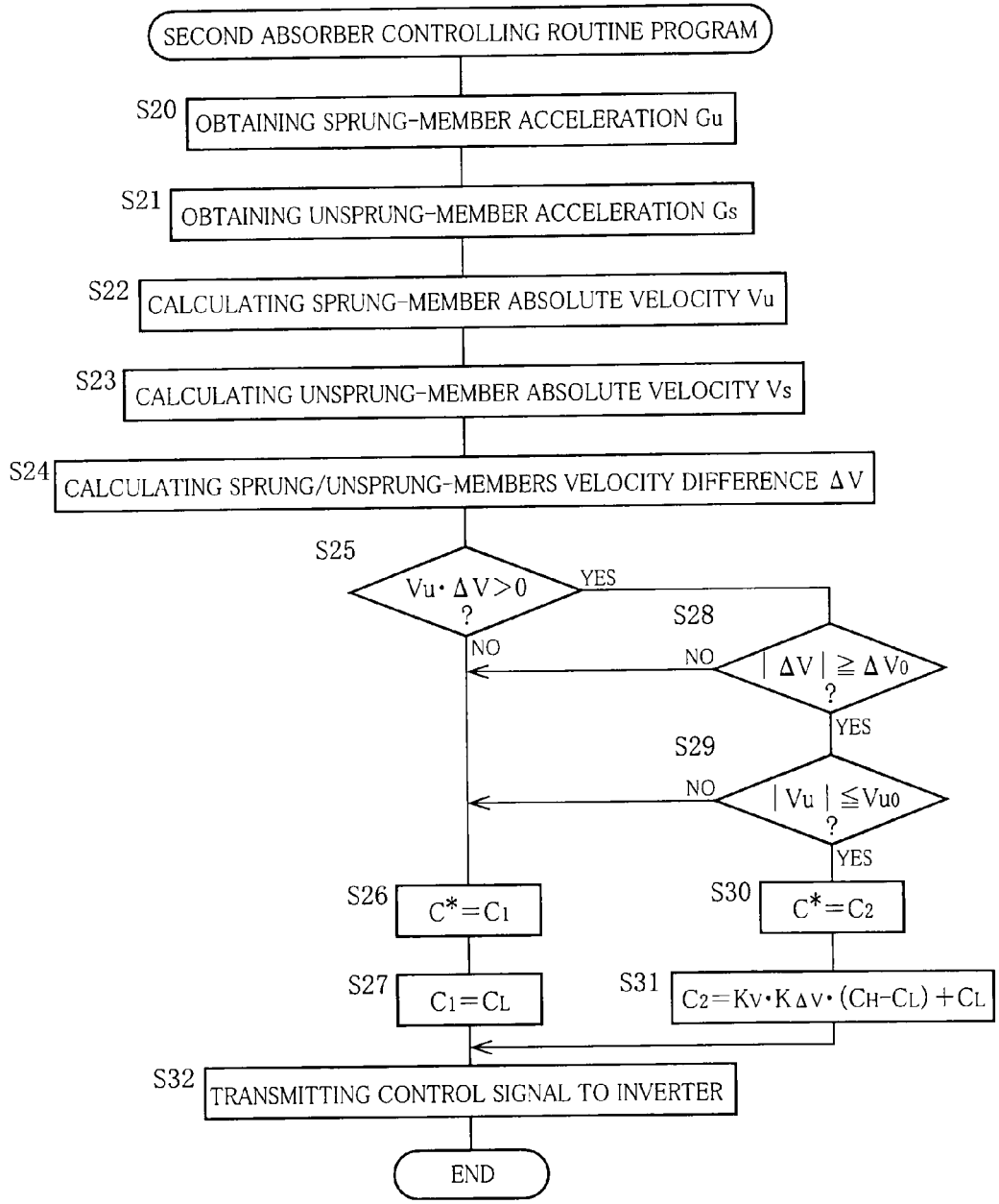
FIG. 19 is a flow chart showing a second absorber controlling routine program.
Figure 20:
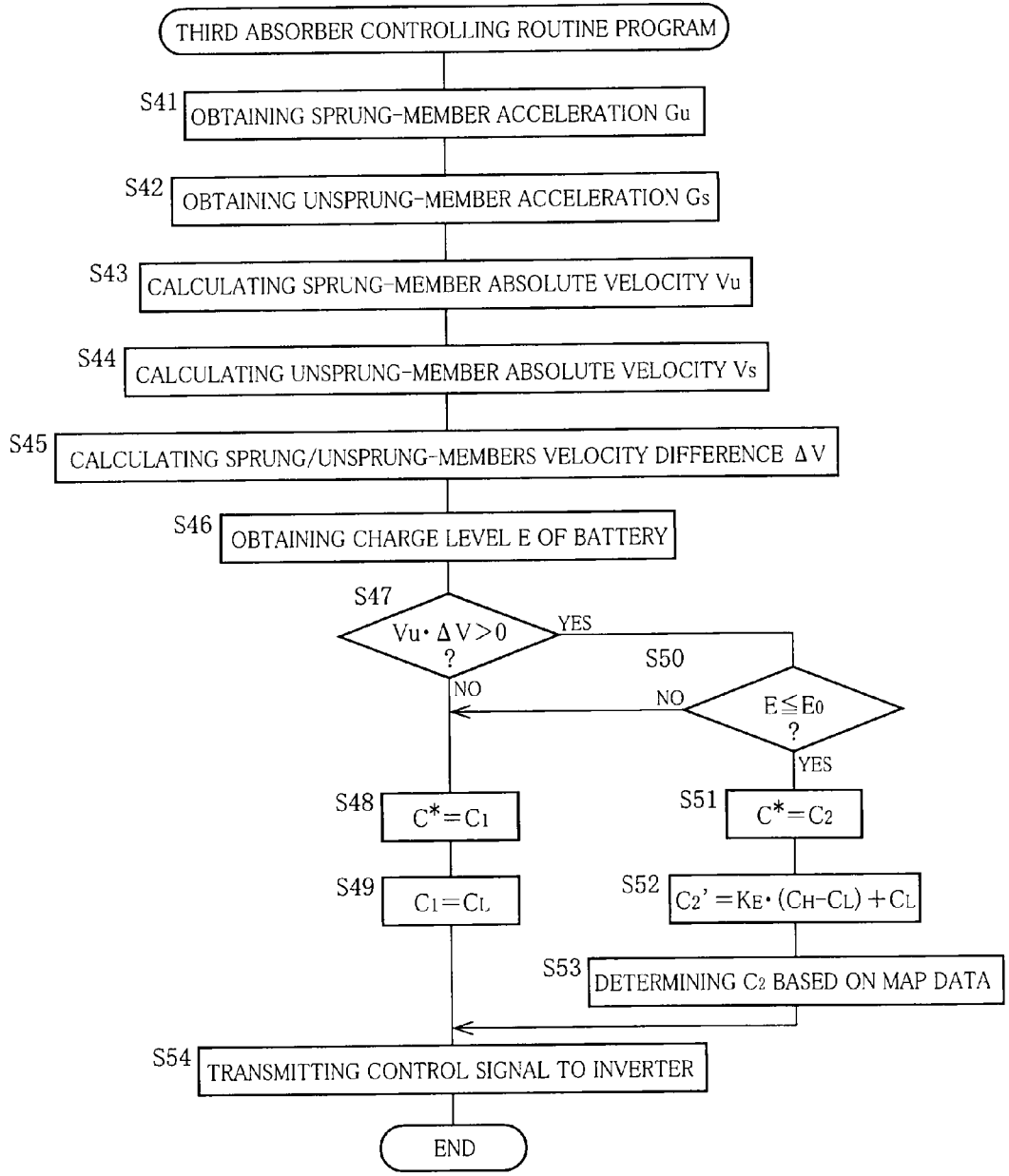
FIG. 20 is a flow chart showing a third absorber controlling routine program.
Figure 21:
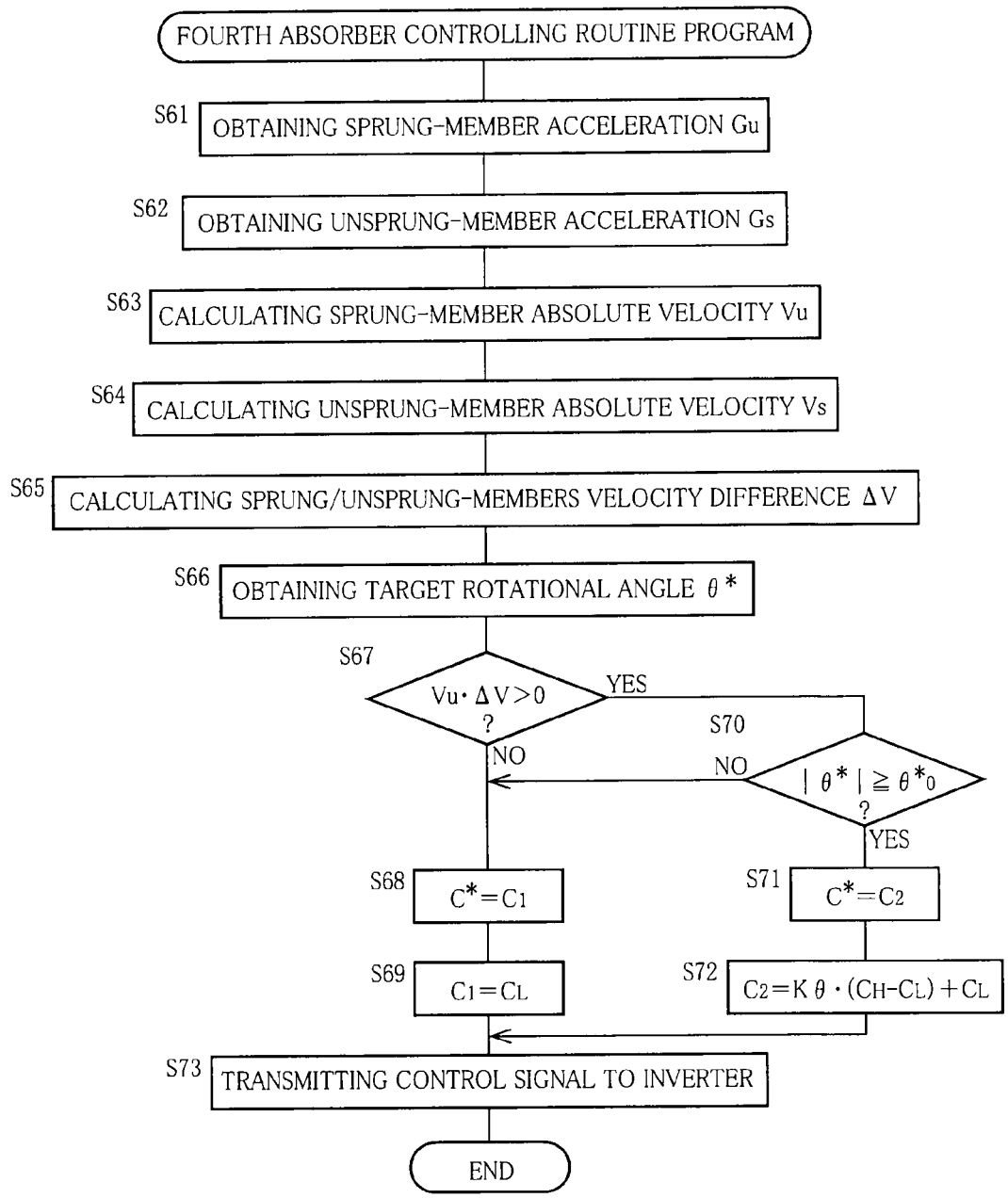
FIG. 21 is a flow chart showing a fourth absorber controlling routine program.

In the above-expression, "$K_T$" is a gain based on the target damping coefficient C*, and is set to a value which is reduced with increase of the target damping coefficient C*, as shown in FIG. 17, so that the displacement force is reduced with increase of the target damping coefficient C*, by reducing the vibration damping component θ*$_S$. In the displacement-force reducing control in accordance with the above expression, the target rotational angle θ* is set to a value that is reduced with increase of the target damping coefficient C*, whereby the displacement force generated by the adjuster device 20 is reduced. It is noted that the displacement-force reducing control in accordance with the above expression is executed while the damping-coefficient increasing control is executed with the second coefficient value $C_2$ being changed. The value of the gain $K_T$ becomes 1 (one) when the second coefficient value C2, which is changed between the value $C_L$ as the first coefficient value $C_1$ and the value $C_H$ as the maximum second coefficient value $C_2$, is equalized to the value $C_L$.

In the present system, as another variation of the displacement-force reducing control, the displacement-force reducing control may be executed by reducing the target rotational angle θ* (which is determined in accordance with the expression: $\theta^* = \theta^*_S + \theta^*_R + \theta^*_P$) as such, rather than reducing a particular component of the displacement force. Specifically described, when the damping-coefficient increasing control is executed, the target rotational angle θ* (which is determined in accordance with the above expression) is modified in accordance with the following expression:

$$\theta^* = K_T \theta^*$$

That is, the adjuster device 20 is controlled based on the thus modified target rotational angle θ*.

The execution of the displacement-force reducing control leads to reduction of the electric power supplied from the battery 184 to the electric motor 140. In this sense, the displacement-force reducing control can be considered as a mode of the supplied-power reducing control.

(b) Power-Supply Inhibiting Control

Further, in the present system, when the damping-coefficient increasing control is executed, it is made possible to execute a control (hereinafter referred to as "power-supply inhibiting control" where appropriate) for inhibiting supply of the electric power to the electric motor 140, for further saving the electric power. This power-supply inhibiting control is a mode of the supplied-power reducing control. In execution of this power-supply inhibiting control, the motor 140 is placed in other operational mode in place of the above-described controlled-power supplying mode, for thereby causing the motor 140 to generate a suitable amount of the motor force or little amount of the motor without supply of the electric power from the battery 184.

As a variation of the power-supply inhibiting control, for example, where the second coefficient value $C_2$ is changeable in execution of the damping-coefficient increasing control, the power-supply inhibiting control may be executed with the electric motor 140 being placed in one of the plurality of operational modes which is selected based on the changeable second coefficient value $C_2$. In this arrangement, specifically described, the motor 140 is placed in the brake mode when the second coefficient value $C_2$ is relatively small, and is placed in the free mode when the second coefficient value $C_2$ is relatively large. When the second coefficient value $C_2$ is intermediate between the relatively large and small values, the motor 140 is placed in the stand-by mode, described in detail, the stand-by mode according to the motor-force generating direction. By thus switching the operational mode of the motor 140 based on the second coefficient value $C_2$, it is possible to restrain consumption of the electric power by the motor 140 while causing the motor 140 to generate a suitable amount of the motor force. As described above, it is possible to regenerate the electric power based on the electromotive force owing to, for example, construction of the inverter 174 while the motor 140 is being placed in any one of the three operational modes, and it is accordingly possible to establish the suspension system more advantageous from a point of view of electric power saving, by enabling the regenerated electric power to be recycled.

As another variation of the power-supply inhibiting control, the power-supply inhibiting control may be executed, for example, by changing the operational mode of the motor 140 from the controlled-power supplying mode to a particular one of the other operational modes when the damping-coefficient increasing control is executed irrespective of whether the second coefficient value $C_2$ is changed or not. In the present system, specifically, the motor 140 is placed in the brake mode as the operational mode when the damping-coefficient increasing control is executed.

<<Controlling Programs>>

In the present system, the damping coefficient of the absorber 52 is controlled through the absorber controlling program that is executed by the absorber controller 180 as described below. In the present system, four routine programs as the absorber controlling program are prepared, as shown in flow charts of FIGS. 18-21, so that one of the four routine programs, which is selected by operation of the absorber-controlling-program selection switch 206 by a driver of the vehicle, is executed. Whichever one of the four routine programs is selected, the selected routine program is repeatedly executed at a short time interval (e.g., several tens of milliseconds), while an ignition switch of the vehicle is placed in its ON state. On the other hand, the displacement force, which is to be generated by the adjuster device 20, is controlled through the adjuster-device controlling programs that are executed by the adjuster controller 176 as described below. In the present system, four routine programs as the adjuster-device controlling program are prepared, as shown in flow charts of FIGS. 23-26, so that one of the four routine programs, which is selected by operation of the adjuster-device-controlling-program selection switch 199 by the vehicle driver, is executed. Whichever one of the four routine programs is selected, the selected routine program is repeatedly executed at a short time interval (e.g., several tens of milliseconds), while an ignition switch of the vehicle is placed in its ON state. By reference to the flow charts, control procedures of the absorber and adjuster-device controlling programs will be briefly described. It is noted that the absorber controlling program is executed for each one of the four absorbers 52, and that the adjuster-device controlling program is executed for each one of the actuators 26 of the respective four adjuster devices 20. In the following description, the control procedures for one of the absorbers 52 and the control procedures for one of the actuators 26 will be described in the interest of simplification of the description.

(i) Absorber Controlling Program (a) First Absorber Controlling Routine Program

In this first absorber controlling routine program, step S1 (hereinafter abbreviated as "S1" as well as the other steps) is implemented to obtain the sprung-member vertical acceleration Gu based on a value detected by the sprung-member vertical acceleration sensor 196, and S2 is implemented to obtain the unsprung-member vertical acceleration Gs based on a value detected by the unsprung-member vertical acceleration sensor 198. Then, in S3, the sprung-member absolute velocity Vu is calculated based on the sprung-member vertical acceleration Gu. In S4, the unsprung-member absolute velocity Vs is calculated based on the unsprung-member vertical acceleration Gs. In S5, the sprung/unsprung-members velocity difference ΔV is calculated based on the sprung-member absolute velocity Vu and the unsprung-member absolute velocity Vs.

Next, S6 is implemented to judge whether the sign of the sprung-member absolute velocity Vu and the sign of the sprung/unsprung-members velocity difference ΔV are the same to each other. When it is judged that they are different from each other, the target damping coefficient C* is set to the first coefficient value $C_1$ in S7, and the first coefficient value $C_1$ is set to the value $C_L$. When it is judged that the sign of the sprung-member absolute velocity Vu and the sign of the sprung/unsprung-members velocity difference ΔV are the same to each other, S9 is implemented to judge whether an absolute value of the sprung/unsprung-members velocity difference ΔV is equal to or larger than the threshold difference value $\Delta V_0$. When it is judged that the absolute value of the sprung/unsprung-members velocity difference $\Delta V$ is smaller than the threshold difference value $\Delta V_0$, S7 and S8 are implemented to set the target damping coefficient C* to the first coefficient value $C_L$. When it is judged that the absolute value of the sprung/unsprung-members velocity difference $\Delta V$ is equal to or larger than the threshold difference value $\Delta V_0$, S10 is implemented whereby the target damping coefficient C* is set to the second coefficient value $C_2$, for executing the damping-coefficient increasing control. S10 is followed by S11 in which the second coefficient value $C_2$ is set to the value $C_H$. After the target damping coefficient C* has been determined, S12 is implemented whereby a control signal prepared based on the determined target damping coefficient C* is transmitted to the inverter 178. One cycle of execution of the first absorber controlling routine program is completed with S12.

There will be described second through fourth absorber controlling routine programs which are similar to the first absorber controlling routine program. In specific descriptions regarding procedures of the second through fourth absorber controlling routine programs, the same procedures as carried out in the first absorber controlling routine program will not be described or described in a simplified manner.

(b) Second Absorber Controlling Routine Program

Unlike in the first absorber controlling routine program, in this second absorber controlling routine program, the target damping coefficient C* is set to the second coefficient value $C_2$ (S30), when the absolute value of the sprung/unsprung-members velocity difference $\Delta V$ is equal to or larger than the threshold difference value $\Delta V_0$ (S28), and the absolute value of the sprung-member absolute velocity Vu is equal to or smaller than the threshold velocity value $Vu_0$ (S29), in the case in which it is judged that the sign of the sprung-member absolute velocity Vu and the sign of the sprung/unsprung-members velocity difference $\Delta V$ are the same to each other. In procedures according to this second absorber controlling routine program, the second coefficient value $C_2$ is determined in accordance with the following expression, so as to be changed depending on the sprung/unsprung-members velocity difference $\Delta V$ and the sprung-member absolute velocity Vu (S31).

$$C_2 = K_V \cdot K \Delta_V \cdot (C_H - C_L) + C_L$$

(c) Third Absorber Controlling Routine Program

Unlike in the first absorber controlling routine program, in this third absorber controlling routine program, the target damping coefficient C* is set to the second coefficient value $C_2$ (S51), when the charge level E of the battery 184 is equal to or lower than the threshold level value E0 (S50), in the case in which it is judged that the sign of the sprung-member absolute velocity Vu and the sign of the sprung/unsprung-members velocity difference $\Delta V$ are the same to each other. In procedures according to this third absorber controlling routine program, the second coefficient value $C_2$ is changed in a stepwise manner, depending on the charge level E of the battery 184.

Described in detail, in procedures for changing the second coefficient value $C_2$ in the stepwise manner, a basic second coefficient value $C_2'$ which serves as a basis for determination of the second coefficient value $C_2$ is determined in accordance with the following expression (S52):

$$C_2' = K_E \cdot (C_H - C_L) + C_L$$

Figure 22:
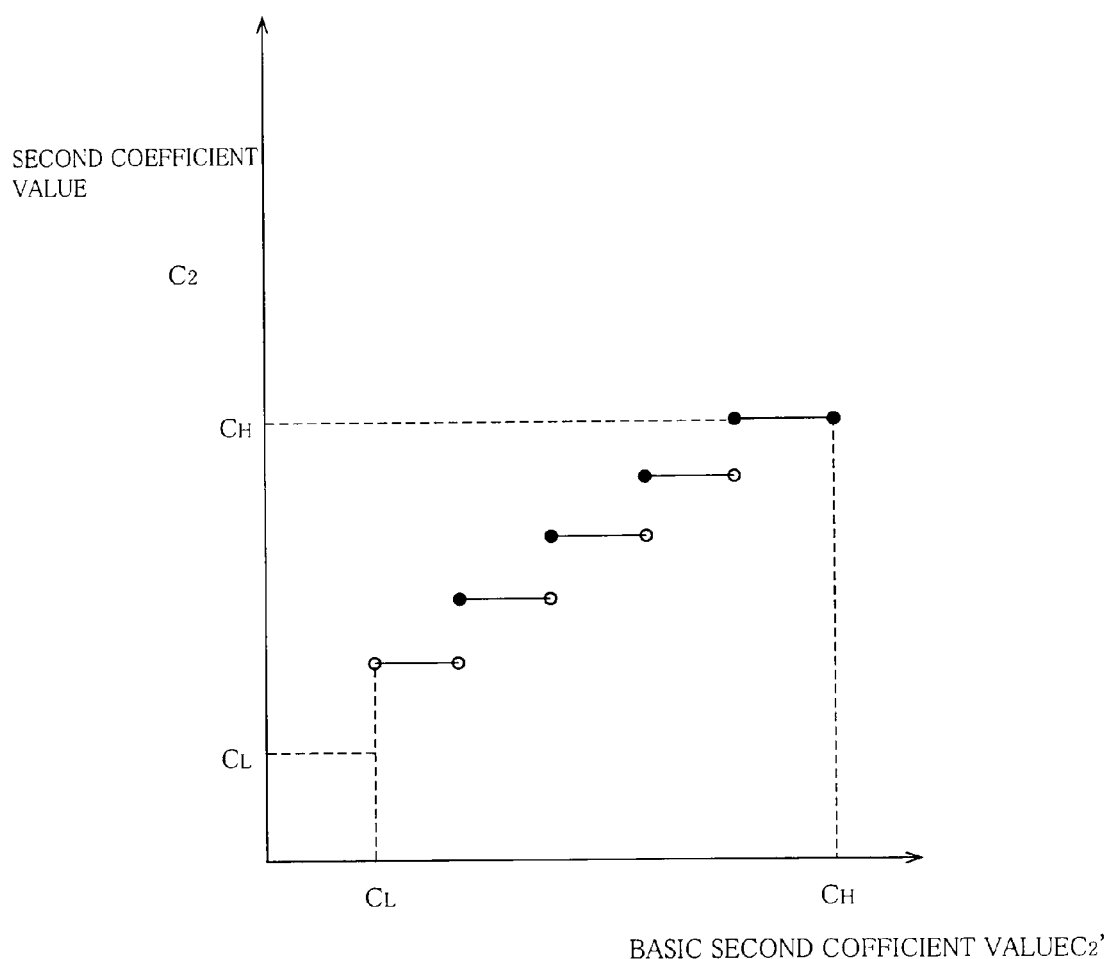
FIG. 22 is a graph showing map data used for changing the second coefficient value in a stepwise manner.
Figure 23:
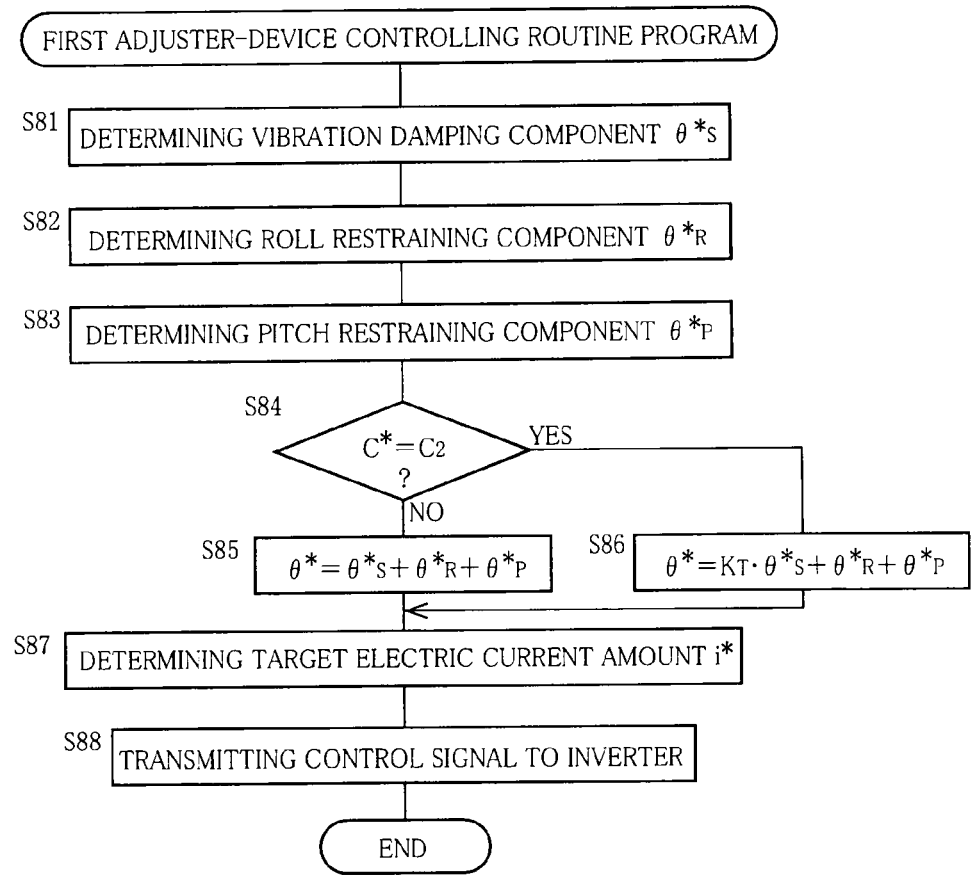
FIG. 23 is a flow chart showing a first adjuster-device controlling routine program.
Figure 24:
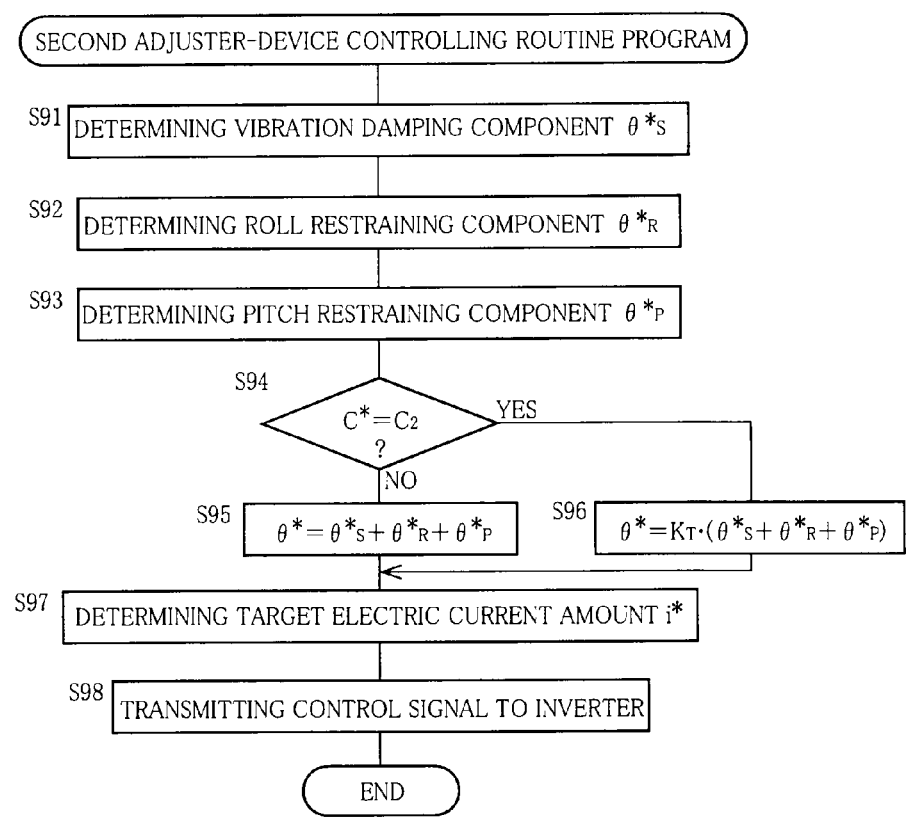
FIG. 24 is a flow chart showing a second adjuster-device controlling routine program.
Figure 25:
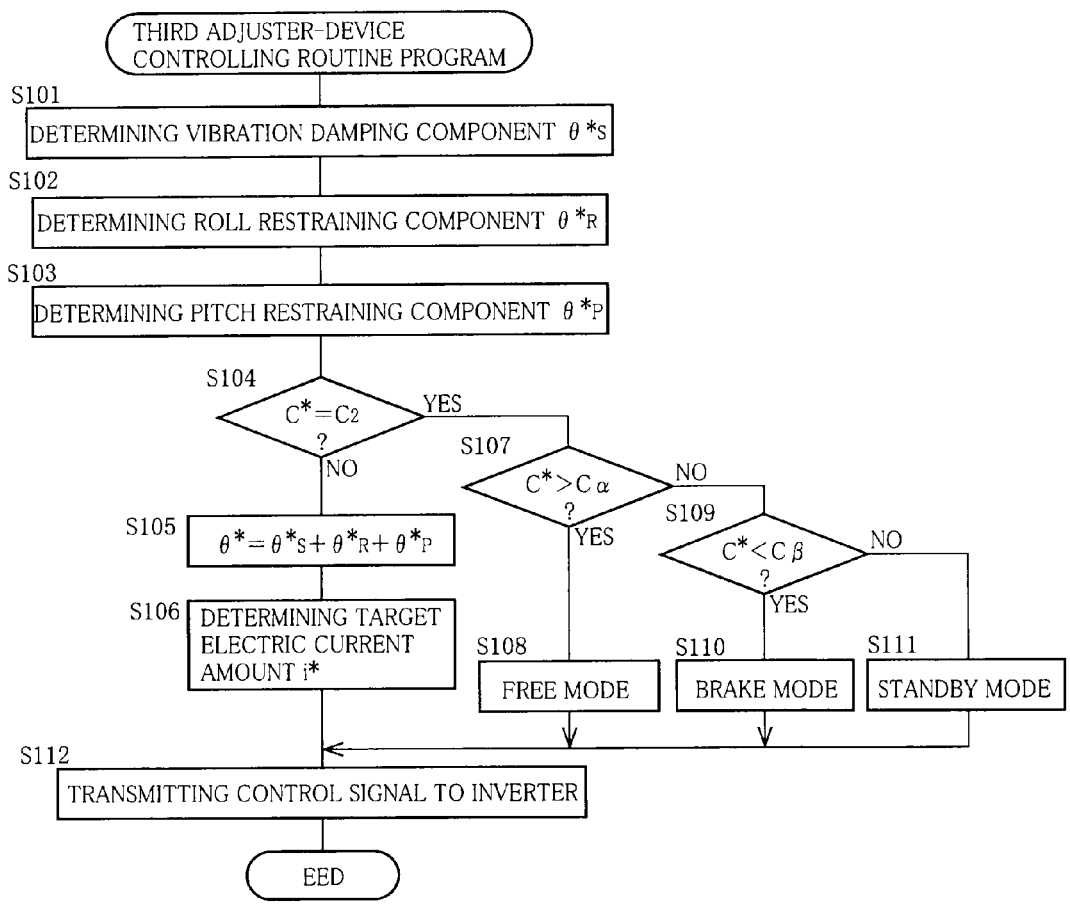
FIG. 25 is a flow chart showing a third adjuster-device controlling routine program.
Figure 26:
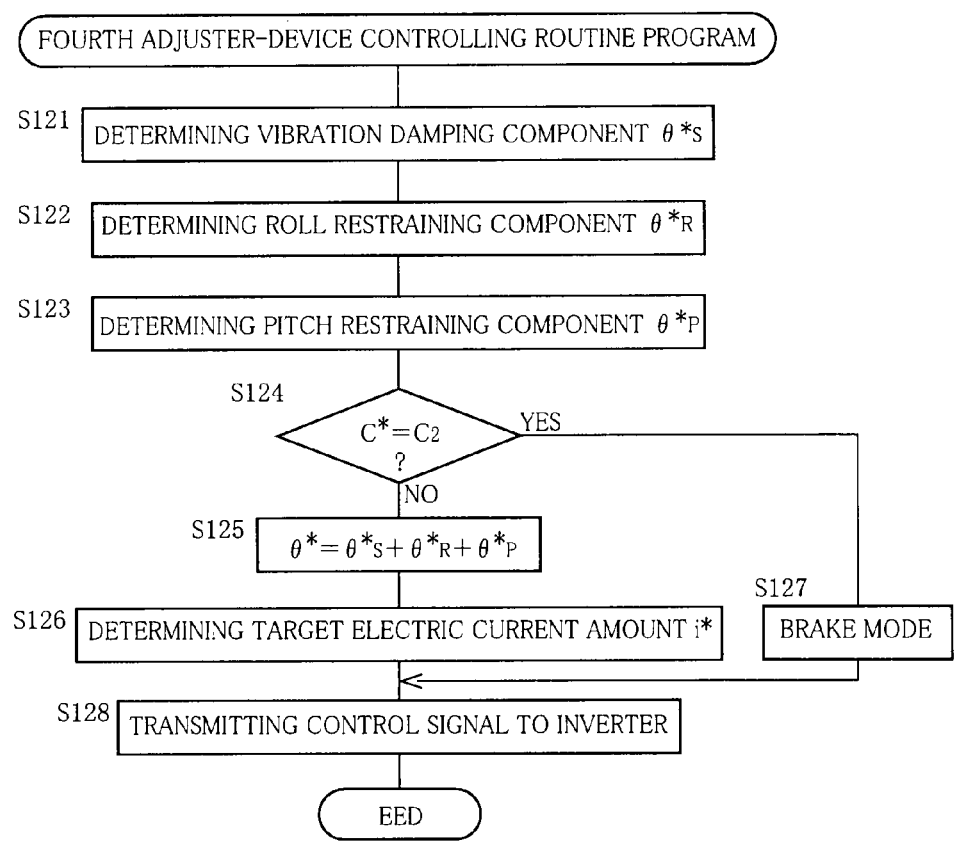
FIG. 26 is a flow chart showing a fourth adjuster-device controlling routine program.

The absorber controller 180 stores a data map (see FIG. 22) indicative of relationship between the second coefficient value $C_2$ and the basic second coefficient value $C_2'$ as a parameter, so that the second coefficient value $C_2$ is determined (S53).

(d) Fourth Absorber Controlling Routine Program

Unlike in the first absorber controlling routine program, in this fourth absorber controlling routine program, the target rotational angle $\theta^*$ of the adjuster device 20 is obtained (S66), and then the target damping coefficient C* is set to the second coefficient value $C_2$ (S71), when the absolute value of the target rotational angle $\theta^*$ is equal to or larger than the threshold angle value $\theta^*_0$ (S70), in the case in which it is judged that the sign of the sprung-member absolute velocity Vu and the sign of the sprung/unsprung-members velocity difference $\Delta V$ are the same to each other. That is, only when the amount of the displacement force that is to be generated by the adjuster device 20 reaches a certain amount, the target damping coefficient C* is set to the second coefficient value $C_2$. In procedures according to this fourth absorber controlling routine program, the second coefficient value $C_2$ is determined in accordance with the following expression, so as to be changed depending on the target rotational angle $\theta^*$, namely, so as to be changed depending on the amount of the displacement force generated by the adjuster device 20 (S72).

$$C_2 = K\theta \cdot (C_H - C_L) + C_L$$

(ii) Adjuster-Device Controlling Program (a) First Adjuster-Device Controlling Routine Program In this first adjuster-device controlling routine program, S81 is implemented to determine the vibration damping component $\theta^*_S$ that is to be directed to the vibration damping control, based on the sprung-member absolute velocity Vu that is calculated from a value detected by the sprung-member vertical acceleration Gu. Then, in S82, the roll restraining component $\theta^*_R$ directed to the roll restraining control is determined based on the above-described lateral acceleration parameter value. In S83, the pitch restraining component $\theta^*_P$ directed to the pitch restraining control is determined based on the longitudinal acceleration.

Next, S84 is implemented to judge whether the damping-coefficient increasing control is being executed for the absorber 52, for example, by seeing if the target damping coefficient C* of the absorber 52 is set to the second coefficient value $C_2$ or not. The adjuster controller 176 obtains information regarding the target damping coefficient C* from the absorber controller 180 as needed. When it is judged that the target damping coefficient C* of the absorber 52 is not set to the second coefficient value $C_2$, S85 is implemented to determine the target rotational angle $\theta^*$, by summing the vibration damping component $\theta^*_S$, roll restraining component $\theta^*_R$ and pitch restraining component $\theta^*_P$. When it is judged that the target damping coefficient C* of the absorber 52 is set to the second coefficient value $C_2$, S86 is implemented to determine the target rotational angle $\theta^*$, by summing a component reduced from the vibration damping component $\theta^*_S$, roll restraining component $\theta^*_R$ and pitch restraining component $\theta^*_P$. After determination of the target rotational angle $\theta^*$, S87 is implemented to determine the target electric current amount i* based on the determined target rotational angle $\theta^*$ and in accordance with the expression according to the PI control rule. One cycle of execution of the first adjuster-device controlling routine program is completed with S88 in which a control signal based on the determined target electric current amount i* is transmitted to the inverter 174.

There will be described second through fourth adjuster-device controlling routine programs which are similar to the first adjuster-device controlling routine program. In specific descriptions regarding procedures of the second through fourth adjuster-device routine programs, the same procedures as carried out in the first adjuster-device controlling routine program will not be described or described in a simplified manner.

(b) Second Adjuster-Device Controlling Routine Program

Unlike in the first adjuster-device controlling routine program, in procedures according to this second adjuster-device controlling routine program, the target rotational angle $\theta^*$ as such is reduced by execution of the displacement-force reducing control (S96). In other words, the displacement-force reducing control is implemented for reducing an entirety of the displacement force rather than reducing a component of the displacement force directed to the vibration damping.

(c) Third Adjuster-Device Controlling Routine Program

In the procedures according to this third adjuster-device controlling routine program, when the damping-coefficient increasing control is being executed, the power-supply inhibiting control is executed in place of the displacement-force reducing control, which is executed in the procedures according to the first and second adjuster-device controlling routine programs. Specifically described, when the damping-coefficient increasing control is being executed, it is judged whether the second coefficient value $C_2$ is larger than a first threshold coefficient value $C\alpha$ (S107). In case in which it is judged that the second coefficient value $C_2$ is larger than the first threshold coefficient value $C\alpha$, the free mode is selected as the operational mode of the electric motor 140 (S108). In case in which it is judged that the second coefficient value $C_2$ is equal to or smaller than the first threshold coefficient value $C\alpha$, it is judged whether the second coefficient value $C_2$ is smaller than a second threshold coefficient value $C\beta$ ($<C\alpha$) (S109). In case in which it is judged that the second coefficient value $C_2$ is smaller than the second threshold coefficient value $C\beta$, the brake mode is selected as the operational mode of the motor 140 (S110). In case in which it is judged that the second coefficient value $C_2$ is equal to or larger than the second threshold coefficient value $C\beta$, the standby mode is selected as the operational mode of the motor 140 (S111). After one of the above-described three operational modes has been selected, a control signal representing the determined operational mode is transmitted to the inverter 174 (S112). In execution of the power-supply inhibiting control in the procedures according to this third adjuster-device controlling routine program, the displacement force generated by the adjuster device 20, i.e., the damping force generated by the adjuster device 20 is reduced with increase of the second coefficient value $C_2$ of the absorber 52.

(d) Fourth Adjuster-Device Controlling Routine Program

Unlike in the third adjuster-device controlling routine program, in this fourth adjuster-device controlling routine program, the electric motor 140 is fixedly placed in the brake mode as the selected operational mode, without the selected operational mode being changed depending on the second coefficient value $C_2$, in execution of the power-supply inhibiting control (S127).

(iii) Combination of Absorber Controlling Program and Adjuster-Device Controlling Program It is, in principle, arbitrary as to which one of the four absorber controlling programs and which one of the four adjuster-device controlling programs are to be combined to each other. However, since the damping-coefficient increasing control is executed with the second coefficient value $C_2$ being the constant value in the first absorber controlling routine program, the fourth adjuster-device controlling program is mandatorily selected when the first absorber controlling routine program is selected in the present system.

Figure 27:
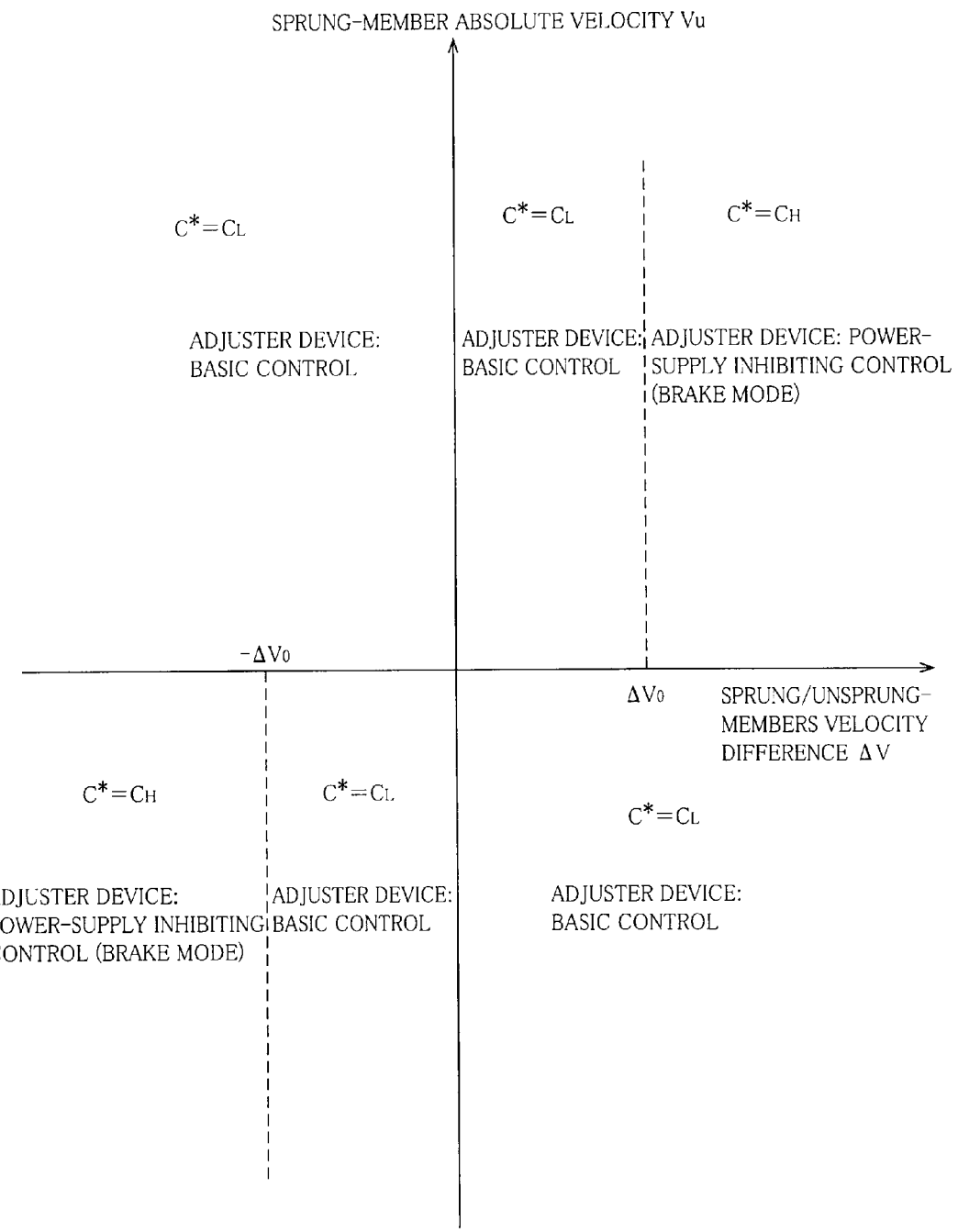
FIG. 27 is a chart conceptually showing a relationship among sprung/unsprung-members velocity difference, sprung-member absolute velocity, execution of damping-coefficient increasing control and execution of power-supply inhibiting control, when the fourth adjuster-device controlling routine program and the first absorber controlling routine program are combined to each other.

There will be described a case in which the first absorber controlling routine program and the fourth adjuster-device controlling program are executed in combination with each other, by way of example. In this case, a relationship between the target damping coefficient $C^*$ of the absorber 52 and the control of the adjuster device 20 is conceptually shown in a conceptual view of FIG. 27 in which the sprung/unsprung-members velocity difference $\Delta V$ is represented by the horizontal axial while the sprung-member absolute velocity $Vu$ is represented by the vertical axis. As is understood from the view of FIG. 27, in regions (in which the absolute value of the sprung/unsprung-members velocity difference $\Delta V$ is not smaller than the threshold difference value $\Delta V_0$) of first and third quadrants in which the sign of the sprung-member absolute velocity $Vu$ and the sign of the sprung/unsprung-members velocity difference $\Delta V$ are the same to each other, the target damping coefficient $C^*$ of the absorber 52 is set to the value $C_H$, and the power-supply inhibiting control is executed for the adjuster device 20, with the electric motor 140 being placed in the brake mode as the selected operational mode. On the other hand, in second and fourth quadrants in which the sign of the sprung-member absolute velocity $Vu$ and the sign of the sprung/unsprung-members velocity difference $\Delta V$ are different from each other, and also in other regions (in which the absolute value of the sprung/unsprung-members velocity difference $\Delta V$ is smaller than the threshold difference value $\Delta V_0$) of the first and third quadrants, the target damping coefficient $C^*$ of the absorber 52 is set to the value $C_L$, and the basic control is executed for the adjuster device 20, without reducing the target rotational angle $\theta^*$, namely, without reducing the displacement force.

There will be described another case in which the fourth absorber controlling routine program and the first adjuster-device controlling program are executed in combination with each other. In this case, a relationship between the target damping coefficient $C^*$ of the absorber 52 and the control of the adjuster device 20 is conceptually shown in a conceptual view of FIG. 28. As is understood from the view of FIG. 28, in regions (in which the absolute value of the target rotational angle $\theta^*$ is not smaller than the threshold angle value $\theta^*_0$) of the first and third quadrants, the target damping coefficient $C^*$ of the absorber 52 is set to a value that is larger than the value $C_L$ and not larger than the value $C_H$, and the displacement-force reducing control is executed for the adjuster device 20. On the other hand, in the second and fourth quadrants and also in other regions (in which the absolute value of the target rotational angle $\theta^*$ is smaller than the threshold angle value $\theta^*_0$) of the first and third quadrants, the target damping coefficient $C^*$ of the absorber 52 is set to the value $C_L$, and the basic control is executed for the adjuster device 20, without reducing the displacement force.

<<Functional Constructions of Controllers>>

Figure 29:
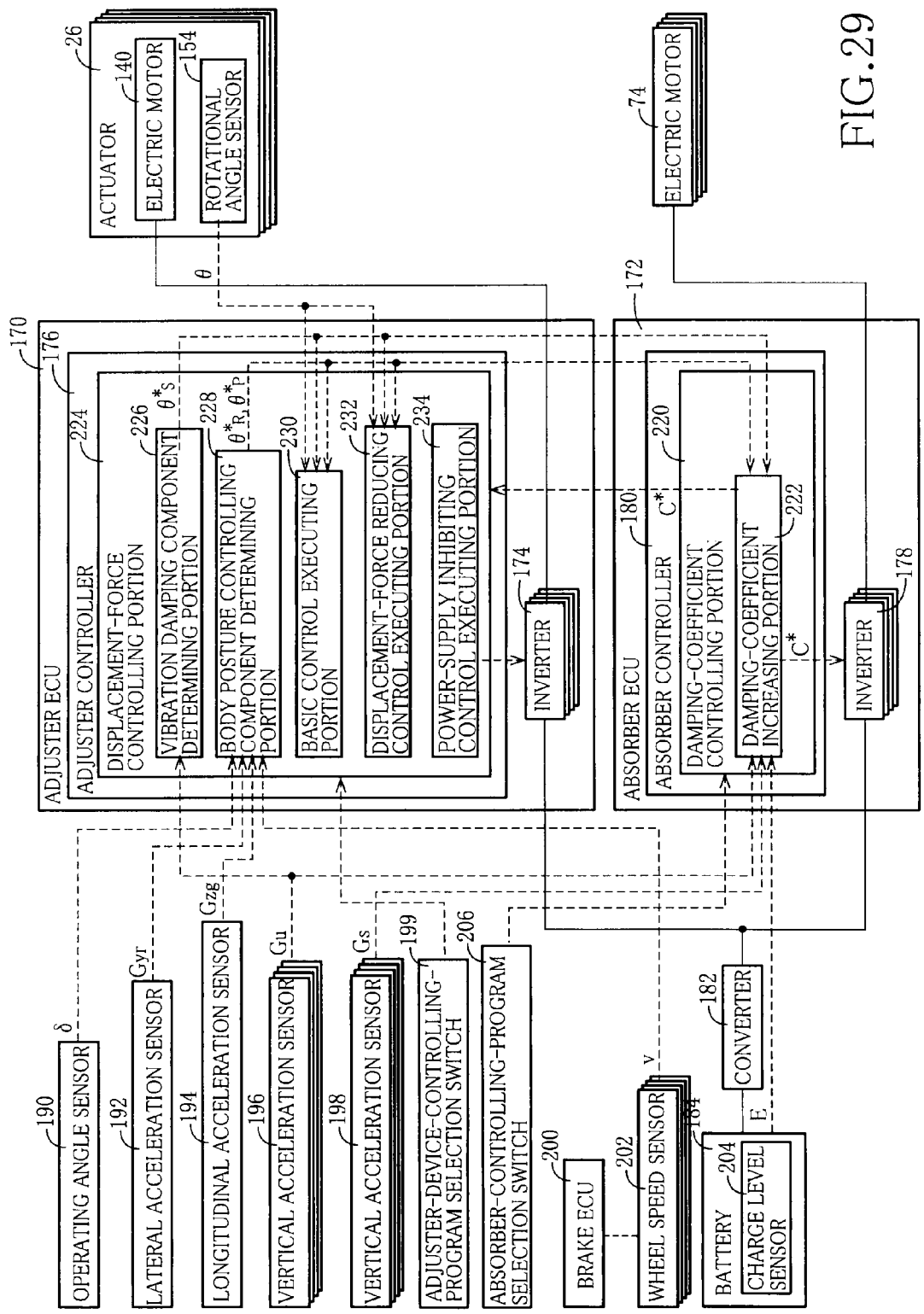
FIG. 29 is a block diagram showing functions of controllers for controlling the adjuster device and the absorber.

It can be considered that the absorber controller 180 configured to execute the above-described absorber controlling program has functional construction as shown in FIG. 29, in view of procedures carried out by execution of the absorber controlling program. As is understood from FIG. 29, the absorber controller 180 has a damping-coefficient controlling portion 220 as a functional portion configured to execute the absorber controlling program, namely, as a functional portion configured to determine the target damping coefficient $C^*$ of the absorber 52 and control the damping coefficient of the absorber 52. The damping-coefficient controlling portion 220 includes a damping-coefficient increasing portion 222 as a functional portion configured to carry out procedures according to S6, S9 through S11, S25, S28 through S31, S47, S50 through S53, S67 and S70 through S72, namely, as a functional portion configured to increase the target damping coefficient $C^*$ of the absorber 52.

Further, it can be considered that the adjuster controller 176 configured to execute the above-described adjuster-device controlling program has functional construction as shown in FIG. 29, in view of procedures carried out by execution of the adjuster-device controlling program. As is understood from FIG. 29, the adjuster controller 176 has a displacement-force controlling portion 224 as a functional portion configured to execute the adjuster-device controlling program, namely, as a functional portion configured to control the displacement force that is to be generated by the adjuster device 20. The displacement-force controlling portion 224 has a vibration-damping-component determining portion 226, a body-posture-controlling-component determining portion 228, a basic control executing portion 230, a displacement-force reducing control executing portion 232 and a power-supply inhibiting control executing portion 234. The vibration-damping-component determining portion 226 serves as a functional portion configured to carry out procedures according to S81, S91, S101, S121, namely, as a functional portion configured to determine the vibration damping component $\theta^*_S$. The body-posture-controlling-component determining portion 228 serves as a functional portion configured to carry out procedures according to S82, S83, S92, S93, S102, S103, S122, S123, namely, as a functional portion configured to determine the roll restraining component $\theta^*_R$ and the pitch restraining component $\theta^*_P$. The basic control executing portion 230 serves as a functional portion configured to carry out procedures according to S85, S97, S106, S126, namely, as a functional portion configured to determine the target rotational angle $\theta^*$ as a sum of the vibration damping component $\theta^*_S$, roll restraining component $\theta^*_R$ and pitch restraining component $\theta^*_P$, and to execute the above-described basis control based on the determined target rotational angle $\theta^*$. The displacement-force reducing control executing portion 232 serves as a functional portion configured to carry out procedures according to S86, S96, namely, as a functional portion configured to execute the displacement-force reducing control together with execution of the damping-coefficient increasing control. The power-supply inhibiting control executing portion 234 serves as a functional portion configured to carry out procedures according to S107 through S111, S127, namely, as a functional portion configured to execute the power-supply inhibiting control for inhibiting supply of the electric power to the electric motor 140, by switching the operational mode of the motor 140 from the controlled-power supplying mode to other mode. It can be considered that the displacement-force reducing control executing portion 232 and the power-supply inhibiting control executing portion 234 constitute a supplied-power reduction controlling portion since each of the portions 232, 234 has a function for reducing the electric power supplied from the battery 184 to the motor 140.

<<Modification of the Embodiment>>
(i) Sprung-Member Displacement Restraining Control The above-described suspension system may be modified such that the displacement force of the adjuster device 20 may be controlled by execution of a sprung-member displacement restraining control in addition to the vibration damping control, roll restraining control and pitch restraining control. This sprung-member displacement restraining control is a control for causing the adjuster device 20 to generate the displacement force such that an amount of the generated displacement force is dependent on a sprung-member displacement amount that is an amount of vertical displacement of the sprung member, so as to restrain vibration of the sprung member. Described in detail, in the sprung-member displacement restraining control, the displacement force is caused to function as a displacement restraining force in accordance with a so-called skyhook spring theory, based on an amount of absolute vertical displacement of the mount portion 54 from its reference position (in which the mount portion 54 is positioned in the reference state).

Specifically, the sprung-member displacement amount Xu is calculated based on the sprung-member vertical acceleration Gu that is detected by the vertical acceleration sensor 196 provided in the mount portion 54 of the vehicle body. Then, a sprung-member displacement restraining target rotational angle component (hereinafter abbreviated as "sprung-member displacement restraining component" where appropriate) $\theta^*_B$ as a component of the target rotational angle $\theta^*$ that is directed to the sprung-member displacement restraining control is determined based on the calculated sprung-member displacement amount Xu and in accordance with the following expression:

$$\theta^*_B = K_X \cdot Xu \ (K_X: \text{gain})$$

It is noted that the sprung-member displacement amount takes a positive value when the mount portion 54 is displaced upwardly from its reference position, and takes a negative value when the mount portion 54 is displaced downwardly from its reference position.

In the present system, the target rotational angle $\theta^*$ is determined in accordance with the following expression:

$$\theta^* = \theta^*_S + \theta^*_R + \theta^*_P + \theta^*_B$$

The actuator 26, i.e., the electric motor 140 is controlled based on the determined target rotational angle $\theta^*$.

(ii) Power-Supply Inhibiting Control

Also in the present system, when the damping-coefficient increasing control is executed, it is made possible to execute the power-supply inhibiting control with the electric motor 140 being placed in the brake mode as the selected operational mode. However, in the present system, the execution of the power-supply inhibiting control is limited based on execution of the sprung-member displacement restraining control.

Like the sprung-member displacement amount Xu, an unsprung-member displacement amount Xs is defined as an amount of vertical displacement of the unsprung member. A sprung/unsprung-members relative displacement amount $\Delta X$ is defined by an amount that is obtained by subtracting the unsprung-member displacement amount Xs from the sprung-member displacement amount Xu. The reference state can be considered as a force-balanced state, i.e., a state in which the elastic force of the coil spring 51 and the load applied to the coil spring 51 are balanced to each other. When the sign of the sprung/unsprung-members relative displacement amount $\Delta X$ is negative (−), the elastic force of the coil spring 51 is made larger whereby the force balance is lost. In this instance, the sprung and unsprung members are forced in the rebound direction. On the other hand, when the sign of the sprung/unsprung-members relative displacement amount $\Delta X$ is positive (+), the elastic force of the coil spring 51 is made smaller. In this instance, the sprung and unsprung members are forced in the bound direction. In execution of the sprung-member displacement restraining control, the displacement force is required to act in the bound direction when the sprung-member displacement amount Xu takes a positive value, and is required to act in the rebound direction when the sprung-member displacement amount Xu takes a negative value. Therefore, when the sign of the sprung/unsprung-members relative displacement amount $\Delta X$ and the sign of the sprung-member displacement amount Xu are the same to each other, the loss of the force balance serves to restrain the displacement of the sprung member.

In view of the above-described things, when the sign of the sprung/unsprung-members relative displacement amount ΔX and the sign of the sprung-member displacement amount Xu coincide with each other, it can be considered that a vibration restraining effect (that is to be obtained through the sprung-member displacement restraining control) is not considerably reduced even if the supply of the electric power to the electric motor 140 is inhibited. Therefore, in the present system, the power-supply inhibiting control is executed only when the sign of the sprung/unsprung-members relative displacement amount ΔX and the sign of the sprung-member displacement amount Xu coincide with each other.

Figure 30:
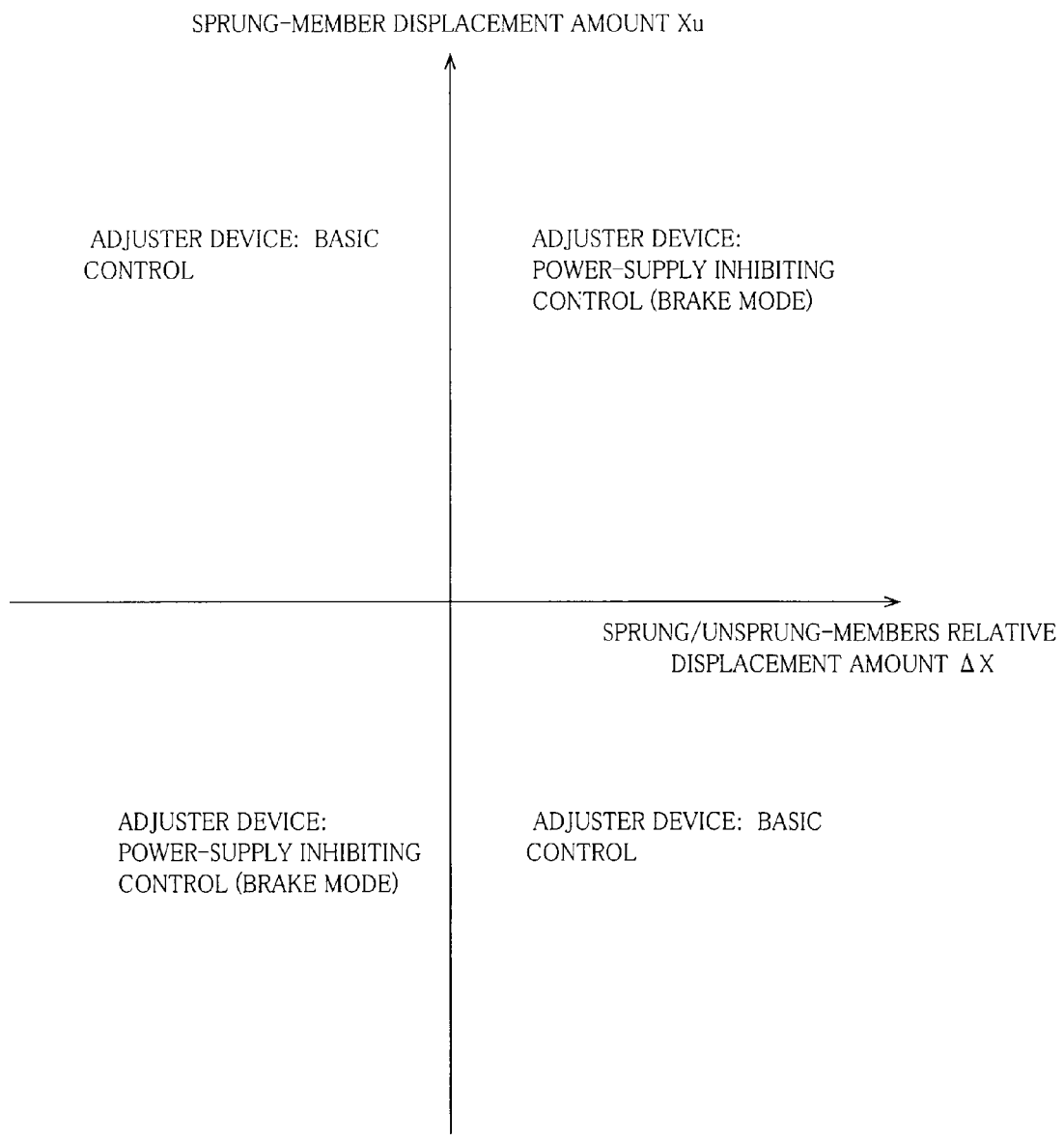
FIG. 30 is a chart conceptually showing a relationship among sprung/unsprung-members relative displacement amount, sprung-member displacement amount and execution of power-supply inhibiting control, upon execution of sprung-member displacement restraining control in a vehicle suspension system according to a modification of the embodiment.

The limitation imposed on the power-supply inhibiting control is conceptually shown in a view of FIG. 30 in which the sprung/unsprung-members relative displacement amount ΔX is represented by the horizontal axial while the sprung-member displacement amount Xu is represented by the vertical axis. As is apparent from this conceptual view, the displacement force of the adjuster device 20 is controlled based on the basic control with the electric motor 140 being placed in the controlled-power supplying mode as the selected operational mode, in second and fourth quadrants in which the sign of the sprung/unsprung-members relative displacement amount ΔX and the sign of the sprung-member displacement amount Xu are different from each other. On the other hand, the power-supply inhibiting control is executed with the motor 140 being placed in the brake mode as the operational mode, in first and third quadrants in which the above-described signs coincide with each other.

(iii) Adjuster-Device Controlling Program

Figure 31:
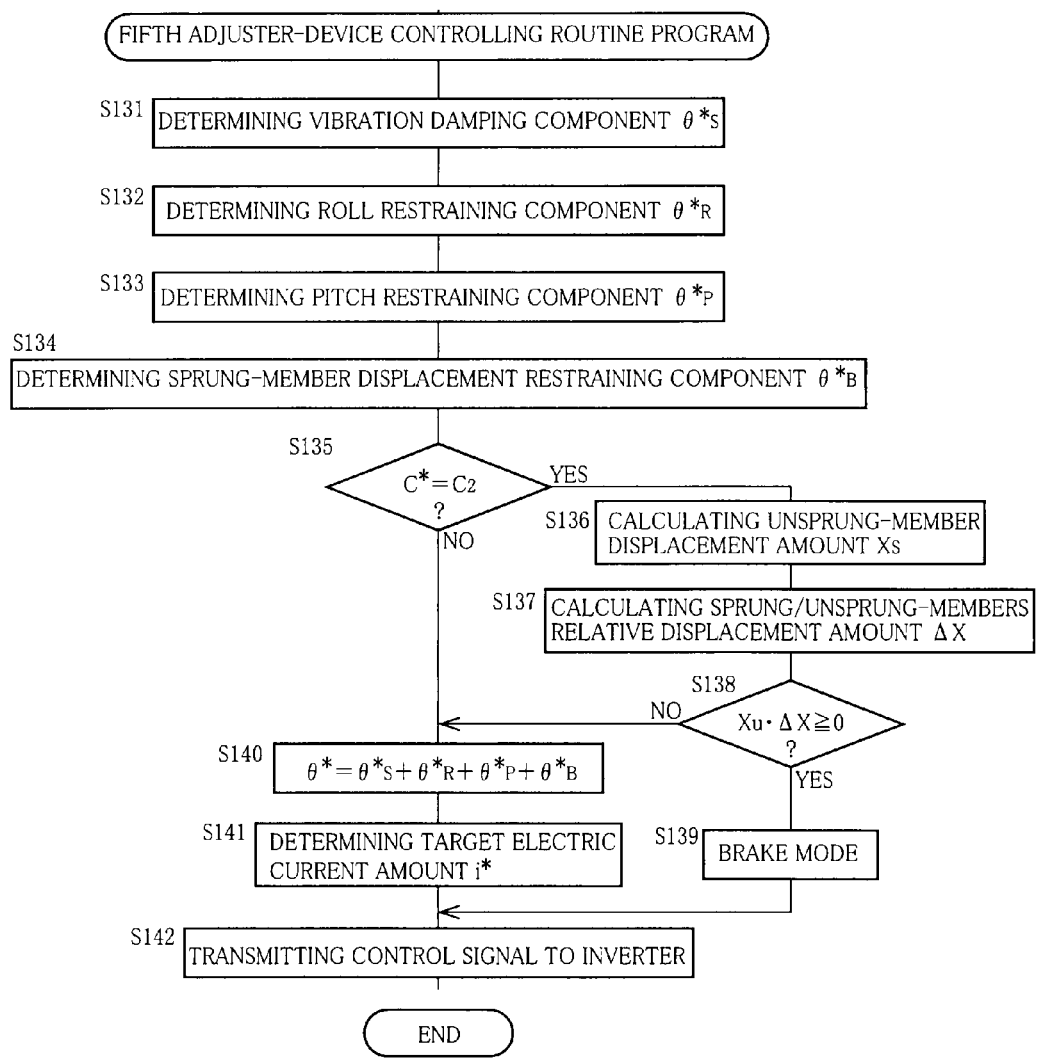
FIG. 31 is a flow chart showing fifth adjuster-device controlling routine program that can be executed in the vehicle suspension system according to the modification of the embodiment.

The above-described control for the adjuster device 20 is performed through a fifth adjuster-device controlling routine program that is executed by the adjuster controller 176 as shown by flow chart of FIG. 31. This fifth adjuster-device controlling routine program is executed when it is selected by the adjuster-device-controlling-program selection switch 199. The fifth adjuster-device controlling routine program, which is similar to the first adjuster-device controlling routine program, will be briefly described with reference to the flow chart of FIG. 31. In specific descriptions regarding procedures of this routine program, the same procedures as carried out in the first adjuster-device controlling routine program will not be described or described in a simplified manner.

In the procedures according to this fifth adjuster-device controlling routine program, S131 through S133 are implemented to determine the vibration damping component $\theta^*_S$, roll restraining component $\theta^*_R$, and pitch restraining component $\theta^*_P$. Then, in S134, the sprung-member displacement restraining component $\theta^*_B$ directed to the sprung-member displacement restraining control is determined based on the sprung-member displacement amount Xu. Then, in S135, it is judged whether the target damping coefficient C* of the absorber 52 is set to the second coefficient value $C_2$. When it is judged that the target damping coefficient C* is set to the second coefficient value $C_2$, S136 is implemented to calculate the unsprung-member displacement amount Xu based on the unsprung-member acceleration Gs. S136 is followed by S137 in which the sprung/unsprung-members relative displacement amount ΔX is calculated based on the sprung-member displacement amount Xu and the unsprung-member displacement amount Xs. Then, in S138, it is judged whether the sign of the sprung-member displacement amount Xu and the sign of the sprung/unsprung-members relative displacement amount ΔX are the same to each other. When it is judged that they are the same to each other, the brake mode is selected as the operational mode of the electric motor 170.

When it is judged that the sign of the sprung-member displacement amount Xu and the sign of the sprung/unsprung-members relative displacement amount ΔX are different from each other, and when it is judged in S135 that the target damping coefficient C* is not set to the second coefficient value $C_2$, the control flow goes to S140 in which the target rotational angle θ* is determined by summing the vibration damping component $\theta^*_S$, roll restraining component $\theta^*_R$, pitch restraining component $\theta^*_P$ and sprung-member displacement restraining component $\theta^*_B$. After determination of the target rotational angle θ*, S141 is implemented to determine the target electric current amount i* based on the determined target rotational angle θ* and in accordance with the expression according to the PI control rule. One cycle of execution of the fifth adjuster-device controlling routine program is completed with S142 in which a control signal based on the determined target electric current amount i* or a control signal representing the selection of the brake mode as the operational mode of the motor 170 is transmitted to the inverter 174.

(iv) Functional Constructions of Controllers

Figure 32:
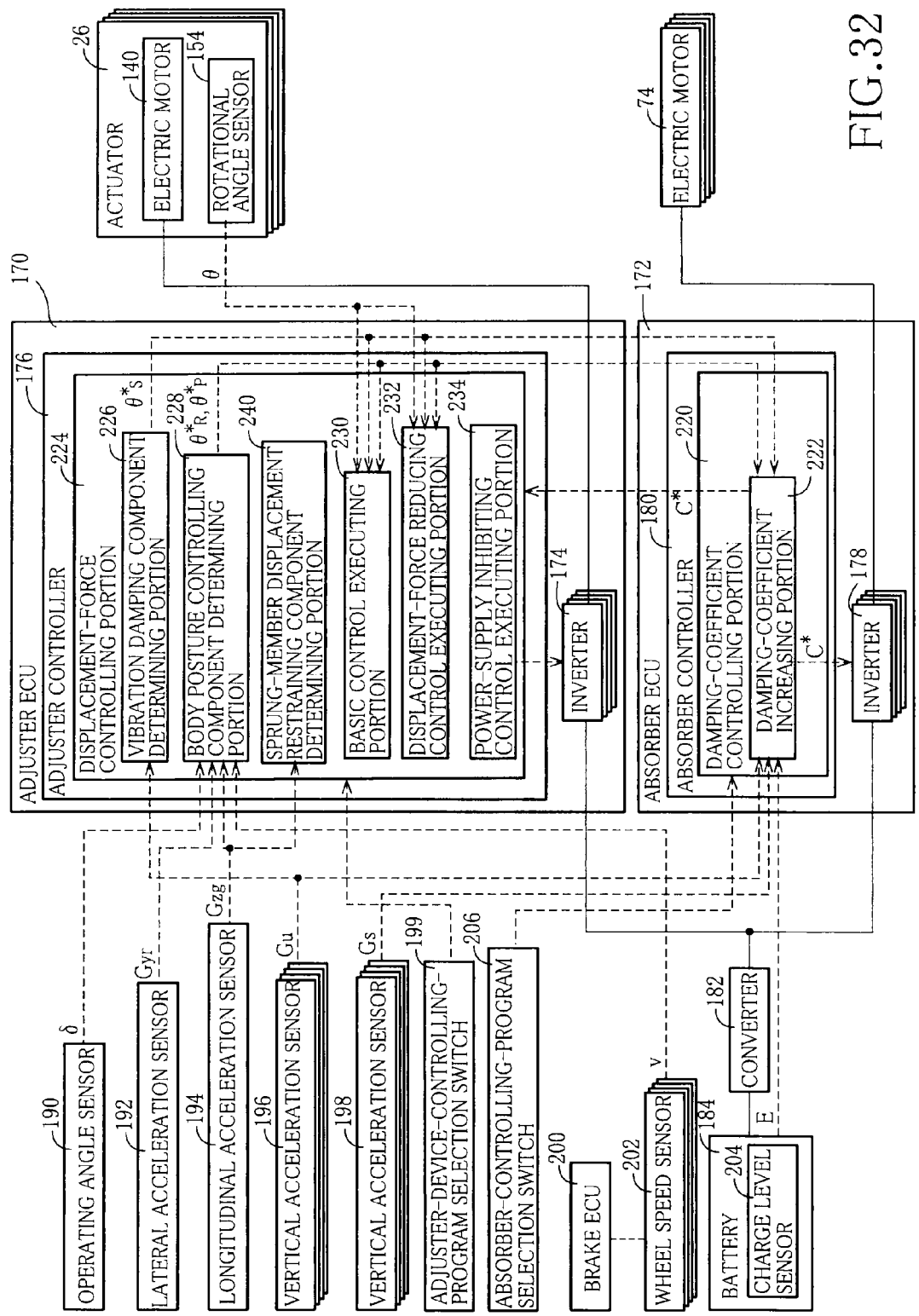
FIG. 32 is a block diagram showing functions of controllers for controlling the adjuster device and the absorber in the vehicle suspension system according to the modification of the embodiment.

The adjuster controller 176, which is capable of executing also the fifth adjuster-device controlling routine program, can be considered to have functional construction as shown in FIG. 32. Unlike in the adjuster controller 176 of the above-described system, in the adjuster controller 176 of the present system, the displacement-force controlling portion 224 is provided with a sprung-member-displacement-restraining-component determining portion 240 as a function portion configured to determine the sprung-member displacement restraining component $\theta^*_B$, for enabling execution of the sprung-member displacement restraining control.

The invention claimed is:
1. A suspension system for a vehicle, comprising:
a suspension spring disposed between a sprung member and an unsprung member of the vehicle and that elastically interconnects the sprung and the unsprung members;
a hydraulic absorber disposed in parallel with said suspension spring, and configured to generate a damping force against movement of the sprung and the unsprung members relative to each other such that an amount of the generated damping force is dependent on a sprung/unsprung-members velocity difference that is obtained by subtracting an absolute velocity of the unsprung member from an absolute velocity of the sprung member, said absorber having a damping coefficient changer configured to change a damping coefficient of said absorber which corresponds to ability of said absorber for generating the damping force and which serves as a basis for the amount of the generated damping force;
a displacement force generator disposed in parallel with said suspension spring, and having an electric motor as a power source, said displacement force generator being configured to generate a displacement force which is based on a motor force exhibited by the electric motor and which forces the sprung and the unsprung members to be displaced toward or away from each other; and
a controller having a damping-coefficient controlling portion and a displacement-force controlling portion, said damping-coefficient controlling portion being configured to control the damping coefficient of said absorber by controlling said damping coefficient changer, said displacement-force controlling portion being config- ured to control the displacement force generated by said displacement force generator, by controlling operation of said electric motor, wherein said displacement-force controlling portion is configured to execute a vibration damping control for causing said displacement force generator to generate the displacement force as a damping force against vibration of the sprung member such that an amount of the generated displacement force is dependent on a sprung-member absolute velocity that is the absolute velocity of the sprung member, wherein said damping-coefficient controlling portion is configured to execute a damping-coefficient increasing control when a sign of the sprung-member absolute velocity and a sign of the sprung/unsprung-members velocity difference are the same as each other, such that the damping coefficient of said absorber is set, in execution of the damping-coefficient increasing control, to a second coefficient that is larger than a first coefficient to which the damping coefficient of said absorber is set when the sign of the sprung-member absolute velocity and the sign of the sprung/unsprung-members velocity difference are different from each other, and wherein said damping-coefficient controlling portion is configured to execute the damping-coefficient increasing control upon satisfaction of at least one condition when the sign of the sprung-member absolute velocity and the sign of the sprung/unsprung-members velocity difference are the same as each other, the at least one condition including at least one of (A) a condition that the sprung-member absolute velocity is not larger than a threshold velocity value, (B) a condition that the sprung/unsprung-members velocity difference is not smaller than a threshold difference value, (C) a condition that a charge level of a battery as an electric-power supply source for said electric motor is not higher than a threshold level value, and (D) a condition that the displacement force that is to be generated by said displacement force generator is not smaller than a threshold force amount.

2. The suspension system according to claim 1, wherein said displacement-force controlling portion is configured to further execute a vehicle-body posture control for causing said displacement force generator to generate the displacement force as at least one of a roll restraining force for restraining roll of a body of the vehicle and a pitch restraining force for restraining pitch of the body of the vehicle.

3. The suspension system according to claim 1, wherein the second coefficient is changed in execution of the damping-coefficient increasing control.

4. The suspension system according to claim 1, wherein the first coefficient and the second coefficient are determined such that a road-holding ability of the vehicle is higher upon occurrence of vibration having a resonance frequency of the unsprung member when the damping coefficient of said absorber is set to the first coefficient, than upon occurrence of vibration having a resonance frequency of the sprung member when the damping coefficient of said absorber is set to the second coefficient.

5. The suspension system according to claim 1,
wherein the second coefficient is changed in execution of the damping-coefficient increasing control,
and wherein the first coefficient and a maximum second coefficient as a maximum of the second coefficient are determined such that a road-holding ability of the vehicle is higher upon occurrence of vibration having a resonance frequency of the unsprung member when the damping coefficient of said absorber is set to the first coefficient, than upon occurrence of vibration having a resonance frequency of the sprung member when the damping coefficient of said absorber is set to the maximum second coefficient.

6. The suspension system according to claim 1, wherein said displacement-force controlling portion is configured, when the damping-coefficient increasing control is being executed by said damping-coefficient controlling portion, to execute a displacement-force reducing control for reducing the displacement force that is to be generated by said displacement force generator.

7. The suspension system according to claim 1,
wherein said displacement-force controlling portion is configured to execute a sprung-member displacement restraining control for causing said displacement force generator to generate the displacement force as a force for restraining vertical displacement of the sprung member so as to restrain vibration of the sprung member such that the amount of the generated displacement force is dependent on an amount of the vertical displacement of the sprung member,
wherein said displacement-force controlling portion is configured, when the damping-coefficient increasing control is being executed by said damping-coefficient controlling portion, to execute a supplied-power reducing control for reducing an amount of electric power that is to be supplied to said electric motor,
and wherein the supplied-power reducing control is executed as a power-supply inhibiting control to inhibit supply of an electric power to said electric motor, on condition that a sign of a sprung-member displacement amount and a sign of a sprung/unsprung-members displacement amount difference are the same as each other, where the sprung-member displacement amount represents an amount of displacement of the sprung member, and the sprung/unsprung-members displacement amount difference is obtained by subtracting an amount of displacement of the unsprung member from the sprung-member displacement amount.

8. The suspension system according to claim 1, wherein said displacement-force controlling portion is configured, when the damping-coefficient increasing control is being executed, to execute a supplied-power reducing control for reducing an electric power that is to be supplied to said electric motor.

9. The suspension system according to claim 8, wherein the supplied-power reducing control is a power-supply inhibiting control for inhibiting supply of the electric power to said electric motor.

10. The suspension system according to claim 9, further comprising a drive circuit which is disposed between said electric motor and a battery as an electric-power supply source for said electric motor, and which is configured to drive said electric motor,
wherein said electric motor is operable while being placed in at least one of operational modes by operation of a switching element of said drive circuit, the operational modes consisting of (A) a motor-terminals connecting mode in which a plurality of motor terminals of the electric motor are electrically connected to each other, (B) a specific-motor-terminal/power-supply-terminal connecting mode in which one of a high-level voltage terminal and a low-level voltage terminal of the electric-power supply source is electrically connected to a selected one of the plurality of motor terminals of the electric motor that is changed depending on an operating position of the electric motor, and (C) a motor-terminals disconnecting mode in which neither the high-level voltage terminal nor the low-level voltage terminal of the electric-power supply source is electrically connected to the plurality of motor terminals of the electric motor and in which the plurality of motor terminals are electrically disconnected from each other, and wherein the power-supply inhibiting control is executed by placing said electric motor in a determined one of said at least one of the operational modes.

11. The suspension system according to claim 1, wherein said displacement force generator includes: an elastic body connected at a first of opposite end portions thereof to one of the sprung and the unsprung members; and an electromagnetically-operated actuator which is disposed between a second of said opposite end portions of said elastic body and the other of the sprung and the unsprung members and which interconnects said elastic body and said other of the sprung and the unsprung members, and wherein said electromagnetically-operated actuator includes said electric motor, and is configured to generate an actuator force based on a motor force generated by said electric motor, such that the generated actuator force acts on said elastic body so as to change an amount of deformation of said elastic body that is dependent on an amount of actuation of said actuator, and such that the generated actuator force is transmitted to the sprung and the unsprung members via said elastic body so as to act as the displacement force.

12. The suspension system according to claim 11, wherein said elastic body includes a shaft portion which is rotatably held by the sprung member and an arm portion which extends from a first or a second opposite end portion of said shaft portion in a direction intersecting said shaft portion and which arm portion is connected at a distal end portion thereof to the unsprung member, and wherein said actuator is fixed to a body of the vehicle, and is configured to rotate said shaft portion about an axis of said shaft portion by the actuator force generated by said actuator.

* * * * *